US012719037B2

(12) United States Patent
Taghioskoui

(10) Patent No.: US 12,719,037 B2
(45) Date of Patent: Aug. 25, 2026

(54) MASS SPECTROMETRY WITH TIME-OFFSET ELECTROSPRAY ION BEAMS

(71) Applicant: Trace Matters Scientific LLC, North Bethesda, MD (US)

(72) Inventor: Mazdak Taghioskoui, North Bethesda, MD (US)

(73) Assignee: Trace Matters Scientific LLC, North Bethesda, MD (US)

( * ) Notice: Subject to any disclaimer, the term of this patent is extended or adjusted under 35 U.S.C. 154(b) by 0 days.

(21) Appl. No.: 19/311,797

(22) Filed: Aug. 27, 2025

(65) Prior Publication Data

US 2026/0038784 A1 Feb. 5, 2026

Related U.S. Application Data

(63) Continuation of application No. 18/109,618, filed on Feb. 14, 2023.

(Continued)

(51) Int. Cl.

*H01J 49/00* (2006.01)
*G01N 30/62* (2006.01)

(Continued)

(52) U.S. Cl.

CPC .......... *H01J 49/0031* (2013.01); *G01N 30/62* (2013.01); *G01N 30/72* (2013.01);

(Continued)

(58) Field of Classification Search

CPC .. H01J 49/009; H01J 49/0031; H01J 49/0036; H01J 49/165; H01J 49/167;

(Continued)

(56) References Cited

U.S. PATENT DOCUMENTS 5,448,061 A * 9/1995 Wells .................. H01J 49/4265 250/252.1
5,479,012 A * 12/1995 Wells .................. H01J 49/4265 250/282

(Continued)

OTHER PUBLICATIONS

Derks, Jason et al., "Increasing mass spectrometry throughput using time-encoded sample multiplexing", Parallel Squared Technology Institute, 44 pages.

(Continued)

*Primary Examiner* — Wyatt A Stoffa
(74) *Attorney, Agent, or Firm* — Lee & Hayes, P.C.

(57) ABSTRACT

A mass spectrometry system includes an electrospray ion source, one or more ion inlets, and one or more mass analyzers. The electrospray ion source includes at least a first electrospray emitter and a second electrospray emitter. The first electrospray emitter produces a first ion beam, and the second electrospray emitter produces a second ion beam. The mass spectrometry system measures the first ion beam produced by the first emitter and the second ion beam produced by the second emitter. A first point in time (T1) corresponds to a first chromatographic peak that the mass spectrometry system measures from the first ion beam. A second point in time (T2) corresponds to a second chromatographic peak that the mass spectrometry system measures from the second ion beam. The first point in time (T1) and the second point in time (T2) are separated by a predetermined time delay or offset (deltaT).

24 Claims, 36 Drawing Sheets

Related U.S. Application Data

(60) Provisional application No. 63/309,920, filed on Feb. 14, 2022.

(51) Int. Cl.
*G01N 30/72* (2006.01)
*H01J 49/16* (2006.01)
*H01J 49/42* (2006.01)

(52) U.S. Cl.
CPC ........ *H01J 49/0036* (2013.01); *H01J 49/165* (2013.01); *H01J 49/167* (2013.01); *H01J 49/4245* (2013.01)

(58) Field of Classification Search
CPC .... H01J 49/4245; H01J 49/425; H01J 49/004; G01N 30/62; G01N 30/72
See application file for complete search history.

(56) References Cited

U.S. PATENT DOCUMENTS 6,066,848 A 5/2000 Kassel et al.
6,207,954 B1 3/2001 Andrien, Jr. et al.
6,465,776 B1 10/2002 Moini et al.
6,489,608 B1 * 12/2002 Skilling .................. H01J 49/04 250/281
6,501,073 B1 * 12/2002 Mylchreest ........... H01J 49/107 250/288
6,627,882 B2 * 9/2003 Schultz ................. H01J 49/167 250/281
6,657,191 B2 12/2003 Park
6,703,611 B2 3/2004 Glish et al.
6,784,422 B2 8/2004 Covey et al.
6,914,240 B2 7/2005 Giles et al.
6,979,816 B2 12/2005 Tang et al.
7,072,773 B2 * 7/2006 Plumb .................... G16B 40/10 702/182
7,381,947 B2 * 6/2008 Senko ................... H01J 49/429 250/292
7,399,961 B2 7/2008 Chen et al.
7,501,621 B2 * 3/2009 Willis ................. H01J 49/0036 250/281
7,657,387 B2 * 2/2010 Malek ..................... H03M 7/30 702/182
7,687,771 B2 3/2010 Jolliffe et al.
7,718,959 B2 * 5/2010 Franzen ................ H01J 49/063 250/281
7,797,988 B2 9/2010 Schultz et al.
8,008,619 B2 8/2011 Jolliffe et al.
8,093,554 B2 * 1/2012 Makarov ............... H01J 49/406 250/281
9,299,553 B2 3/2016 Whitehouse et al.
11,219,393 B2 * 1/2022 Taghioskoui ......... H01J 49/065
12,283,474 B2 * 4/2025 Bloomfield ........... H01J 49/403
12,376,770 B2 * 8/2025 Taghioskoui .......... A61B 10/04
12,494,357 B2 * 12/2025 Covey ................. H01J 49/0036
2004/0108452 A1 * 6/2004 Graber ............... G01N 33/6803 250/281
2004/0206901 A1 * 10/2004 Chen .................. G01N 30/7266 250/288
2006/0289746 A1 * 12/2006 Raznikov ............. G01N 27/623 250/288
2007/0228270 A1 * 10/2007 Yamaguchi ........... H01J 49/027 250/287
2008/0067349 A1 * 3/2008 Moskovets ........... H01J 49/009 250/287
2008/0083873 A1 * 4/2008 Giardina ............... H01J 49/165 250/288
2009/0140139 A1 * 6/2009 Bonner .............. G01N 30/7233 250/281
2009/0250607 A1 * 10/2009 Staats ................... H01J 49/165 250/288
2009/0250608 A1 * 10/2009 Mordehai ............. H01J 49/167 250/288
2010/0213368 A1 * 8/2010 Wang .................. H01J 49/0036 250/288
2012/0158318 A1 * 6/2012 Wright .................. G01N 15/02 702/28
2013/0090862 A1 * 4/2013 Krokhin ................. G01N 30/72 250/282
2014/0048701 A1 * 2/2014 Green .................. H01J 49/004 250/281
2014/0110661 A1 * 4/2014 Wang ..................... H10N 99/00 438/20
2014/0284406 A1 * 9/2014 Brekenfeld ........... B05B 5/0255 239/696
2014/0303903 A1 * 10/2014 Fujita ................. H01J 49/0036 702/23
2016/0379810 A1 * 12/2016 Bonner .............. H01J 49/0045 250/282
2018/0100830 A1 * 4/2018 Gonin .................. G01N 27/623
2018/0226238 A1 * 8/2018 Griep-Raming ........ H01J 49/38
2019/0074169 A1 * 3/2019 Eiler ................... H01J 49/4265
2020/0090918 A1 * 3/2020 Burton ................ H01J 49/0081
2020/0111655 A1 * 4/2020 Taghioskoui ........ G01N 27/622
2020/0355647 A1 * 11/2020 Le Blanc ............ H01J 49/0045
2023/0298875 A1 9/2023 Taghioskoui
2024/0030017 A1 * 1/2024 Taghioskoui ........ G01N 27/622
2025/0372360 A1 12/2025 Taghioskoui
2026/0038784 A1 * 2/2026 Taghioskoui ....... H01J 49/0031
2026/0126413 A1 * 5/2026 Meyer .................... G01N 27/64

OTHER PUBLICATIONS

Lancaster, Noah M. et al., "SynchroSep-MS: Parallel LC Separations for Multiplexced Proteomics", Journal of the American Society for Mass Spectrometry, Jul. 30, 2025, 9 pages.
Hosp, Fabian et al., "A Double-Barrel Liquid Chromatography-Tandem Mass Spectrometry (LC-MS/MS) System to Quantify 96 Interactomes per Day", 2015, The American Society for Biochemistry and Molecular Biology, Inc., 12 pages.
Hannis, James C. et al., "A Dual Electrospray Ionization Source Combined With Hexapole Accumulation to Achieve High Mass Accuracy of Biopolymers in Fourier Transform Ion Cyclotron Resonance Mass Spectrometry", 2000 American Society for Mass Spectrometry, 8 pages.
Waanders, Leonie F. et al., "A Novel Chromatographic Method Allows On-line Reanalysis of the Proteome", 2008, The American Society for Biochemistry and Molecular Biology, Inc., 8 pages.
Derks, Jason et al., "Increasing mass spectrometry throughput using time-encoded sample multiplexing", May 27, 2025, Parallel Squared Technology Institute, 44 pages.
Webber, Kei G. et al., "Label-Free Profiling of up to 200 Single-Cell Proteomes per Day Using a Dual-col. Nanoflow Liquid Chromatography Platform", Apr. 19, 2022, HHS Public Access, 21 pages.
Lopez-Ferrer, Daniel et al., "Pressurized Pepsin Digestion in Proteomics", 2011, The American Society for Biochemistry and Molecular Biology, Inc., 11 pages.
Didangelos, Athanasios et al., "Proteomics Characterization of Extracellular Space Components in the Human Aorta", 2010, The American Society for Biochemistry and Molecular Biology, Inc., 15 pages.
Waanders, Leonie F. et al., "Quantitative proteomic analysis of single pancreatic islets", Nov. 10, 2009, Institute of Molecular Cell Biology adn Genetics, 6 pages.
Jinno, Daisuke et al., "Rapid and selective simultaneous quantitative analysis of modified nucleosides using multi-column liquid chromatograph-tandem mass spectrometry", Journal of Analytical Science and Technology, 2017, 9 pages.
Young, Nicolas L. et al., "Steady-State Asymmetric Nanospray Dual lon Source for Accurate Mass Determination within a Chromatographic Separation", 2007, American Chemical Society, 8 pages.

(56) References Cited

OTHER PUBLICATIONS

Lancaster, Noah M. et al., "SynchroSep-MS: Parallel LC Separations for Multiplexed Proteomics", Journal of the American Society for Mass Spectrometry, Jul. 24, 2025, 9 pages.

* cited by examiner

| | First mass spectrometer | | | Second Mass Spectrometer | | Third mass spectrometer | | | Fourth mass spectrometer | |
|---|---|---|---|---|---|---|---|---|---|---|
| | MS1 Survey scan with low sensitivity | | | MS1 Survey scan with high sensitivity | | MS1 high resolution scan | | | MS/MS structural scan | |
| Peak | MS1 scan (m/z) | Time stamp for max peak height (msec) | Intensity (arb.unit) | MS1 scan (m/z) | Intensity (arb.unit) | MS1 scan (m/z) | Intensity Ratio | Time stamp for max peak height (msec) | MS/MS scan (m/z) | Time stamp for max peak height (msec) |
| A | 400.0 | T1 | Ha | excluded | - | 400.0001 | 100% | TD1 | 100.0000<br>120.0000<br>150.0000 | TD1 |
| B | 500.0 | T2 | Hb | excluded | - | 499.9997<br>500.0288 | 10%<br>90% | TD2 | 200.0000<br>220.0000<br>250.0000 | TD2 |
| C | 600.0 | T3 | Hc | 600.0 | HDc | 600.0001 | 100% | TD3 | 300.0000<br>320.0000<br>350.0000 | TD3 |
| D | 700.0 | - | below detection limit | 700.0 | HDd | 699.9999 | 100% | TD4 | 400.0000<br>420.0000<br>450.0000 | TD4 |
| E | 800.0 | - | below detection limit | 800.0 | HDe | 800.0021 | 100% | TD5 | 500.0000<br>520.0000<br>550.0000 | TD5 |
| F | 900.0 | - | below detection limit | 900.0 | HDf | 900.0031 | 100% | TD6 | 600.0000<br>620.0000<br>650.0000 | TD6 |

TD1-T1 = TD2-T2 = TD3-T3 = TD4-T4 = TD5-T5 = ... = time delay in electrospray source
HDc/Hc = calibration ratio (CR)

FIG. 20C

| Super mass spectrometer aggregate data | | | | |
|---|---|---|---|---|
| Peak | MS1 scan (m/z) | Intensity (arb.unit) | MS/MS scan (m/z) | Time stamp for max peak height (msec) |
| A | 400.0001 | Ha | 100.0000<br>120.0000<br>150.0000 | TD1 |
| B | 499.9997 | Hb*10% | 200.0000<br>220.0000<br>250.0000 | TD2 |
| B | 500.0288 | Hb*90% | 200.0000<br>220.0000<br>250.0000 | TD2 |
| C | 600.0001 | Hc | 300.0000<br>320.0000<br>350.0000 | TD3 |
| D | 699.9999 | HDd*(HC/HDc) | 400.0000<br>420.0000<br>450.0000 | TD4 |
| E | 800.0021 | HDe*(HC/HDc) | 500.0000<br>520.0000<br>550.0000 | TD5 |
| F | 900.0031 | HDf*(HC/HDc) | 600.0000<br>620.0000<br>650.0000 | TD6 |
| TD1-T1 = TD2-T2 = TD3-T3 = TD4-T4 = TD5-T5 = ... = time delay in electrospray source<br>HDc/Hc = calibration ratio (CR) | | | | |

FIG. 20D

MASS SPECTROMETRY WITH TIME-OFFSET ELECTROSPRAY ION BEAMS

RELATED APPLICATIONS

The present application is a continuation of and claims priority benefit of the U.S. application Ser. No. 18/109,618 filed on Feb. 14, 2023, claiming priority to U.S. Provisional Application No. 63/309,920 filed on Feb. 14, 2022, the content and disclosure of which are hereby incorporated by reference in their entirety herein and below.

TECHNICAL FIELD

The present disclosure relates to methods and systems for mass spectrometry. More specifically, embodiments of the present disclosure relate to methods and systems for improving performance of mass spectrometry systems, multi-beam mass spectrometry, parallel-beam mass spectrometry, and deterministic mass spectrometry.

BACKGROUND

For over a century now, mass spectrometry has provided a method for the study of mass to charge ratio of gas-phase ions for elemental and molecular analysis, having demonstrated a history of steady improvement over the years in terms of performance as well as the range of its use and applications. The wide use of mass spectrometry to study chemical composition of matter has contributed important insights across multiple disciplines starting with physics, and then, transitioning to chemistry and biology over the years. As it stands today, the next big opportunity for mass spectrometry is in the field of human health and disease, for example in-omics such as proteomics and metabolomics. Proteomics is the large-scale study of proteins. Metabolomics is the large-scale study of small molecules, commonly known as metabolites, within cells, biofluids, tissues or organisms.

Mass spectrometry (mass spectrometry or mass spectrometer may be referred to as MS in the present disclosure) has proven to be one of the most powerful and popular techniques for discovery and quantification of biological molecules such as metabolites and proteins and is the current gold standard for protein and metabolite identification and quantitation. With respect to proteomics, a variety of mass spectrometry-based approaches including top-down, and bottom-up strategies have been developed and employed for this purpose. Despite its well-documented complexities, bottom-up mass spectrometry-based proteomics remains the most popular approach, and this technique has constantly advanced to provide highly consistent and accurate quantification values for large numbers of proteins across large numbers of samples.

Proteomics aims to catalog the entire protein products of the human genome and the structural basis for protein interactions and functions. One of the overarching objectives of human proteomics studies is to shed light on the root cause of human diseases to prevent them or develop new and more effective therapies. However, the diversity and high dynamic range of protein expression or abundance in human proteome along with the extreme complexity resulting from post-translational modifications makes the required measurements for these studies one of the most interesting challenges in modern history, and the dynamic nature of the proteome (e.g., changes within individuals over time, in disease states, and between individuals) further adds to the complexity. In is an object of the present disclosure to provide systems and methods of mass spectrometry with scalable sensitivity, scan speed and dynamic range and offer other advantages and features to address these challenges.

Untargeted bottom-up proteomics workflows enable accurate identification and quantitation of a large number of proteins across a wide dynamic range and remain in high demand for protein-level analysis. The stringent requirements of these workflows have resulted in the development of sophisticated mass spectrometry instruments and advanced data acquisition and processing techniques. Despite great advances made in sensitivity and acquisition speed of modern mass spectrometers, they fall short of satisfying the needs of these untargeted workflows (higher sensitivity, scan speed, and dynamic range, etc.), and the imposed limitations in terms of analytical performance of the instrumentation and methods of using the instrumentation hinder these workflows from reaching their full potential. The present application discloses one or more embodiments and/or several approaches to tackle and overcome these technological challenges through novel architectures, systems, and methods, collectively referred to as "super mass spectrometry," "multi-beam mass spectrometry," "parallel-beam mass spectrometry," and/or "deterministic mass spectrometry" that provide a leap in analytical performance of mass spectrometry instruments, systems, techniques and methods. For example, one or more embodiments of the present disclosure enable connecting together multiple commercial mass spectrometers to collectively function as a "cluster" of mass spectrometers. The novel architectures, systems, and methods disclosed herein provides numerous advantages. For example, the cost and timeline for developing such complex systems is significantly reduced by using commercial instruments. Another significant advantage is that the mass spectrometry system or the Super Mass Spectrometer disclosed herein allows for constructing scalable mass spectrometry systems such that adding additional mass spectrometers increases the analytical performance of the system. The following remarks in the background section is provided to those skilled in the art to better understand and appreciate exemplary embodiments of the present disclosure with respect to protein analysis. However, as understood by those skilled in the art, one or more embodiments of the present disclosure is also applicable in any application of mass spectrometry and the exemplary applications in the fields of proteomics is not intended to limit the scope of the disclosure.

FIG. 1 shows a typical workflow for bottom-up proteomics analysis using liquid chromatography mass spectrometry. As shown in FIG. 1, in a typical bottom-up MS-based proteomics workflow, proteins are first extracted from biological specimens, for example from tissue or cells, and then the extracted proteins are enzymatically digested to produce tryptic peptides. The resulting peptides are then ionized, and the produced ions are resolved in a mass analyzer of a mass spectrometer according to their mass/charge ratio (m/z) and detected. Each detected m/z has a certain signal intensity that is correlated with abundance of the detected peptide. The produced peptides are measured by mass spectrometry as fingerprints of proteins, which are subsequently correlated with known proteins in databases using search engines. Depending on the scope of a bottom-up proteomics study, two category of acquisition techniques have been developed and used: data dependent acquisition (DDA) and data independent acquisition (DIA). Front-end technologies, such as nano- and micro-flow liquid chromatography (LC), High-performance liquid chromatography (HPLC), or ion mobility (IM) separation or filtering based on a mobility of ions rather than m/z of ions, are commonly used and provide one or more extra analysis dimensions and alleviate issues that adversely affect mass spectrometry measurements (e.g., ion suppression, matrix effects, spectra complexity, etc.), and allow for sensitive measurement of less abundant peptides.

DDA techniques implemented with nano- and micro-flow liquid chromatography tandem mass spectrometry (LC-MS/MS) has now long been a robust and powerful technique to identify and quantify proteins. In DDA-MS techniques, only a limited number of peptides in the protein digest, for example the ones resulting in the top 20 most abundant peaks in mass spectra, are target of the analysis. MS1 (or mass analyzer 1) selects a pre-determined number of peptides, one at a time and each via a narrow isolation window (e.g., ~1 amu) for interference-free isolation of a single peptide and delivers them to MS2 (or mass analyzer 2 that may be MS/MS) for fragmentation and analysis. The target m/z values for MS1 are user-defined (e.g., multiple reaction monitoring (MRM) and parallel reaction monitoring (PRM)) or determined on-the-fly based on pre-defined criteria (e.g., top N most abundant precursors, N being up to ~20 distinct target m/z values). While DDA techniques offer extremely sensitive measurements, they fall short of providing a complete protcome analysis necessary in biological research and discovery.

In DIA-MS techniques, all peptides in the protein digest are subjected to comprehensive analysis, and MS1 samples the entire m/z range. MS1 typically selects precursor ions in a relatively wide isolation window (e.g., >10 amu) and delivers all ions passing through this wide isolation window to MS2 (or MS/MS or tandem mass spectrometry) for fragmentation and analysis. To cover the entire m/z range, MS1 either may switch among a number of discrete and often overlapping isolation windows that collectively cover the entire m/z range (e.g., SWATH) or may scan the isolation window across to cover the entire m/z range (e.g., Scanning SWATH).

DDA-MS and DIA-MS techniques along with their advantages and disadvantages are widely known to those skilled in the art. DDA-MS and DIA-MS techniques have found specific applications in proteomics studies, and each offers unique advantages for specific use cases. DDA workflows provide significant advantages in terms of providing extremely sensitive measurements. However, these sensitive measurements compromise on a coverage of proteomics measurements or proteome coverage. On the other hand, DIA workflows provide a much wider coverage but at the cost of less sensitive measurements. In other words, in conventional mass spectrometry workflows, there is compromise between sensitivity and depth of coverage, and a user needs to consider the specific needs of a project and decide on the workflow based on the specifics needs.

Hybrid data acquisition (HDA) workflows that, at the same time, incorporate the benefits of DDA and DIA techniques are gaining growing interest, and creative approaches for implementing them are emerging. In fact, it has been reasonably speculated that the technological advances in terms of sensitivity and scan speed will blur the distinctions between DDA and DIA workflows, and eventually a single "super" method will offer the benefits of different data acquisition techniques. Embodiments disclosed in the present applications one or more of such methods and systems. HDA techniques may provide advantages and may enable quantifying a significant number of peptides with minimal assumptions about the sample. However, realizing and demonstrating a powerful hybrid data acquisition technique requires technological advances that improve sensitivity and scan speed of a mass spectrometer technique at the same time. In a conventional sense of technology development in the field of mass spectrometry, as known to those skilled in the art, all HDA techniques use only a single mass spectrometer or a single beam instrument that may have one or more mass analyzers examples of which are shown in FIGS. 6-10. Irrespective of the performance of the single mass spectrometer, the developed techniques always require more analytical power and performance from a mass spectrometer in terms of sensitivity, scan speed, and dynamic range. One or more embodiments of the present disclosure enable addresses the shortcomings of instrumentation and data acquisition technique and provides a mass spectrometry system and scale sensitivity, scan speed and dynamic range. The present application, as understood by those skilled in the art, brings together DDA, DIA and HDA techniques and provides a platform where the performance of the system is scalable to meet or exceed the analytical performance requirements of an-omics study, for example a large-scale proteomics or metabolomics study with unprecedented protein or metabolite coverage, and provides a significant boost in both depth of protein coverage and accuracy of quantitation.

FIG. 2A and FIG. 2B show a typical liquid chromatography mass spectrometry (LCMS) system in two different valve positions. Sample from an autosampler 21 is first injected to fill out a sample loop 22. Then a six-way rotary valve 24 is rotated and a pump 23 injects a predetermined amount of sample in the sample loop 22 to an analytical column 25 and then through an electrospray emitter (ESI) 26. The sample is transferred to gas-phase ions in form of a spray with application of high voltage in an electrospray ion source. An atmospheric pressure sampling inlet or sampling inlet, or ion transfer tube of a front-end 27 of a mass spectrometer 28 then samples the produced ions and transfers them to reduced pressure inside the mass spectrometer 28 for analysis or separation based on m/z of ions.

FIG. 3 shows a block diagram of a typical mass spectrometry system. As shown in FIG. 3, a mass spectrometer 30 is a complex system composed of various components. The critical components of a typical mass spectrometer include sample introduction and ionization 31, sampling inlet 32, ion optics and mass analyzer 34, detector 35, vacuum chamber or housing 33, vacuum system 39 including vacuum pumps and gauges, voltage supply systems 36, control systems 37, and data acquisition systems 38. In a typical mass spectrometer, first, the ionization source 31 ionizes a sample to produce positive or negative gas-phase ions. The produced ions travel through the sampling inlet 32 and are efficiently transported by ion guides (e.g., ion funnels and/or multipoles) to enter the mass analyzer 34. Ion trapping devices may also be used to accumulate ions to enhance signal intensity. The mass analyzer 34, which is derived by voltage supply systems 36, separates ions based on their m/z. The detector 35 produces electrical signals based on the analyzed ions. The data acquisition systems 38 receive the electrical signal from the detector 35, typically in the form of electrical current or voltage, and produce and record spectra. The spectra provide fingerprints for chemical identification of the sample. Control systems 37 control various components. All components related to the mass analysis and ion detection are placed inside a vacuum chamber 33, maintained at high or ultra-high vacuum. Although FIG. 3 shows sample introduction/ionization block 31 outside the vacuum region, ionization of samples may occur in a wide range of pressures, from atmospheric pressure to high vacuum. In a conventional mass spectrometer, the sample introduction/ionization 31 is attached to the sampling inlet 32.

Mass spectrometers require high vacuum for proper mass analysis because, ideally, ions must travel inside a mass spectrometer without colliding with background gas molecules. Therefore, the vacuum in the mass analyzer 34 of a mass spectrometer must be maintained at a pressure that correlates with ion mean free path length longer (ideally several folds) than the length of the mass analyzer or length of ion travel. According to the kinetic theory of gases, the mean free path L (in m) is given by: $L=KT/\sqrt{2}\,p\sigma$, where k is the Boltzmann constant, T is the temperature (K), p is the pressure (Pa), and $\sigma$ is the collision cross-section ($m^2$). In a typical mass spectrometer with $k=1.38\times10^{-21}$ $JK^{-1}$, T=300 K, and $\sigma=45\times10^{-20}$ $m^2$, the mean free path equation simplifies to L=4.95/p, where L is in centimeters and p is in milli-Torr. In laboratory-scale mass spectrometers, ion filtering and detection usually occur in high vacuum, i.e., $<10^{-5}$ Torr, corresponding to a mean free path of >4.95 meters. This is necessary to achieve high resolution separation of ions. To achieve a pressure of $<10^{-5}$ Torr with available vacuum technologies, a two-stage vacuum generation process is utilized. First, pressure is reduced to $\sim10^{-2}$ Torr using mechanical or roughing pumps, and then one or more turbo-molecular pumps, ion pumps, or cryogenic pumps further reduce the pressure to $<10^{-5}$ Torr. Turbomolecular pumps provide relatively higher pumping capacities compared to ion pumps and are more appropriate for atmospheric pressure sampling and ionization. Ion pumps have advantages when vibration-free operation and ultrahigh vacuum is required (vacuum levels of $<10^{-10}$ Torr).

Prior to the introduction of soft ionization and ambient ionization techniques, mass spectrometry was generally limited to the analysis of volatile, relatively low-molecular-mass samples, and mass spectrometry analysis of biomolecules was difficult if not impossible. Also, conventional ionization sources, such as electron impact ionization, caused excessive fragmentation when applied to biomolecules. The advent of soft ionization techniques, which produce molecular ions with little or no fragmentation in ambient or near-ambient environment, made it possible to analyze large organic molecules and biomolecules with mass spectrometers. In particular, the development of electrospray ionization (ESI) and matrix-assisted laser desorption/ionization (MALDI) has extended the application of mass spectrometry to biomolecules and extended application of mass spectrometry systems to—omics. These techniques have demonstrated unparalleled advantages, for example in analyzing peptides and proteins, because of the speed of experiments, the amount of information generated, and the outstanding resolution and sensitivities offered.

Among various soft ionization techniques, ESI sources are best suited for direct analysis of biomolecules. ESI may function as a liquid sample introduction system and an ionization source at the same time. In ESI, the sample in a solution (typically a 50/50 mixture of water/methanol with 0.1-1% acetic or formic acid) enters a narrow capillary and leaves the capillary as a liquid spray. The voltage at the end of the capillary is significantly higher (3 to 5 kV) than that of the sampling inlet, so the sample is sprayed or dispersed into an aerosol of highly charged droplets. Evaporation of solvent decreases the size of the droplets. Because the electrically charged droplets retain their charge but get smaller, their electric field increases. At some point, mutual repulsion between like charges causes ions to leave the surface of the droplet. As a result, multiply charged ions from individual biomolecules, free from solvent, are released and enter the sampling inlet for analysis by a mass spectrometer. This process usually causes significant ion loss, and majority of ions are lost in this transfer, as discussed later in the present application. Except for MALDI and similar ionization methods that ionize samples in the high-vacuum region such as MALDI-2, most mass spectrometry techniques for analyzing biomolecules rely on interfaces or sampling inlets that deliver gas-phase molecular ions from atmospheric pressure or near atmospheric pressure to high vacuum through orifices or capillaries and forms an ion beam inside the instrument. Achieving high ion transfer efficiencies for mass spectrometers is crucial and challenging. Conductance limiting orifice plates enable differential pumping of various stages of a mass spectrometer. Smaller orifices enable operation with lower pumping capacities but result in lower ion transfer efficiencies. Larger-diameter orifices may improve efficiency of ion transfer but allow more neutrals to enter the vacuum region, thus requiring larger, higher-speed pumps to maintain the desired vacuum. Therefore, the pumping capacity of the vacuum system indirectly determines the ion transfer efficiency because the size and dimensions of the sampling inlet must be designed according to the pumping capacity of the vacuum system. Finding the right balance between the pumping capacity and the ion transfer efficiency is a challenge for mass spectrometers if a limited pumping capacity is available. Mass analyzers are the core components of mass spectrometers and are typically characterized by their mass range and resolution. Mass range is the maximum resolvable m/z by the analyzer. Resolution is an indicator of how selective a mass filter is in distinguishing ions with m/z that are close in value. Thus far, various mass analyzers with different mechanisms have been developed. Mass analyzers may be categorized into beam analyzers, such as quadrupole and TOF analyzers, and trapping analyzers, such as ion traps. Other types of mass analyzer include quadrupole mass analyzer, time of flight mass analyzer, magnetic sector mass analyzer, electrostatic sector mass analyzer, quadrupole ion trap mass analyzers, Orbitrap®, or Fourier-transform ion cyclotron resonance (FTICR). Embodiments of the present disclosure may use one or more, or any combination of these mass analyzers.

Faraday cup, Channel Electron Multiplier (CEM), and micro channel plate (MCP) detectors are the three most widely used ion detectors in mass spectrometry. Faraday cups may operate at high pressures (up to atmospheric pressure), but are less sensitive, and may not be compatible with high-resolution mass spectrometry due to slow response times. CEMs and MCPs offer or provide high mass resolution, dynamic range, and detection sensitivity. Most modern MCP detectors include two MCPs, with angled channels rotated 180° from each other, producing a chevron (v-like) shape. The angle between the channels reduces ion feedback. In a chevron MCP, the electrons that exit the first plate initiate the cascade in the next plate. The advantage of the chevron MCP over the straight channel MCP is significantly more gain at a given voltage. The two MCPs may either be pressed together or have a small gap between them to spread the charge across multiple channels.

FIGS. 4 and 5 shows closeup views of two typical front-end modules of a mass spectrometry system. An electrospray source 41,51 produces a spray 42,52. The spray 42,52 is sampled by a capillary inlet 43,53 (also called sampling inlet, ion transfer tube, or atmospheric pressure sampling inlet). A multipole ion guide 44 or an ion funnel 55 guides ions in the firsts vacuum region (0.1-10 Torr) and towards the ion guides 46,56 in second vacuum region (at pressure <0.1 Torr) through conducing limiting orifice plates. FIGS. 4 and 5 show examples of front-end or front-end modules in the present application. The continuous atmospheric pressure interface enabled by differential pumping is a sampling mechanism that uses multi-stage vacuum pumps for differential pumping, to provide gradual pressure reduction to transport ions from atmospheric pressure to high vacuum.

Ion transfer tubes 43,53, also known as capillaries, are well known in the mass spectrometry art for the transport of ions between an ionization chamber maintained at or near atmospheric pressure and a second chamber 45,54 maintained at reduced pressure. An ion transfer channel typically takes the form of an elongated narrow tube (capillary) having an inlet end open to the ionization chamber and an outlet end open to the second chamber having reduced pressure. Ions, together with charged and uncharged particles (e.g., partially desolvated droplets from an electrospray or APCI probe, or ions and neutrals and substrate/matrix from a Laser Desorption or MALDI source) and background gas, enter the inlet end of the ion transfer capillary and traverse its length under the influence of the pressure gradient. The ion/gas flow then exits the ion transfer tube as a free jet expansion. The ions may subsequently pass through the aperture of a skimmer cone through regions of successively lower pressures and are thereafter delivered to a mass analyzer for acquisition of a mass spectrum. There is a significant loss in existing ion transfer arrangements, so that the majority of those ions generated by the ion source do not succeed in reaching and passing through the ion transfer arrangement into the subsequent stages of mass spectrometer. Transportation of ions from an atmospheric pressure ion source to the first vacuum stage of a mass spectrometer through an ion transfer tube is not very efficient: the majority of the ions may not be transmitted. Various theories point at different places where the loss occurs and different mechanisms for the lack of ion transmission, such as atmospheric pressure, the solvated ions need to escape the droplets, evaporating droplets with Coulomb explosions repelling ions away from the inlet of the mass spectrometer etc. Various ways to improve the ion transmission have been proposed.

A number of methods have been reported in prior art US2009/0321655 A1 to address this problem and repeated here. For example, heating the ion transfer tube to evaporate residual solvent and improving ion production and/or transfer and to dissociate solvent-analyte adducts. Other methods are described that use a counterflow of heated gas to increase desolvation before the spray enters into the transfer channel. Alignment and positioning of the sample spray, the capillary tube, and the skimmer are reported to increase the number of ions from the source that are actually received into the ion optics of the mass spectrometers downstream of the sampling inlet. It is reported that a significant number of the ions entering the ion transfer tube may be lost via collisions with the tube wall, diminishing the number of ions delivered to the mass analyzer and adversely affects instrument sensitivity. It is reported that for tubes constructed of a dielectric material, collision of ions with the tube wall results in charge accumulation and inhibit ion entry to and flow through the tube. A number of ion transfer tube designs are reported to reduce ion loss by decreasing interactions of the ions with the tube wall, or by reducing the charging effect. For example, U.S. Pat. No. 5,736,740 to Franzen describes decelerating ions relative to the gas stream by application of an axial DC field, and the parabolic velocity profile of the gas stream (relative to the ions) produces a gas dynamic force that focuses ions to the tube centerline. U.S. Pat. No. 6,486,469 to Fischer describes techniques for minimizing charging of a dielectric tube by coating the entrance region with a layer of conductive material connected to a charge sink. Funneling ions entering from atmosphere towards a central axis is another approach. U.S. Pat. No. 6,107,628 describes an ion funnel for operation under vacuum conditions after an ion transfer capillary. Another approach is described in U.S. Pat. No. 6,943,347 to Willoughby that provides a stratified tube structure having axially alternating layers of conducting electrodes, and accelerating potentials are applied to the conducting electrodes to minimize field penetration into the entrance region and delay field dispersion until viscous forces are more capable of overcoming the dispersive effects arising from decreasing electric fields. U.S. Pat. No. 6,486,469 to Fischer describes techniques for minimizing charging of a dielectric tube by coating the entrance region with a layer of conductive material connected to a charge sink. The use of tubes made of so called "resistive glass" has been reported as an alternative approach of providing an electric field along the tube axis in U.S. Pat. No. 5,736,740. U.S. Pat. No. 6,943,347 by Willoughby and Shechan describes reducing the entrance losses of ions into an ion transfer tube at atmospheric pressure such that the commonly used metal tube is replaced with a stack of laminated sheets of alternating layers of dielectric and metal electrodes with a lumen or bore provided through the stack.

The present applications disclose a different approach for solving the ion transfer problem-instead of improving ion transfer in the capillary such as those disclosed in prior art, one or more embodiments of the present application discloses improving the transfer efficiency by employing two or more ion transfer tubes such that each ion transfer tube transfer ions and/or provides substantially similar or identical ion beams to two or more different ion trapping device or mass spectrometers as disclosed in detail later in the present application.

FIGS. 6-10 show the common prior art mass spectrometry instrumentation that are single beam instruments and only a single beam from an ion source is directed to one or more mass analyzers of these mass spectrometers. FIG. 6 is a triple quadrupole mass spectrometer. In this mass spectrometer, ions are produced with an electrospray ion source 61 and then they are introduced from front-end module 62 as a single ion beam shown by the dashed line, as discussed above, and enter a resolving quadrupole 63, a collision cell 64 (which may also act as an ion trapping device), and a second resolving quadrupole mass analyzer 65. The ions are finally detected by the detector 66. FIG. 7 shows a trapping electrostatic analyzer, also known as an Orbitrap® analyzer, in which ions are produced and introduced with an electrospray ion source 71 from the front-end module 72, pass a first ion guide or a resolving quadrupole 73, accumulated in the C-trap 74, optionally fragmented in the collision cell 75, and analyzed in the mass analyzer 76. FIG. 8 is a quadrupole time of flight (TOF) analyzer in which ions 81 enter via the front-end module 82, pass the resolving quadrupole analyzer 83, fragmented and/or accumulated in the collision cell 84, and then an orthogonal injector 85 injects the ions into the reflectron 86 TOF analyzer, and ions are detected by the detector 87. FIG. 9 shows a an Orbitrap® analyzer of FIG. 7, in which ions are produced and introduced with an electrospray ion source 91 from the front-end module 92, pass a first ion guide or a resolving quadrupole 93, accumulated in the C-traps 94*a-c*, optionally fragmented in the collision cells 95*a-b*, and the ions are routed to Orbitrap® analyzers 96*a-c*. FIG. 10 shows an example of a multi analyzer instrument or a hybrid mass spectrometer, in which ions are produced and introduced with an electrospray ion source 101 from the front-end module 102, pass a first ion guide or a resolving quadrupole 103, accumulated in the C-trap 1044, optionally fragmented in the collision cell 106, and analyzed in the mass analyzer 105, or the ions are injected by an orthogonal injector 107 into the reflectron 108 TOF analyzer, and ions are detected by the detector 109. The mass spectrometry system in these prior art mass spectrometers receive a single stream of ions from the ion source and a portion of the ion beam is directed to one or more mass analyzers. In other words, these instruments use a single ion beam and allocate the single ion beam inside the instrument to one or more mass analyzers. One or more embodiments of the present application discloses producing multiple ion beams from an ion source, and simultaneously or with a delay, directing each of the multiple ion beams to two or more separate mass spectrometer (separate mass spectrometers meaning each receive a single and/or independent, and/or allocated ion beam from the ion source) such that the total number of ions delivered to each instrument remains the same to those shown in FIGS. 6-10. In other words, one or more embodiments of the present applications allows a single ion source to feed all of the mass spectrometers shown in FIGS. 6-10 at the same time. In yet other words, each ion source is sufficiently "bright" to provide ion beams to all instruments and one or more embodiments of the present application discloses using multiple ion beams from a single ion source to different mass spectrometers. In some embodiments, the mass spectrometers communicate, interact, cooperate, or synchronized with each other. In other embodiments, mass spectrometers function independent of each other, or do not communicate, interact, or cooperate with each other and are not synchronized.

SUMMARY

One or more embodiments of the present disclosure relates to methods and systems for mass spectrometry. More specifically, embodiments of the present disclosure relate to methods and systems for improving performance of mass spectrometry systems. Embodiments of the present disclosure relate to methods and systems for improving performance of mass spectrometry systems, multi-beam mass spectrometry, parallel-beam mass spectrometry, and deterministic mass spectrometry.

In one or more embodiments, a mass spectrometry system includes an ion source that produces ions, and two or more ion trapping devices or mass spectrometers, each having an independent sampling inlet, the two or more ion trapping devices or mass spectrometers receiving the ions from the ion source via the sampling inlet of each of the ion trapping devices or mass spectrometers. In one or more embodiments, the two or more ion trapping devices or mass spectrometers function independently of each other and are not synchronized. In one or more embodiments, one of the two or more ion trapping devices or mass spectrometers provides a higher resolution, higher sensitivity, different scale for a dynamic range, separation based on ion mobility, or different tandem mass spectrometry capability compared to the others of the two or more ion trapping devices or mass spectrometers of the mass spectrometry system. In one or more embodiments, the two or more ion trapping devices or mass spectrometers are in communication with each other. In one or more embodiments, the two or more ion trapping devices or mass spectrometers are in communication with each other, a first ion trapping device or mass spectrometer acquires data, the acquired data is processed to generate data acquisition parameters, and the generated data acquisition parameters are distributed to other ion trapping devices or mass spectrometers to acquire data based on the generated data acquisition parameters. In one or more embodiments, each ion trapping device or mass spectrometer acquires data and submits or transmits the acquired data to a central processing unit, the central processing unit receives the submitted data, and generates a data set based on the received data from each ion trapping device or mass spectrometer, and the data set includes any combination of molecular masses of measured compounds, fragments of measured compounds, mass to charge ratios of measured compounds, mass to charge ratios of fragments of measured compounds, elution times of measured compounds, signal intensities of measured compounds, relative or absolute abundance of measured compounds, intensity ratio of measured compounds, ion mobilities of measured compounds, or structural information of measured compounds.

In one or more embodiments, the two or more ion trapping devices or mass spectrometers are synchronized and process, in parallel, the received ions simultaneously or with a delay. In one or more embodiments, the two or more ion trapping devices or mass spectrometers are synchronized and process the received ions with a time delay with respect to each other, the time delay is a cycle time of the mass spectrometry system, the process includes accumulating the ions for a predetermined time period (accumulation time) and analyzing the accumulated ions, a first ion trapping device or mass spectrometer starts accumulating the ions at a first point in time (T1) for a predetermined time period (accumulation time) and a second ion trapping device or mass spectrometer starts accumulating the ions at a second point in time (T2) later than the first point in time (T1) for the predetermined time period (accumulation time), and the predetermined time period (accumulation time) is greater than the time delay (T2−T1), the time delay (T2−T1) being a duration of time between the first point in time (T1) and the second point in time (T2), and the time delay, which is the cycle time of the mass spectrometry system, and the predetermined time period, which is the accumulation time of each ion trapping device or mass spectrometer, are adjustable independently, In one or more embodiments, the predetermined time period (accumulation time) of the mass spectrometry system is independently adjusted to measure compounds by the mass spectrometry system with a higher sensitivity compared to same measurements performed by each of the two or more ion trapping devices or mass spectrometers of the mass spectrometry system, and the cycle time of the mass spectrometry system is independently adjusted to acquire a predetermined number of data points across a chromatographic peak irrespective of the predetermined time period (accumulation time). In one or more embodiments, one of the two or more ion trapping devices or mass spectrometers of the mass spectrometry system first measures m/z values and signal intensities via a survey scan, the measured m/z values are grouped based on their signal intensities, each group including m/z values that their corresponding signal intensities are within a predetermined range, and each group is assigned to another of the ion trapping devices or mass spectrometers to only measure the assigned m/z values in the assigned group.

In one or more embodiments, each predetermined range has a lower value and a higher value that defines the range, a lower value of a first range is lower than a higher value of a second range such that the two ranges overlap, signal intensities of m/z values that reside in the overlapping range are measured by both a first ion trapping device or mass spectrometer measuring the first range and a second ion trapping device or mass spectrometer measuring the second range, the measurements of the signal intensities in the overlapping range are used to generate a calibration ratio, and the signal intensity measurements of the first ion trapping device or mass spectrometer and the signal intensity measurements of the second ion trapping device or mass spectrometer that are not in the overlapping range are normalized based on the calibration ratio. In one or more embodiments, each of the two or more ion trapping devices or mass spectrometers are tuned to measure a predefined dynamic range and ignores any measurement that is not within the predefined dynamic range. In one or more embodiments, each of the two or more ion trapping devices or mass spectrometers acquire data for the N most abundant peaks, next N most abundant peaks, and so and so forth, N being an integer number between 1 and 100.

In one or more embodiments, a first number of the two or more ion trapping devices or mass spectrometers use DIA and a second number of mass spectrometers use DDA method to acquire data. In one or more embodiments, the ions are simultaneously transferred to the two or more ion trapping devices or mass spectrometers via ion guides located downstream the sampling inlet. In one or more embodiments, a set of instructions are distributed to the two or more ion trapping devices or mass spectrometers, the setup instruction including information about modes of operation, m/z range, accumulation times and other predefined setting required for operating the two or more ion trapping devices or mass spectrometers in a network. In one or more embodiments, the two or more ion trapping devices or mass spectrometers are grouped into one or more clusters and each cluster is operated based on a pre-defined set of parameters. In one or more embodiments, one of the two or more ion trapping devices or mass spectrometers acquires metabolomics data or low mass range data and another of two or more ion trapping devices or mass spectrometers acquires proteomics data or high mass range data.

In one or more embodiments, a method includes producing gas-phase ions from a sample, introducing the gas-phase ions to a first mass spectrometer and a second mass spectrometer for mass spectrometry analysis, acquiring mass spectrometry data from both the first mass spectrometer and the second mass spectrometer, using both the mass spectrometry data acquired from the first mass spectrometer and the mass spectrometry data acquired from the second mass spectrometer, and producing aggregate data from the mass spectrometry data acquired from the first mass spectrometer and the mass spectrometry data acquired from the second mass spectrometer for the mass spectrometry analysis of the sample to identify or quantify compounds in the sample. In one or more embodiments, one of the two or more ion trapping devices or mass spectrometers acquires data in positive ion mode and another of two or more ion trapping devices or mass spectrometers acquires data in negative ion mode.

In one or more embodiments, the gas-phase ions are introduced to the first mass spectrometer and the second mass spectrometer via a first inlet of the first mass spectrometer and a second inlet of the second mass spectrometer. In one or more embodiments, the gas-phase ions are introduced to the first mass spectrometer and the second mass spectrometer simultaneously or in parallel. In one or more embodiments, the ions are introduced to the second mass spectrometer with a predetermined delay with respect to the ions introduced to the first mass spectrometer, the first mass spectrometer and the second mass spectrometer communicate with each other, and share acquired mass spectrometry data or acquisition parameters, and the second mass spectrometer acquires mass spectrometry data based on the acquired mass spectrometry data or the acquisition parameters of the first mass spectrometer.

In one or more embodiments, an apparatus includes an ion source that produces ions from sample, two or more ion transfer tubes that receive the ions from the ion source, two or more ion guides that receive the ions from the two or more ion transfer tubes, one or more mass spectrometers that receive ions from the two or more ion guides such that the ions reach the one or more mass spectrometers via the two or more of the ion guides, for example flexible or rigid ion guides or ion trapping devices. In one or more embodiments, at least one or more of the two or more ion transfer tubes are connected to each of the two or more ion trapping devices, the two or more ion guides, or the two or more ion mobility devices. In one or more embodiments, a mass spectrometry system includes an ion source that produces ions, a plurality of ion transfer tubes, one or more of the plurality of ion transfer tubes connected to two or more different mass spectrometers via one or more ions guides that extend from each mass spectrometer such that the two or more mass spectrometers are in communication with each other to schedule and arrange synchronized data acquisition, the plurality of ion transfer tubes are bundled to each other and located in front of the ion source. In one or more embodiments, the ion source is a multi-emitter electrospray ion source, the electrospray ion source connected to a liquid chromatography column. In one or more embodiments, the plurality of ion transfer tubes and the ion sources are both made in form of an array such that each emitter of the ion source is directly facing and introducing ions into each of the ion transfer tubes. In one or more embodiments, the bundle of the ion transfer tubes, and the emitters of the multi-emitter ion source are made in form of an array, the array including any number of rows or columns. In one or more embodiments, the mass spectrometers are operated as a network and are synchronized with each other and acquire data with a predefined setting, delay with respect to each other. In one or more embodiments, each mass spectrometer in a cluster of mass spectrometers acquire data for the 20 most abundant peaks, next 20 most abundant peaks, and so on. In one or more embodiments, in each mass spectrometer cluster, the first mass spectrometer acquires data in form of DDA for 20 peak of certain nature, or abundance, for example, the first mass spectrometer measures the 20 most abundant peaks, the next mass spectrometer measures the next 20 more abundant peaks, etc. In one or more embodiments, first, one of the mass spectrometers analyzes samples without LC separation to determine the most abundant peaks, and then the most abundant peaks are communicated to the other mass spectrometers, wherein the other mass spectrometers analyze the sample after LC separation. In one or more embodiments, a first number of mass spectrometers use DIA and a second number of mass spectrometers use DDA method to acquire data.

In one or more embodiments, a method for mass spectrometry includes producing ions from a single multi-emitter electrospray ion source, sampling the ions with a plurality of ion transfer tubes, simultaneously transferring ions to a plurality of mass spectrometers via ion guides located after ion transfer tubes, performing mass spectrometry analysis of ions by the plurality of mass spectrometers. In one or more embodiments, a set of instructions are distributed to the mass spectrometers, the setup instruction including information about modes of operation, m/z range, accumulation times and other pre-defined setting required for operating mass spectrometers in a networked manner. In one or more embodiments, mass spectrometers are grouped into one or more clusters and each cluster operated under a pre-defined set of parameters. In one or more embodiments, mass spectrometers are grouped into one or more clusters and the mass spectrometers in each cluster provide a certain dynamic range and the analysis in each mass spectrometer is performed according to the dynamic range settings of each mass spec. In one or more embodiments, a mass spectrometry system includes an ion source that is configured to produce a plurality of ion beams such that each ion beam is provided to a separate mass spectrometer from a plurality of mass spectrometers for mass spectrometry analysis. In one or more embodiments, the ion source is an electrospray ion source or a multi-nozzle electrospray ion source. In one or more embodiments the plurality of mass spectrometers are in communication with each other or interact with each other or are synchronized with each other. In one or more embodiments a result of mass spectrometry analysis is generated by combining the measurements of the plurality of mass spectrometers.

BRIEF DESCRIPTION OF DRAWINGS

Certain embodiments of the present disclosure are described with reference to the accompanying drawings. However, the accompanying drawings illustrate only certain aspects or implementations of the present disclosure by way of example and are not meant to limit the scope of the claims.

FIG. 20A-D show mass spectrometry measurement of elution profiles and constructing data set or a super mass spectrum in accordance with one or more embodiments of the present disclosure.

DETAILED DESCRIPTION

Specific embodiments are disclosed with or without reference to the accompanying drawings. In the following description, numerous details are set forth as examples of the present disclosure. It will be understood by those skilled in the art that one or more embodiments of the present disclosure may be practiced without these specific details and that numerous variations or modifications may be possible without departing from the scope of the invention. Certain details known to those of ordinary skill in the art are omitted to avoid obscuring the description.

One or more embodiments of the present application discloses systems and methods for mass spectrometry that enables and allows for analyzing complex mixtures in a sample such that the mass spectrometry system is scalable to scale sensitivity, scalable dynamic range, and scalable scan speed, for example, by adding additional mass spectrometers to the mass spectrometry system. In one or more embodiments, the present application discloses systems and methods for acquiring any number of data points of a chromatographic peak while maintaining high sensitivity and/or high dynamic range for the measurements. One or more embodiments of the present applications discloses a mass spectrometry system in which a duty cycle of the mass spectrometry system and the ion accumulation times and/or dwell times that define or determine the sensitivity of the measurements are independently adjustable such that a duty cycle of the system is shorter in time than the ion accumulation times and/or dwell times of each mass spectrometer of the mass spectrometry system. This provides significant advantages. For example, the ion accumulation times may be adjusted to be longer in duration than the duty cycle of the system. This is impossible to achieve with conventional mass spectrometer described in prior art and shown in FIGS. 6-10.

Figure 11A:
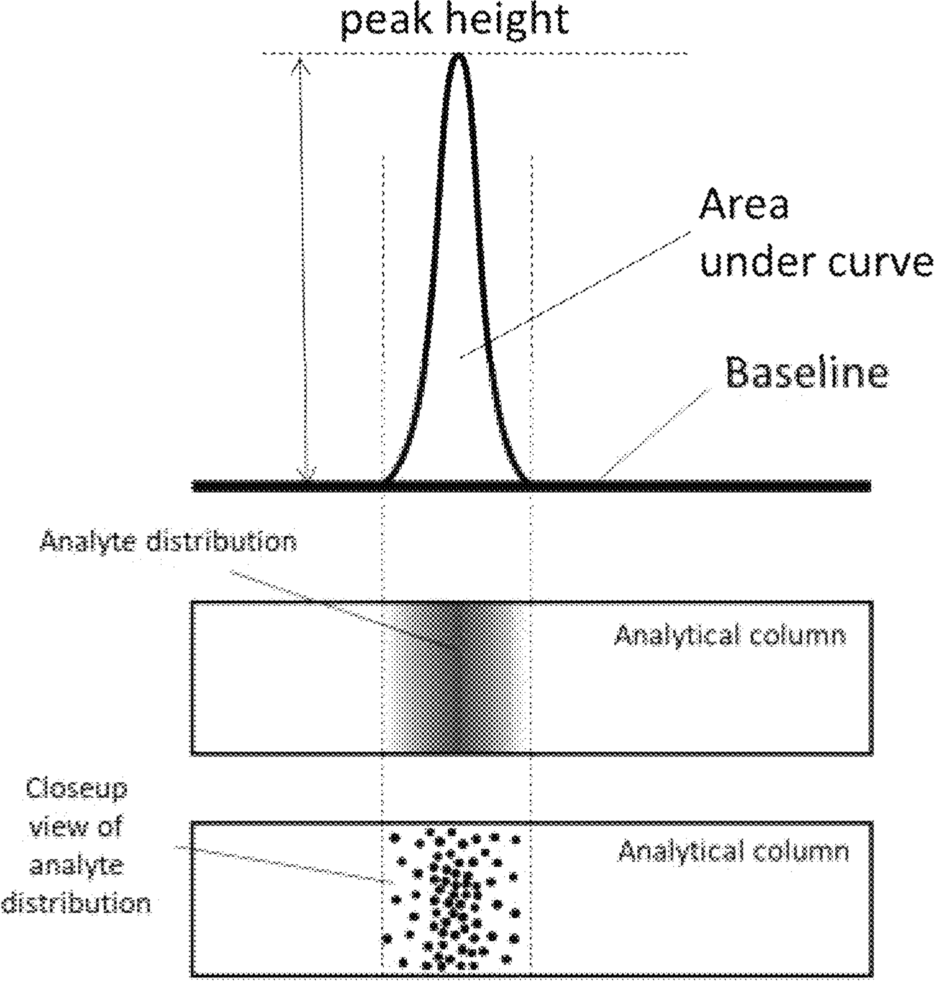
FIGS. 11A-B show a hypothetical elution profile of a single analytes in an analytical column and the corresponding chromatographic peak.
Figure 11B:
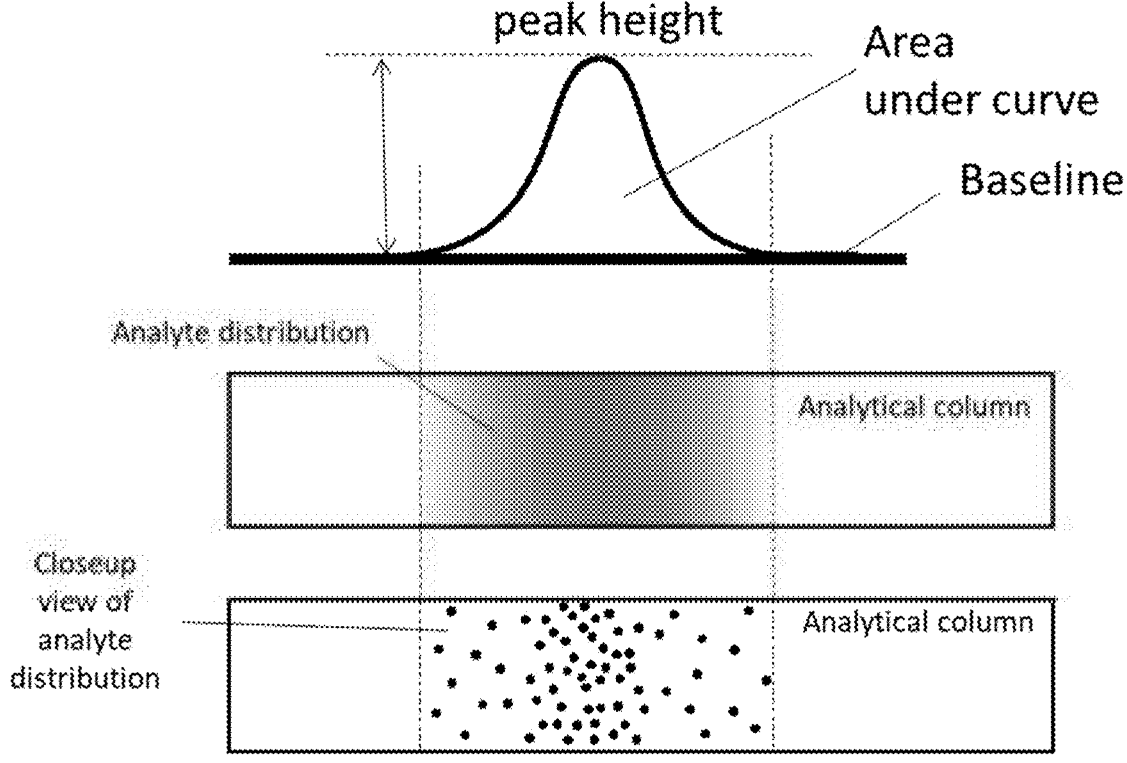

Mass spectrometers are often coupled with chromatography or other separation systems in order to identify and characterize eluting compounds of interest from a sample particularly when sample includes a complex mixture of compounds, for example in proteomics and metabolomics studies. FIGS. 11A-B show a hypothetical elution profile of a single analytes in an analytical column and the corresponding chromatographic peak and effects of peak broadening (shown in FIG. 11B). Elution profile is a time-based graphic output of the chromatograph which shows how much material (analyte of interest) is being carried out of the column by the eluent or buffering agent over time. Peak area is the area under the curve to its baseline. This is often correlated with the amount of analyte in sample, for example protein. Peak retention time is the time it takes for a peak to come off an analytical column. This may be measured from the start of a run to the apex of a peak of interest. The most common method is to measure from the injection of the sample to the apex of the peak. Retention volume is the volume of liquid needed to pass through analytical column to clute the peak from column. The most common method is to measure the volume from the injection of the sample to the apex of the peak, or measure the volume from the start of the run to the apex of the peak. Peak height is the distance from the bottom or baseline of the peak to its apex. The bottom of the peak is defined by either a zero-signal value (background noise) or a calculated baseline for increased accuracy. Relative area is the percentage of the entire calculated peak area represented by a single peak area. This is used to determine yield, purity, or level of contaminants. Injection point is the time at which the sample is injected into the column. For example, when using a sample loop, this is the point at which the loop is placed inline. This is often used as the zero time point for measuring peak retention time. Peak resolution is the relative distance between the apexes of two neighboring peaks. Width at half height (WHH or FWHM) is a measure of the separation efficiency. The lower the value, the thinner the peak and, therefore, the more efficient the column. In general, columns with smaller beads have lower values for WHH. WHH is equal to the distance between the peak boundaries at half the peak height. If the total number of molecules undergoing separation in an analytical column is constant, a separation method that results in a sharper peak (or a smaller or lower or narrower FWHM) produces a higher signal or a higher apex or a higher peak height in mass spectrometry measurements compared to another separation method that results in a broader peak (or larger or higher or broader FWHM). In other words, generally, eluting material that are spatially compact provide more molecules for mass spectrometry detection in an arbitrary time unit or period, and therefore, produce a more intense signal (this is of course assuming that the ion accumulation time are much smaller than the peak width and the same in both measurements). This is because in case of a broader peak, the molecules are spread in the analytical column, and therefore, at each point in time when the analytes are eluting from the analytical column, there is less analyte molecules to be ionized and measured compared to a sharper peak. Therefore, in theory, sharper peaks are advantageous both in separation (because in reduces overlapping peaks and increases resolution of separation) and measurement (because it improves signal to noise ratio of measurements by increasing the number of molecules in time that produce the signal in MS). However, as discussed later in this application, sharper peaks increase the burden on the mass spectrometer because it requires a faster measurement by the MS. Also, one skilled in the art understands that peak broadening, may also result in the apex of the peak to fall under a detection limit of the instrument, in which case, the mass spectrometry may not be able to produce any signal above noise level. The detection limit in MS. The instrument detection limit of a mass spectrometer may be defined as the lowest concentration of an analyte that may statistically be distinguished from the noise level. The detection limit may also be defined as the smallest amount (or concentration) of analyte that may be detected with an acceptable signal to noise ratio (typically 3). Also, while sensitivity in analytical chemistry is the slope of the calibration curve (plot of signal versus amount or concentration of analyte), however, as understood by those skilled in mass spectrometry, the term “sensitivity” or “sensitive” may be used by those in mass spectrometry field to refer to the minimum amount of analyte that may be detected by MS.

FIGS. 12A-E show effects of mass spectrometry sampling of a hypothetical elution profile of an analyte. Distribution of identical molecules in an analytical column is shown in the graphs appearing in the left side of the figures. This may or may not resemble or follow the elution profile detected, measured, and/or reconstructed by a mass spectrometer. In FIGS. 12A-E, the analyte molecules (e.g., having a gaussian profile) move in the direction of X axis in the column and the Y axis indicates the actual concentration profile, or the actual number of molecules, and therefore, the graph on the left shows the actual spatial concentration of the analyte molecules traveling in and eluting from an analytical column as it exists in the analytical column. The analyte molecules elute from the analytical column and get ionized by an electrospray ionization source and are introduced to and measured by a mass spectrometer. A goal of measurements is to accurately measure and reproduce this elution profile with highest possible sensitivity, accuracy, and dynamic range. That is, in an ideal measurement, elution profiles of any height, and any FWHM are accurately measured, and the area under the curve of each measured elution profile is used for calculating, or provides the accurate quantitation of analyte concentration in the sample (the m/z of precursor and fragment ions provide chemical tags or structure of the eluted compounds while the intensity measurements over time generate peak profile). The absolute quantitation may be achieved by using a calibrant molecule with known concentration. In some cases, isotopically calibrant molecules are used for this purpose and the area under the curve for the calibrant molecule is used for calculating or determining the absolute concentration of other molecules. A mass spectrometer is tasked with measuring this elution profile. There are different mechanisms that a mass spectrometer may measure this elution profile. Because practically there may be any number of co-eluting materials from the analytical column, a mass spectrometer is often tasked with measuring many co-eluting molecules in a scanning, sampling, polling, or discrete manner. That is, a mass spectrometer allocate a certain period of time in a duty cycle for each measurement. For example, a mass spectrometer may perform a first measurement in a fraction of duty cycle, move to the next measurement, and so on and so forth in a single duty cycle. Then, the mass spectrometer, re-starts the process in the next duty cycle and comes back and repeats the measurements starting with the first measurement. As understood by those skilled in the art, in conventional techniques, the duty cycle of a mass spectrometer, during which all required data is collected, should be defined or determined based on the width of elution profiles. That is, if the width of elution profile is narrow, a mass spectrometry measurement must be performed with a shorter duty cycle. It should be noted that in each discrete sampling (MS measurement), the more time a mass spectrometer allocates to the measurement, the more sensitive the measurement becomes. This is due to allowing a mass spectrometer to accumulate incoming ions before performing the measurement. In a sense, this is similar to exposure times in photography—when it is dark, higher exposure times allow for capturing more photons to produce an image. Similarly, affording higher accumulation time for a sampling event allows for producing a signal with a higher signal intensity or signal to noise ratio. As disclosed later in the present disclosure, embodiments of the present disclosure allows for a first mass spectrometer to first perform a survey scan to determine or measure a width or a FWHM of eluting peak profile. Then, after a certain delay defined by source delay, a second mass spectrometer may adjust its duty cycle based on the width or FWHM of the eluting peak profile measured by the first mass spectrometer for the measurements of the second mass spectrometer, and therefore, providing a deterministic approach on-the-fly or real-time approach for adjusting a duty cycle of the second mass spectrometer.

Figure 12A:
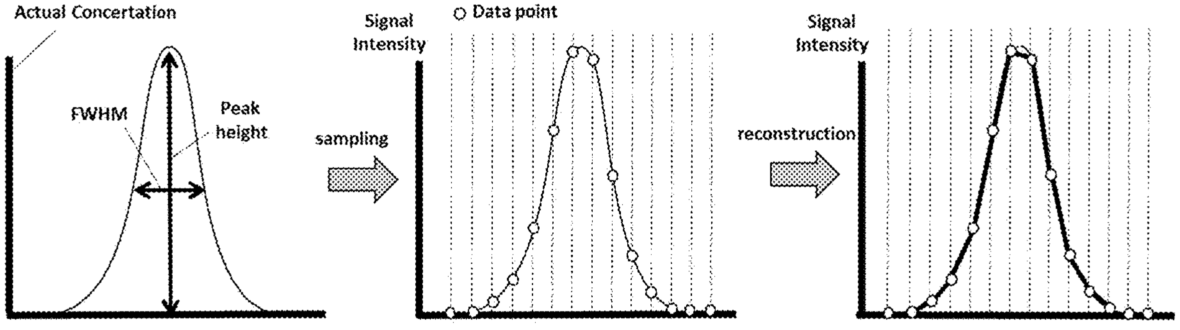
FIGS. 12A-E show effect of mass spectrometry sampling of a hypothetical elution profile of a single analyte.
Figure 12B:
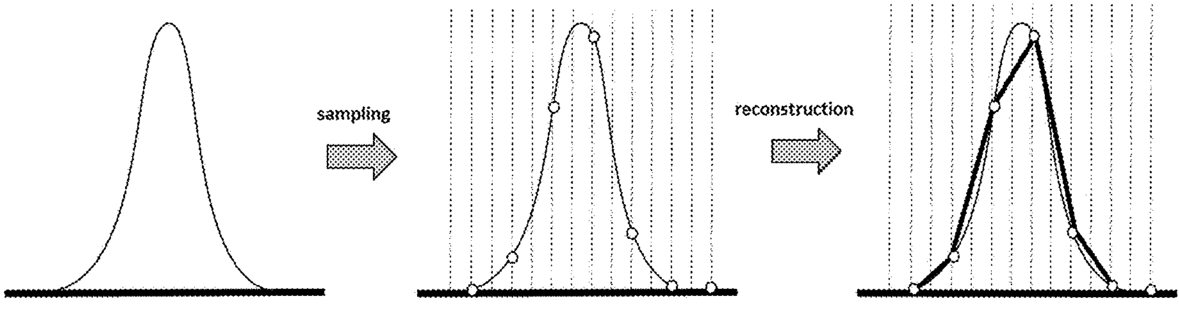
Figure 12C:
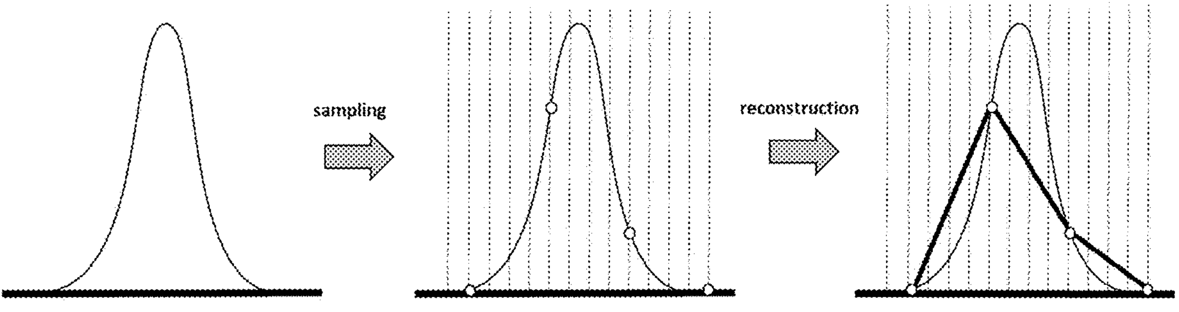
Figure 12D:
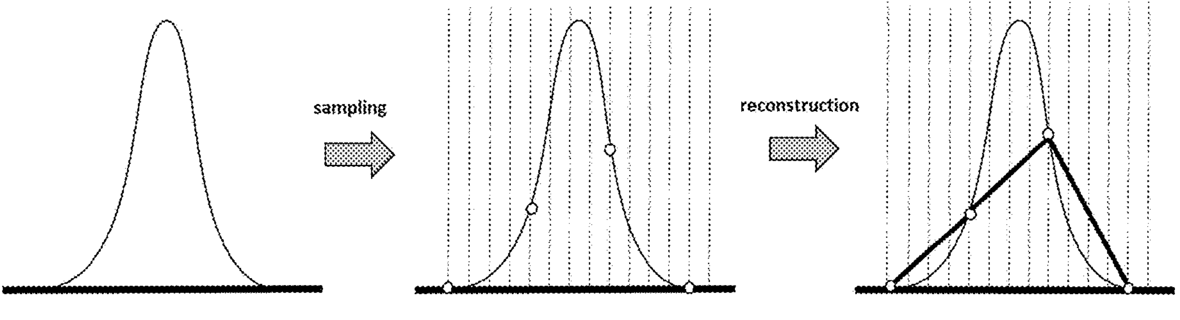
Figure 12E:
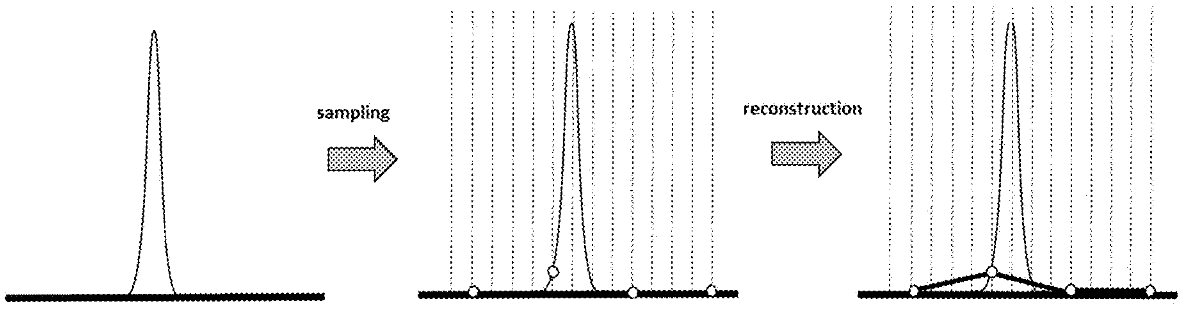

The middle graphs in FIGS. 12A-E show the sampling process by a mass spectrometer such that each sampling event produces a single data point (shown by circles on the graphs). The vertical grids in FIG. 12A-E on the middle and right graphs show a duty cycle (the time from a grid to the next grid is the duty cycle) of the mass spectrometry measurements in FIG. 12A. As shown in these figures, the duty cycle of measurements in FIG. 12B, FIG. 12C, FIG. 12D, and FIG. 12E, are two, four, four, and four times of the duty cycle of FIG. 12A, respectively. The right graph in FIGS. 12A-E show reconstruction of the measured elution profile using the data points produced by mass spectrometry measurement via linear interpolation. While the peak profile in the left graph and the middle graph might look the same height but they may be or may be not of the same height because Y axes in these two graphs are different—actual concentration vs signal intensity. As shown in these FIGS. 12A-E, the number of data points directly affect the quality and accuracy of reconstructing elution profile curves. When the width of elution profile is kept constant, a duty cycle is increased, the reconstructed peaks are with lower accuracy, and have a higher percentage error with respect to the profile of actual concentration of molecules in the elution profile. Also, as shown in FIG. 12C and FIG. 12D, when the duty cycle gets longer in time, the actual timing of sampling also defines the reconstructed peak profile. When the ratio of cycle time to the peak width exceeds a predetermined value (e.g., the cycle times becomes close to or equal with the peak width), the reconstruction error may render the measurement unreliable and useless. Therefore, mass spectrometers typically are tuned based on a width of the elution profiles and to produce accurate quantitative measurement, and the duty cycle of a mass spectrometer must be tuned such that the reconstructed elution profile closely resemble the actual elution profile. For this, those skilled in the art understand that the cycle times or scan rate of a mass spectrometer must be adjusted to acquire at least 8-20 data points across the elution profile peak or the chromatographic peak or curve. Each sampling event of a mass spectrometer produces a single data point (shown by white circles in the middle column). The elution profile of the analyte or the peak is reconstructed (shown on right) by interpolating acquired data points. The area under the curve of the reconstructed peak is used to calculate, determine, or estimate analyte concentration. As understood by those skilled in the art, acquiring sufficient data points is important for accurately measuring the concentration of an analyte. The effects of the sampling and reconstructing the analyte are shown in FIGS. 12A-E. For example, as shown in FIGS. 12B-D, if the mass spectrometer does acquire sufficient number of data points, the reconstructed elution profile (shown on right) may not be an accurate representation of the peak profile, and this introduces errors in quantitative measurement. This is particularly problematic if the sampling rate is much slower than the FWHM of the elution profile. It is possible that a slow sampling rate by a mass spectrometer would completely miss a peak that has smaller FWHM than the sampling rate as shown in FIG. 12E. In view of above, one or more embodiments of the present application discloses systems and methods to improve the sampling rate of a mass spectrometry system.

Figure 13A:
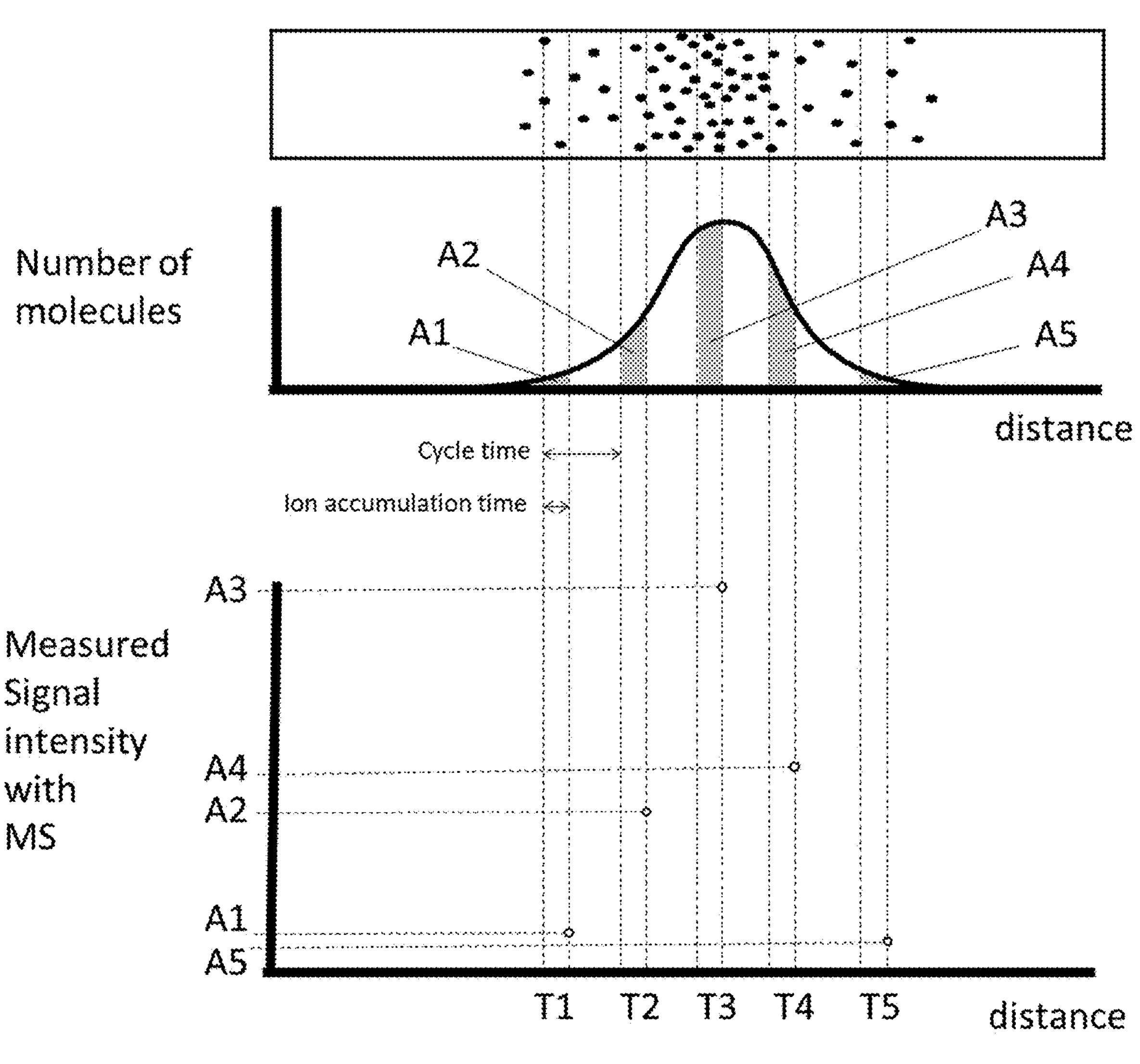
FIGS. 13A-C show the effect of cycle times and ion accumulation times on sensitivity of mass spectrometry measurements of elution profile of a single analyte.
Figure 13B:
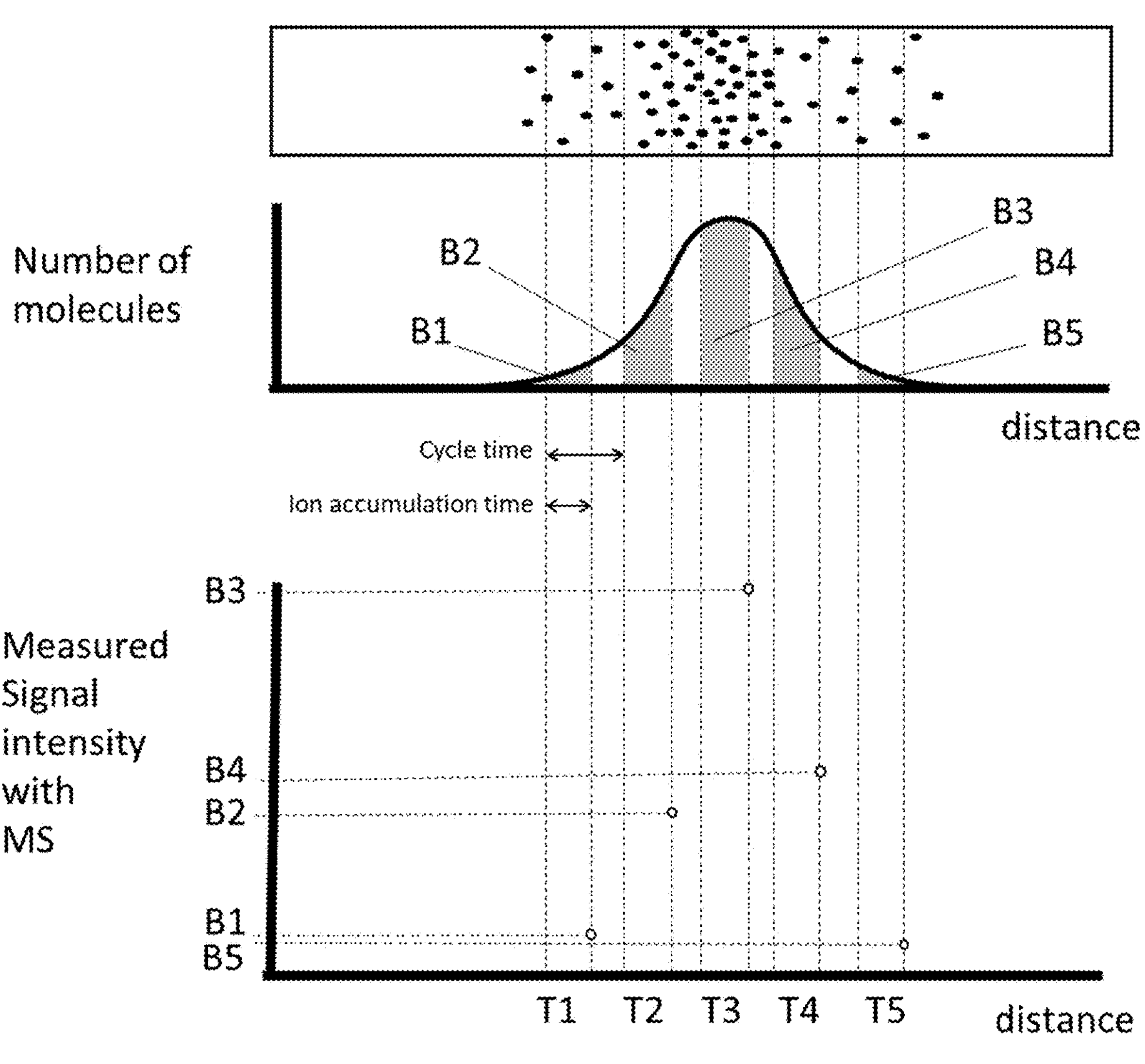
Figure 13C:
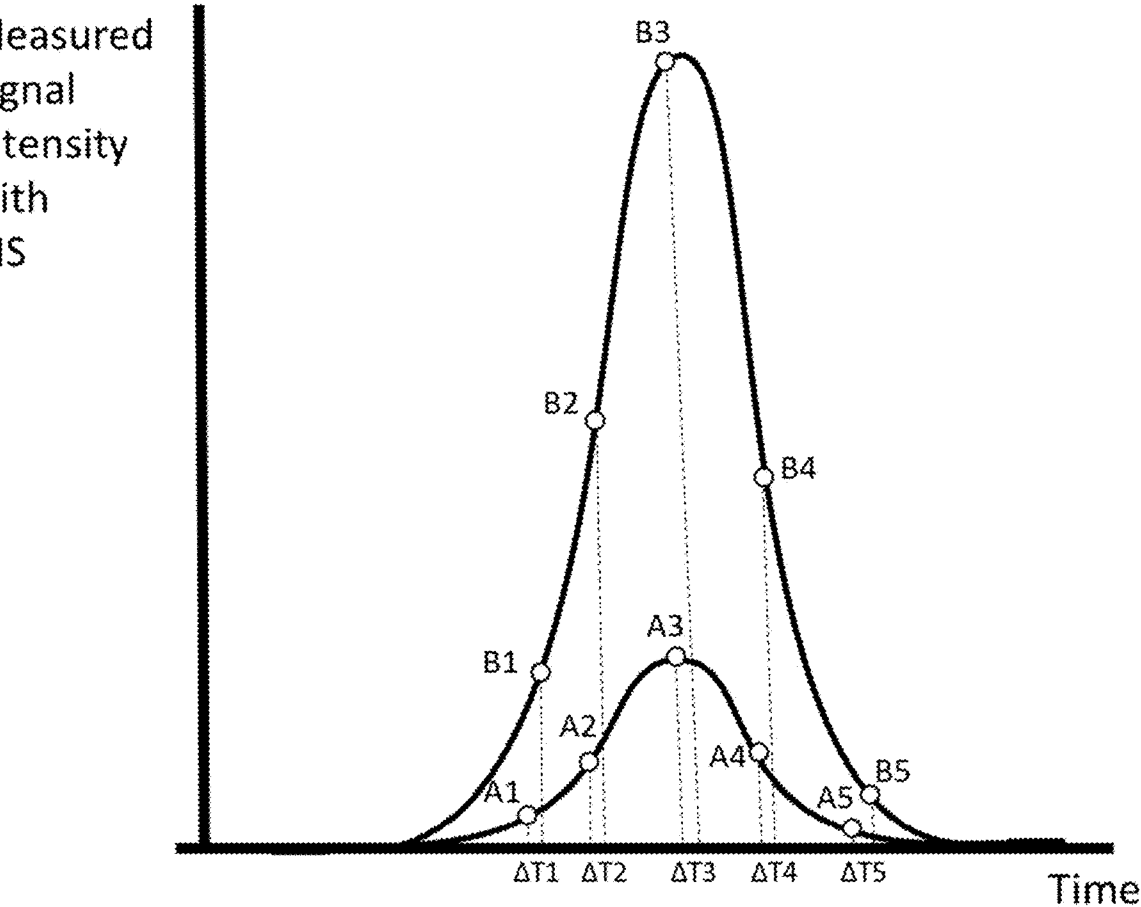

FIGS. 13A-C show the effect of cycle times and ion accumulation times on sensitivity of mass spectrometry measurements of elution profile of a single analyte. These figures provide more context to the previous discussions. As shown in FIG. 13A, a mass spectrometer starts accumulating ions from analyte molecules at the start of the time interval T1. At the end of the time interval T1, the mass spectrometer produces a signal or a data point (A1), the intensity of which is proportional to the number of analyte molecules accumulated in each time interval or the abundance of molecules in that time period or interval. In other words, the mass spectrometer counts the ions in that interval and A1 is a representation or indication or measurement of the number of ions measured. The time duration between the end of T1 and start of T2 are used for other measurements or performing tasks (or measurements) unrelated to measuring the peak profile of FIGS. 13A-B. In the next cycles (or duty cycle; each cycle or duty cycle being start of T(n) to start of T(n+1)), the mass spectrometer repeats this process in T2, T3, T4, and T5 to obtain the data points A2, A3, A4, and A5, respectively. Then, reconstruction of the elution profile measurements is performed by interpolating data points A1-A5. The area under the reconstructed elution profile indicates the absolute (or relative) concentration of the analyte. The maximum point in the peak indicates the elution time of the peak and is used as another indicator to identify the eluted compound.

Now turning to FIG. 13.B, if the ion accumulation time or the time intervals (T1-T5) are increased, the measured signal by the mass spectrometer increases because of increasing the signal to noise ratio of measurement. Therefore, longer ion accumulation times (T1-T5 of FIG. 13B compared to T1-T5 of FIG. 13A) results in B1>A1, B2>A2, B3>A3, B4>A4, and B5>A5 as shown in FIG. 13C. In other words, increasing T1-T5, or in other words, increasing the ion accumulation times for measuring the elution profile results in more sensitive measurements or higher signal intensities. The increase signal intensities result from allocating a larger portion of the cycle time to produce each data point. This may be particularly advantageous for measuring less abundance ions as an apex of elution profile of the less abundance species may be below the detection limit of the instrument (e.g., may be defined as 3 times the standard deviation of the instrument background noise). Therefore, if A3 falls below the detection limit, increasing ion accumulation time as shown in FIG. 13B may result in a data point (B3) that is above the detection limit. However, as noted, this requires allocation a larger portion of the cycle time for this measurement. It is noted that each of B1 data points has a deltaT1 delay with respect to A1 data point such that the deltaT1 represents the additional ion accumulation time of ions to acquire datapoint B1 compared to A1.

One or more embodiments of present application provides an advantage that ion accumulation time of a measurement exceeds the cycle time at which the mass spectrometry system as a whole functions. Sensitivity and scan speed (number of cycles per second or number of duty cycles per second) are commonly used terms to generally describe the analytical performance of a mass spectrometer. Sensitivity typically indicates the magnitude of the signal produced by a specific analyte in the ion detector. Because numerous design aspects of an instrument affect sensitivity, it may be regarded as an important indicator for judging the analytical performance of a mass spectrometry system. For the sake of discussions herein, it is helpful and more intuitive to view sensitivity from a "molecular lens", that is, in terms of the absolute number of identical analyte molecules (prior to ionization) and ions (after ionization) per unit time traveling through the system from point of injection in LC to detection on detector. To achieve a higher signal to noise ratio (S/N), and therefore, a more sensitive measurement, identical analyte molecules in sample should reach the ion detector compressed in time dimension (to increase S) and as interference-free as possible (to decrease N). Faster LC gradients that result in sharper peaks, and frontend IM separation or filtering techniques that accumulate ions prior to resolving and detecting ions at the mass analyzer both favor more sensitive measurements via compressing analyte molecules or ions in time scale (improving S) and removing interfering species (reducing N). Scan speed (or scan frequency) of an instrument defines the rate at which a full cycle (or a duty cycle) of MS1 and MS1/MS2 acquisitions is complete, and the instrument is ready to start the next full cycle. Scan speed is one of the important metrics in LCMS workflows, and a proper scan speed is required to provide adequate data points for accurate quantification of an LC curve.

Figure 20A:
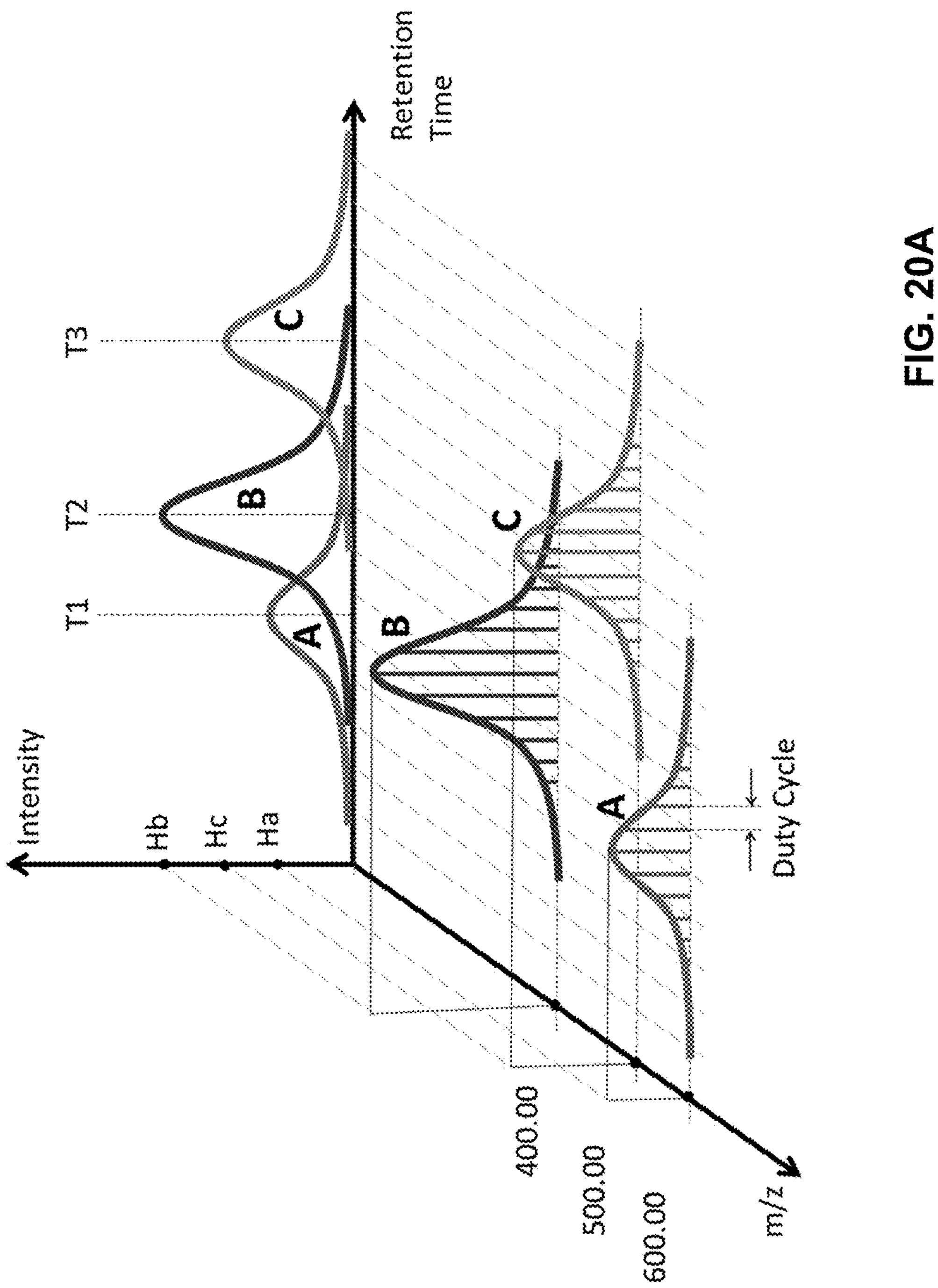

Depending on the technology and setup of an instrument, acquiring the MS1 and MS1/MS2 acquisitions may involve different steps, each taking a certain period of time. Generally, a portion of the full cycle (also referred to as the cycle time or the scan time) is spent without acquiring spectral data. This portion of the full cycle may be consumed by the time required for ion accumulation, ion injection, interscan transition delays, post-acquisition data processing to produce recordable spectra, etc.) during which no electrical signal from the detector is expected. Then, there is this time period in each full cycle during which the instrument's detector measures ions and electrical signals are expected. While duty cycle is defined as a ratio of the time spent for measuring ions (Tion) to the cycle time (Tcycle), and reflects a utilization of cycle time that is actually allocated to the act of ion measurements by the detector, in the present disclosure duty cycle and cycle time may be used interchangeably, for example as shown in FIG. 20A and FIG. 18B. Similar to cycle time, duty cycle may be merely a timing metric, and it may indicate the amount of time an instrument spends to measure ions. Duty cycle and cycle time may be or may not be used interchangeably, and while duty cycle may have some effects on sensitivity, it may not be a direct indication of sensitivity or efficiency of ion measurements. Duty cycle may indicate what percentage of the cycle time is allocated to the process of measuring ions with the detector, or how efficiently ions are used or analyzed in the system or the quality of the measurements. Duty cycle may indicate when an ion detector is busy or idle or may indicate cycle time as used in the present disclosure.

A mass spectrometer may acquire 8 to 20 data points, each in a different cycle, to define an LC curve that corresponds to the concentration of analytes eluting from LC system. Then, the area under the acquired LC curve is used for relative or absolute quantification. Long cycle times that do not provide the required number of data points to accurately define a chromatographic peak reduce quantification accuracy. This may also be viewed in the context of peak capacity of an LCMS system. A faster LC gradient that produces narrower and sharper LC peaks theoretically provides an opportunity for more sensitive measurements. But at the same time, narrower and sharper peaks require that the mass spectrometer scan at a faster rate, thus reducing the cycle time and the available budget for ion accumulation time (or dwell time) in each measurement, and reducing sensitivity. When a mass spectrometer is tasked with scanning more than a few MS1/MS2 transitions, acquiring the required data points across the LC peak for accurate quantification places a burden on the cycle time of the mass spectrometer. If the transitions are discrete, the instrument's interscan delay may further consume valuable cycle time. Thereby, the advantages provided by faster LC gradients and the opportunity for taking more sensitive measurements is only available if an instrument may maintain a constant sensitivity at a faster scan rate (a shorter cycle time). Conventionally, maintaining a constant sensitivity requires that a shorter cycle time is achieved without changing critical timing in each cycle that affect sensitivity, such as ion accumulation times. However, all available parameters at a user's disposal for adjusting the scan rate are, in fact, those that affect sensitivity, such as dwell times and number of transitions. All other timings are hardwired in the system and determined by the instrument's electronics and are not adjustable. One or more aspects of the present application discloses mechanisms, methods, and systems that provide faster scan speeds while maintaining sensitivity to improve the analytical performance of mass spectrometry workflows.

In an ideal mass spectrometer with perfect sensitivity, every single analyte molecule in the sample is ionized, travels through the system, arrives at the detector, and is detected. However, there are multiple mechanisms that reduce sensitivity and prevent realizing an ideal mass spectrometer in terms of sensitivity. The inefficiencies may originate from competition for charge and ion suppression issues during ionization, ion transfer during atmospheric pressure sampling, and imperfect ion optical components inside the instrument. The interface between an ESI source and a mass spectrometer (also referred to in this application as front-end or front-end module) is responsible for the most significant source of ion loss that exceeds 99%. The inventor of the present disclosure has conducted experiments in which the ion source produced 500 nA of current but only 1 nA or less of the current passes via a heated ion transfer tube of 500 um inner diameter and 20 cm long. In these experiments, more than 99% ions are lost in the transfer through the ion transfer tube and diffusion to ambient air. There is a need for a more efficient use of samples and the produced ions from samples at this atmospheric pressure sampling inlet or atmospheric pressure interface. As disclosed above, majority of ions that do not reach the first vacuum stage of a mass spectrometer in the process get lost to ambient air via diffusion or gets neutralized in or on the sampling inlet or ion transfer tubes to the first vacuum stage.

Figure 14A:
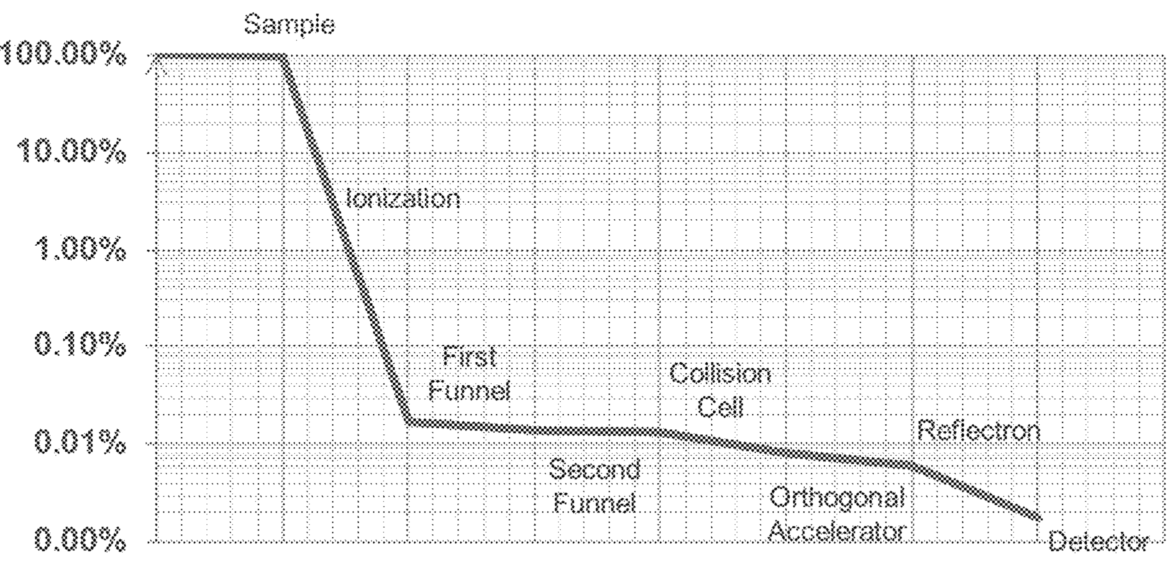
FIGS. 14A-D show the ion transfer efficiencies in a mass spectrometer and ion loss at the front-end module or at the atmospheric pressure sampling inlet.
Figure 14B:
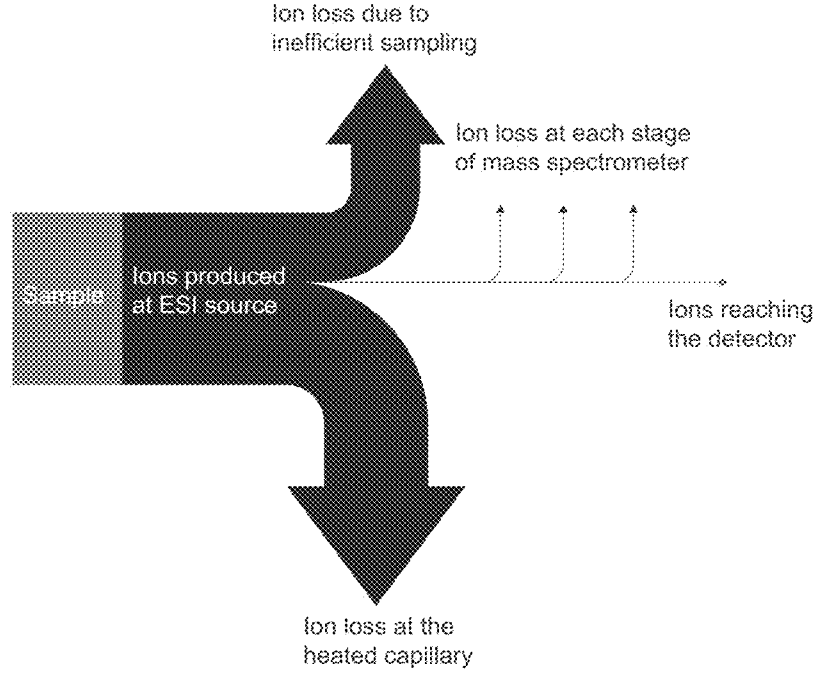

For example, FIG. 14A and FIG. 14B show ion transmission efficiencies at different stages of a mass spectrometer system from sample to detector in a typical commercial mass spectrometer an example of which is reported in the article by Beck, Scarlet, et al. "The impact II, a very high-resolution quadrupole time-of-flight instrument (QTOF) for deep shotgun proteomics." Molecular & Cellular Proteomics 14.7 (2015): 2014-2029. This article provides a relatively comprehensive view of ion transfer efficiencies for a commercial mass spectrometer (Impact II QTOF, Bruker) via ion current measurements. The number of ions that are successfully produced from analyte molecules in sample and pass through the instrument and are recorded at the detector serves as a good measure to determine a mass spectrometer's sensitivity. Therefore, absolute ion current measurements are valuable in determining ion transfer efficiencies in a mass spectrometer, and they provide useful information to understand the extent and possible mechanisms of inefficiencies, and their effect on instrument's sensitivity. In this article, net ion current measurements are reported from an injection of 1 pmol/uL bovine serum albumin (BSA) against a blank solution, representing ion currents produced by the BSA molecules in the sample. A net ion current of 63 pA was measured in the funnel region used as a Faraday cage, and this measurement was used as the starting value (100%) to investigate ion transfer efficiency inside the instrument. The ion loss monitored at various stages of the instrument result in ~90% ion loss within the instrument, and an over-all detection probability of ions transmitted into the vacuum system is reported to be approximately 10%.

While this study only documents ion transfer efficiencies inside the instrument (i.e., after ions reach the funnel region), a quick calculation may estimate the efficiencies of the ionization and sampling process. The reported flow rates of 50 nL/min to 5 uL/min (range supported by the emitter), and a 1 pmol/uL BSA solution may produce about 4 to 400 nA of current produced via BSA molecules if we assume 100% ionization efficiency and an average charge state of 50 for BSA molecules. Therefore, the reported 63 pA measurements after the sampling inlet indicates a combined efficiency for ionization and sampling processes of around 1.57% to 0.016%, and an end-to-end (sample-to-detector) efficiency of around 0.157% to 0.002% for 5 nL/min to 5 uL/min injection flow rates, respectively. Given the relatively low concentration of the sample used in these experiments (1 pmol/uL), the calculations show that the ion loss during atmospheric pressure sampling (rather than ion suppression and ion competition at the ion source) is the major contributing factor for the substantial ion loss.

Figure 14C:
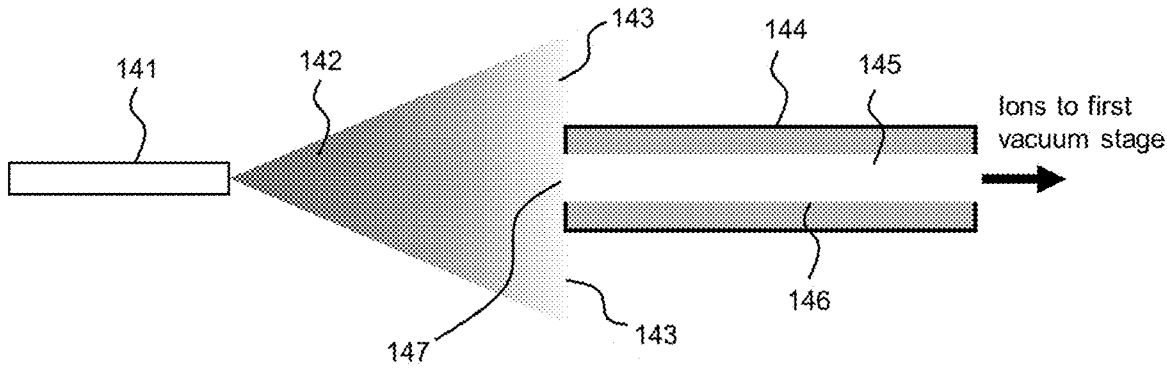

FIG. 14B shows a flow diagram of ion transfer in a conventional mass spectrometry system, and FIG. 14C shows a closeup view of an electrospray source and an atmospheric pressure sampling inlet. Fluidic sample including analytes (e.g., eluting from analytical column) is sprayed from the electrospray needle 141 connected to high voltage, negative or positive, and produces a spray 142 of charge droplets and/or aerosols. The spray 142 is then sampled via suction provided by the first vacuum stage of a mass spectrometer through an opening 147 of an atmospheric pressure sampling inlet 144 having an inner channel 145 and inner walls or inner surface 146. There are two main sources of ion loss in this process. First, due to the relatively small diameter of the opening 147 of the sampling inlet 144, only a small portion of the spray 142 is sampled and therefore other portions 143 of the spray 142 is lost and diffused to ambient air. This is shown in FIG. 14B by ion loss due to inefficient sampling. Second, ions traveling through the channel 145 of sampling inlet 145 collide with the inner walls 146 of the sampling inlet 144 and are neutralized. This neutralization process produces a current on the sampling inlet 144 if the sampling inlet 144 is in a closed circuit and may be measured with an ammeter or electrometer. If the sampling inlet 144 is floated (open circuit), this neutralization results in charge build up and eventually a breakdown in the first vacuum region of the mass spectrometer. This is also shown in FIG. 14B by ion loss at the heated capillary. Therefore, only a small portion of ions produced by the electrospray source is transferred to the first vacuum region.

Figure 14D:
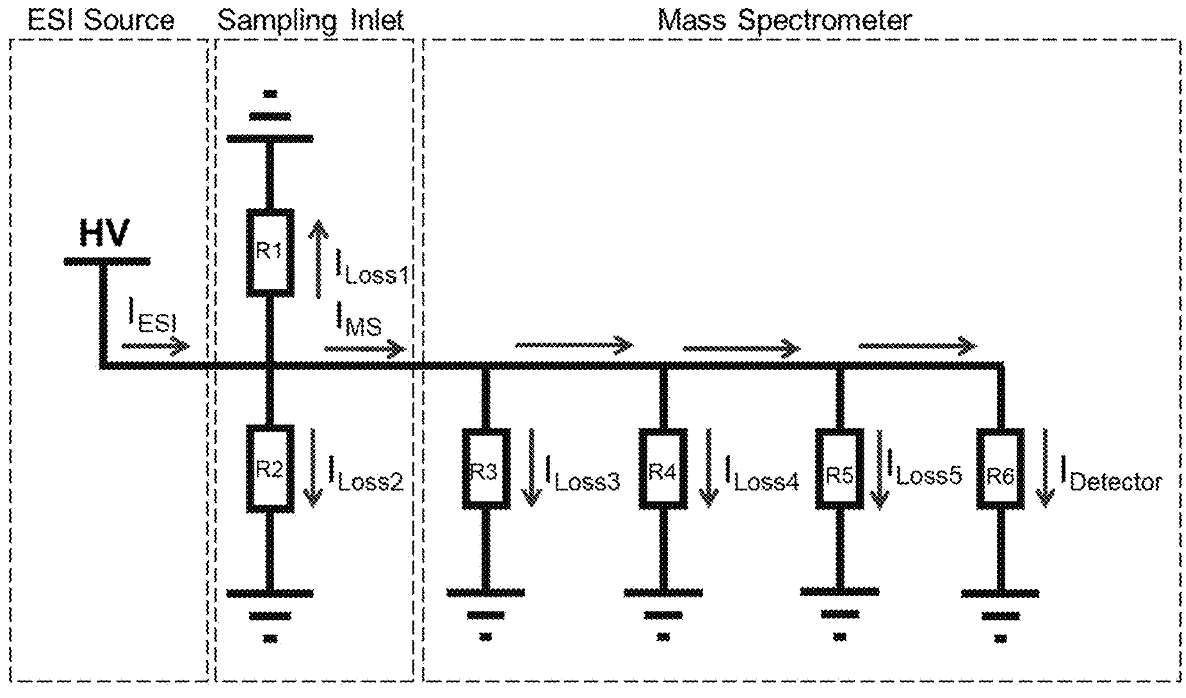

FIG. 14D shows a lumped circuit model for the ion loss in a mass spectrometer. The total ion current generated by the ion source from the sample is shown as $I_{ESI}$ and is produced, for example with an electrospray ion source. The ion loss at the sampling inlet (or atmospheric pressure sampling interface) are modeled by resistors R1 and R2 through which $I_{Loss1}$ and $I_{Loss2}$ pass to get neutralized (connection to GND), respectively. Ins is the intensity of ion beam that reaches the first vacuum region of a mass spectrometer. The ion loss inside the instrument at various stages are modeled by resistors R3 to R5 passing currents of $I_{Loss3}$, $I_{Loss4}$ and $I_{Loss4}$, respectively. These ion losses are due to the non-ideal ion optics inside the instrument. Finally, the ion current reaching the detector is shown with $I_{Detector}$. And R6 is the resistance of the detector. $I_{Loss1}$ and $I_{Loss2}$ correspond, respectively, to the "ion loss due to inefficient sampling" and "ion loss at the heated capillary" of FIG. 14B.

Figure 14E:
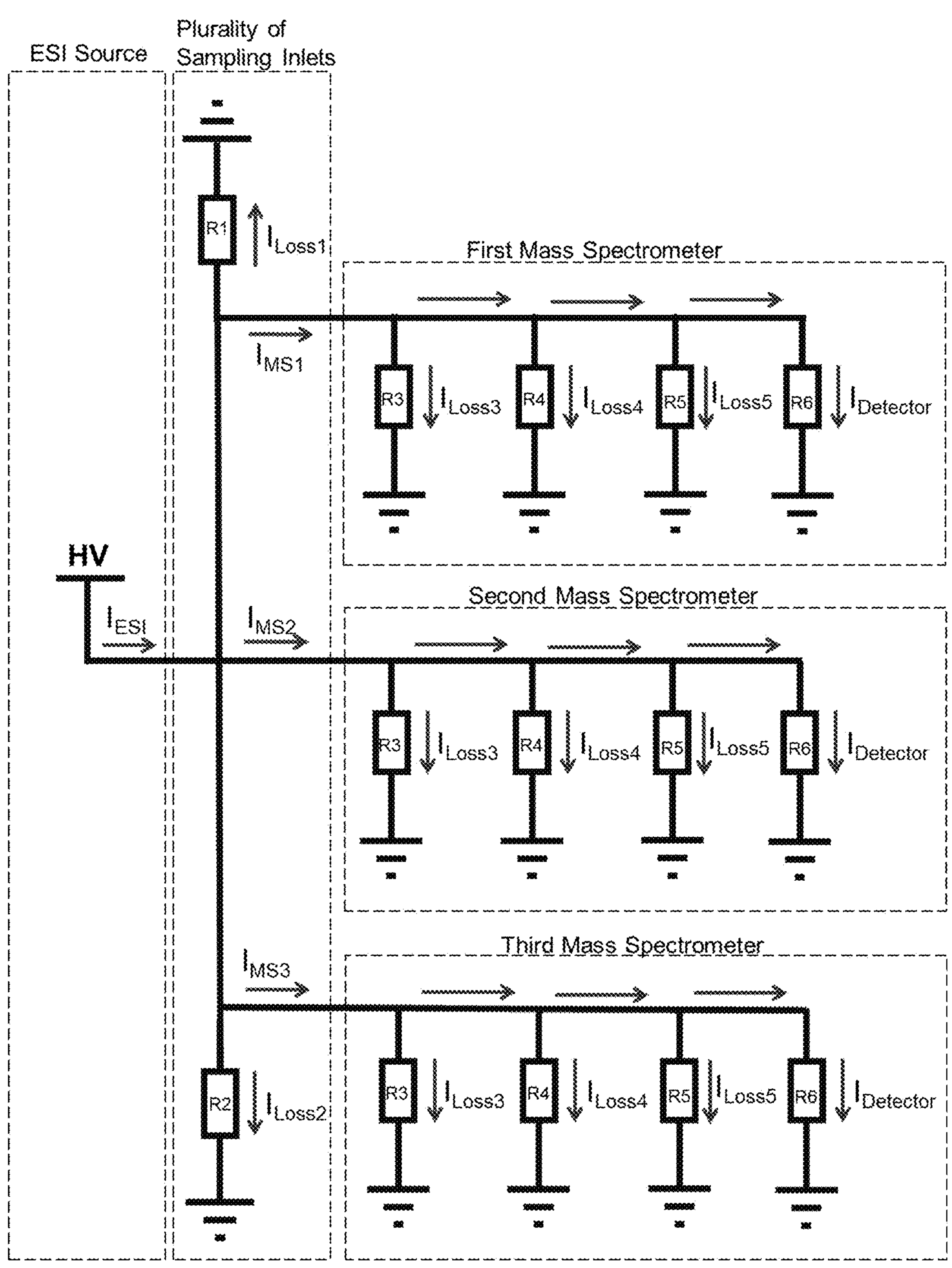
FIG. 14E shows a lumped circuit model of a multi-beam mass spectrometry system in accordance with one or more embodiments of the present disclosure.

In view of the above, in one or more embodiments of the present disclosure, the "ion loss due to inefficient sampling" and/or the "ion loss at the heated capillary" portions of the ion beam, which are wasted at conventional mass spectrometry as deposits at the interface (which often referred to by those skilled in the art as the sampling inlet getting "dirty" due to deposited sample at the interface), or diffusion in ambient air, are directed to one or more other mass spectrometers, thus allowing for a single ion source to simultaneously feed or provide ions or ion beams to multiple mass spectrometers, and therefore, enable a multi-beam mass spectrometry system in which ion beams with identical or substantially similar composition are provided to a plurality of mass spectrometers. FIG. 14E shows a lumped circuit model of a multi-beam mass spectrometry system or a super mass spectrometer in accordance with one or more embodiments of the present disclosure. In this schematic circuit, three mass spectrometers with identical internal loss elements (R3-R6) receive ion currents from the ion source. The ion beam introduced to each of the first, second, and third mass spectrometer are shown by $I_{MS1}$, $I_{MS2}$, and $I_{MS3}$, respectively. Although this configuration shows providing three ion beams from the ESI source, any number of ion beams may be provided to any number of corresponding mass spectrometers such that each mass spectrometer receives an ion beam from the ESI source. Because the current provided by the ESI source may be increased (by providing multiple emitters and increasing a flow rate of the incoming fluid) theoretically, there is no upper limit to the number of ion beams that may be provided to the plurality of mass spectrometers. While the R3-R6 values are shown to be identical in each mass spectrometer of FIG. 14E, the values for resistors R3-R6 may be different for each mass spectrometer, and they do not necessarily need to be the same value meaning the ion optical components losses that are represented by the resistors may be different. In this configuration, the ion losses at a plurality of sampling inlets are shown as aggregate by resistors R1 and R2 of FIG. 14E. The lumped circuit models shown in FIGS. 14D and 14E are different from conventional lumped circuit models in a sense that the medium for charge transfer is not electrical wires (e.g., copper) and charge carriers are not electrons, rather the medium for charge transfer is space surrounded by ion guides and the charge carriers are gas-phase ions. Ion beams are streams of electrically ions (charged atoms or molecules) in gas-phase. Therefore, the connection of each sampling inlet to each mass spectrometer is one or more ion guides that provide an efficient path for ions to reach mass spectrometers. In One or more embodiments, the first, second, and third mass spectrometer may be packaged in a single enclosure in which multiple ion beams are used for mass spectrometry analysis. Each mass spectrometer may be provided vacuum with separate vacuum systems, or all mass spectrometers may be provided vacuum by a single vacuum system. One or more embodiments of the present disclosure includes a single mass spectrometer that uses more than one ion beam for mass spectrometry analysis such that the more than one ion beam is produced at the ionization source. In other words, while prior art mass spectrometers may route and/or split a single ion beam after passing the inlet of prior art mass spectrometers to different ion optical components (such as the branched ion path described in U.S. Pat. No. 10,699,888), such a re-routing or splitting or branching happens only after the ion beam passes the inlet. In one or more embodiments of the present application, multiple ion beams are produced at the ion source and enter the instrument in parallel right after the ion source, for example, ESI source, and therefore, the multiple ion beams entering in parallel may still be routed or split to different ion optical components for mass spectrometry analysis. This provides the advantage that, compared to conventional prior art mass spectrometers in which an ion beam has A nano amperes of current inside the mass spectrometer, one or more embodiments of the present disclosure allows to using multiple ion beams each having A nano amperes. For example, if N inlets are used, one or more embodiments of the present disclosure provides N number of ion beams each having A nano amperes of current to one or more mass spectrometers.

The prior art mass spectrometry systems shown in FIGS. 6-10 all fall under the single ion beam category of mass spectrometers as explained with respect to FIG. 14D. In contrast, one or more embodiments of the present disclosure disclose and enable a multi-beam mass spectrometry system that receives multiple ion beams from a single ion source such that the single ion source may include a plurality of emitters. A plurality of X is defined as one or more of X in the present disclosure. In one or more embodiments, the mass spectrometry system includes a plurality of ion beams produced from a single ion source and the mass spectrometry system receives the ion beams from a single ion source each ion beam from or via a plurality of ion guides (may be flexible ion guides, may be rigid ion guides, may be stacked-ring ion guides, may be multipole ion guides, or may be any combination of them) connected to each other in series to allow for transfer or transport of the an ion beam to a mass analyzer. The plurality of ion guides provide a path from an ion source to a mass spectrometer such that the transfer of ions inside the ion guide occurs with high efficiency, for example, with more than 10% of ions entering the ion guide being transferred, transported, or delivered to the mass spectrometer for mass spectrometry analysis. In one or more embodiments, a plurality of ion beams are routed via a plurality of the paths or ion paths (each path having a plurality of ion guides in series) to one or more mass spectrometers. In one or more embodiments, a plurality of ion beams are routed via a plurality of ion paths and the ion beams join at an ion processor (such as SLIM device) before entering a single mass spectrometer. The ion processor may accumulate the ions from each ion beam and may introduce the accumulated ions to a single mass spectrometer periodically for mass spectrometry analysis by a single mass spectrometer. In other words, in one or more embodiments, X number of ion beams are merged, after the sampling inlet, to produce a new ion beam that its ion current value or intensity is the sum of the intensity of the plurality of ion beams.

In one or more embodiments, the ion beams (for example indicated as IMS1, IMS2, and IMS3 in FIG. 14E) provided to the mass spectrometers are identical or substantially similar, and each ion beam may be used for a specific or different measurement defined by a user or programmed into a processor of the system or a central processor or a control unit. In some embodiments of the present disclosure, the mass spectrometers receiving identical or substantially similar ion beams may communicate, interact or cooperate with each other to perform measurements or measure a single analyte of low concentration or extend the dynamic range or provide a mass spectrometry system with extended dynamic range. In the present disclosure, two substantially similar ion beams may be two ion beams that have the same type of analyte ions, the same type or same ion composition, same type of ionized analytes produced in time scale or in unit time, or both include any percentage (in a range of 10% to 100%) of ions having ionic species of the same molecular mass or m/z ratio. Two substantially similar ion beams may also mean that the two ion beams have the same or close (less than any number between 1 fA to 10 nA difference) beam current values or intensities.

Figure 9:
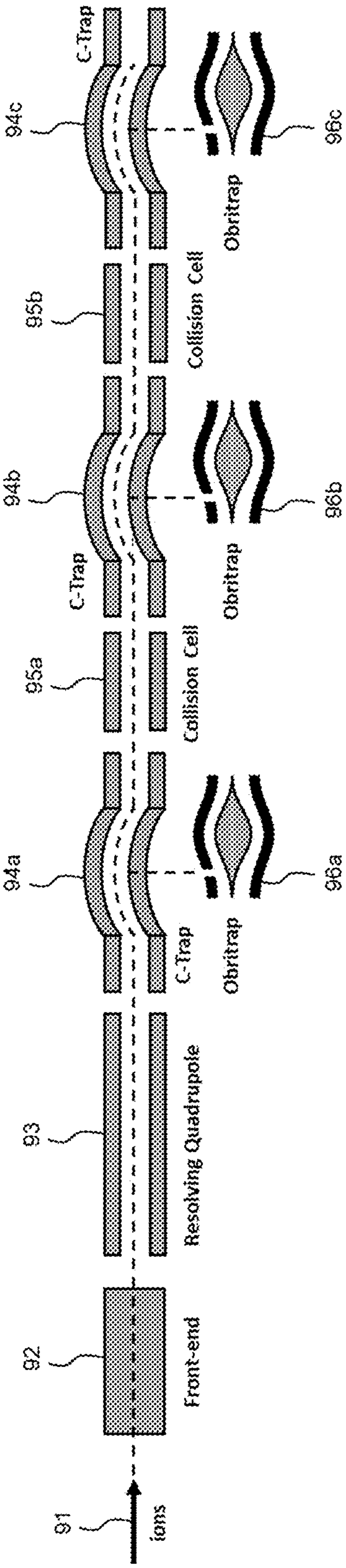
FIG. 9 shows a typical electrostatic trap mass spectrometry system that includes multiple mass analyzers.
Figure 10:
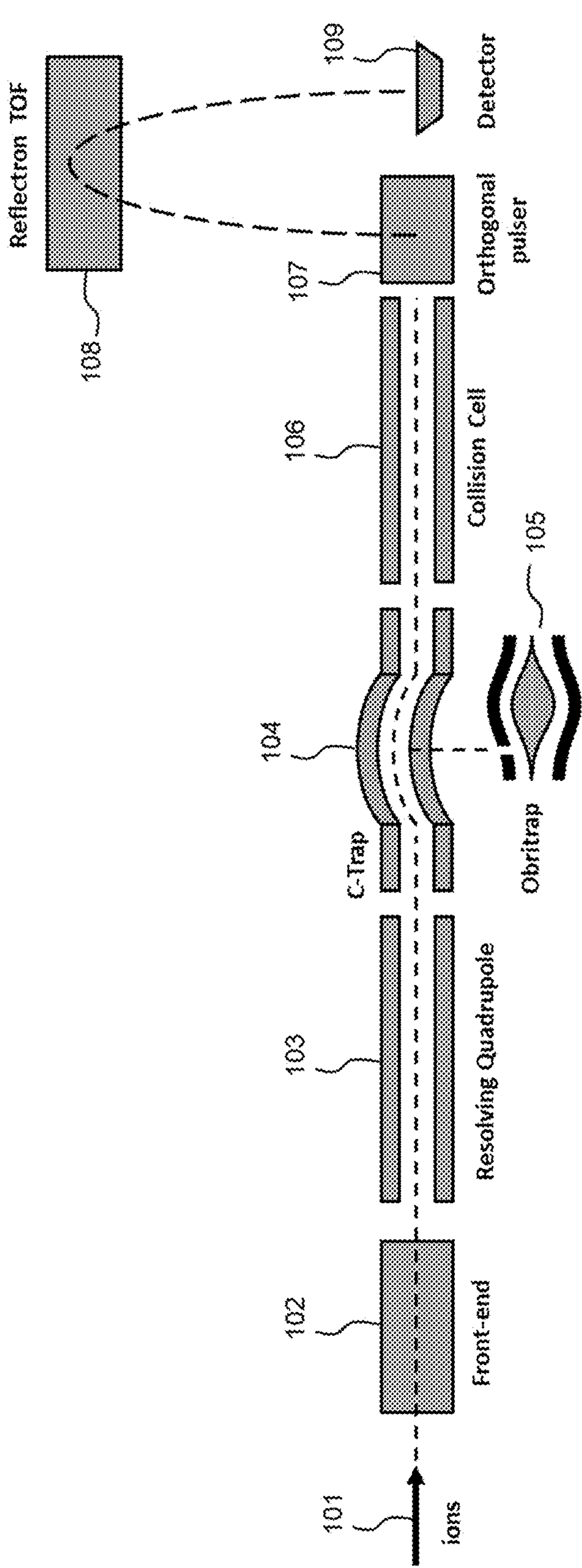
FIG. 10 shows a typical electrostatic trap mass spectrometry system that includes time of flight mass analyzer.

The systems and methods for mass spectrometry disclosed in the present application which use multi-beam mass spectrometry or parallel-beam mass spectrometry (also referred to as super mass spectrometry) provides significant advantages over the conventional hybrid mass spectrometry systems examples of which are shown in FIG. 9 and FIG. 10. These prior art multi-analyzer instruments (or hybrid instruments) are single beam instruments, meaning a single instrument (irrespective of how many analyzer it has) only receives a single ion beam from the ion source. While increasing the beam intensity may provide some additional sensitivity, they fall short of providing sensitivities required for full coverage in untargeted proteomics and metabolomics studies. For example, while an electrospray ion source may be scaled to produce more ions, and there is no upper limit for such scaling from a physics standpoint, there exists an upper limit beyond which sensitivity of a conventional mass spectrometer may no more benefit from higher incoming ion beam intensities. A theoretical upper limit for maximum ion current is set by space charge effects resulting from mutual repulsion of particles of like charge. The space charge effects may define a theoretical hard upper limit on the maximum ion current an instrument may take, beyond which injecting more ions would only result in more ion loss inside the instrument. However, one does not need to reach this hard limit because problems may start to arise as soon as space charge effects may no longer be neglected for ion beam transport. Due to the self-repulsion of ions, higher intensity ion beams would adversely affect proper functioning of mass or mobility resolving components, resulting in poor mass resolution or widening the mobility peaks. Therefore, there exists an optimal ion current for an instrument (below the theoretical hard limit) beyond which higher beam intensities may necessitate a redesign of the system to increase ion capacity of ion optical components in order to gain additional sensitivity (or a larger number of ions reaching the detector). Further, the prior art instruments shown in FIG. 6-10 allocate a portion of ion beam for each analyzer, and therefore, there is always competition for accessing the ion beam in between the analyzers because there exists only one ion beam inside the instrument. One or more embodiments of the present disclosure provide advantages that, in addition to gaining sensitivity by increasing the ion beam intensity of each instrument, multiple ion beams are directed to different mass spectrometers and therefore, the burden on the analytical performance of the system (such as scan speed, sensitivity, dynamic range, or other analytical figures of merit as defined by IUPAC incorporated here by reference) on each instrument is reduced. For example, by providing identical or substantially similar ion beams to multiple mass spectrometers, each mass spectrometer may allocate analytical resources to a single or one specific measurement, or measurement type, or analyte. In other words, instead of tasking a single instrument to handle all the measurement requirements of a proteomics study, the task may be divided to multiple instrument. And each instrument allocates its analytical performance to a single measurement or a different type of measurement. An example of this is to provide two ion beams to two instruments, one allocated to proteomics measurements using a TOF (e.g., QTOF, timsTOF, etc.) instrument, and another allocated to metabolomics measurements using a mass spectrometer, such as Orbitrap® that provides a higher resolution in low mass range. As another example, one instrument of the mass spectrometry system may be allocated to measure negative ions (or operate in negative ion mode) and the other mass spectrometer is allocated to measure positive ion (or operate in positive ion mode).

Figure 15A:
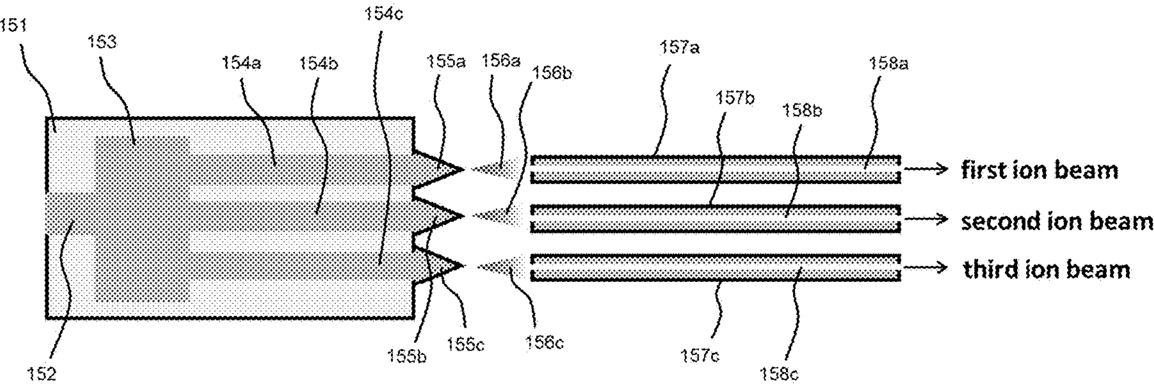
FIGS. 15A-D show different embodiments of electrospray ion source and sampling inlet in accordance with one or more aspects of the present disclosure.
Figure 15B:
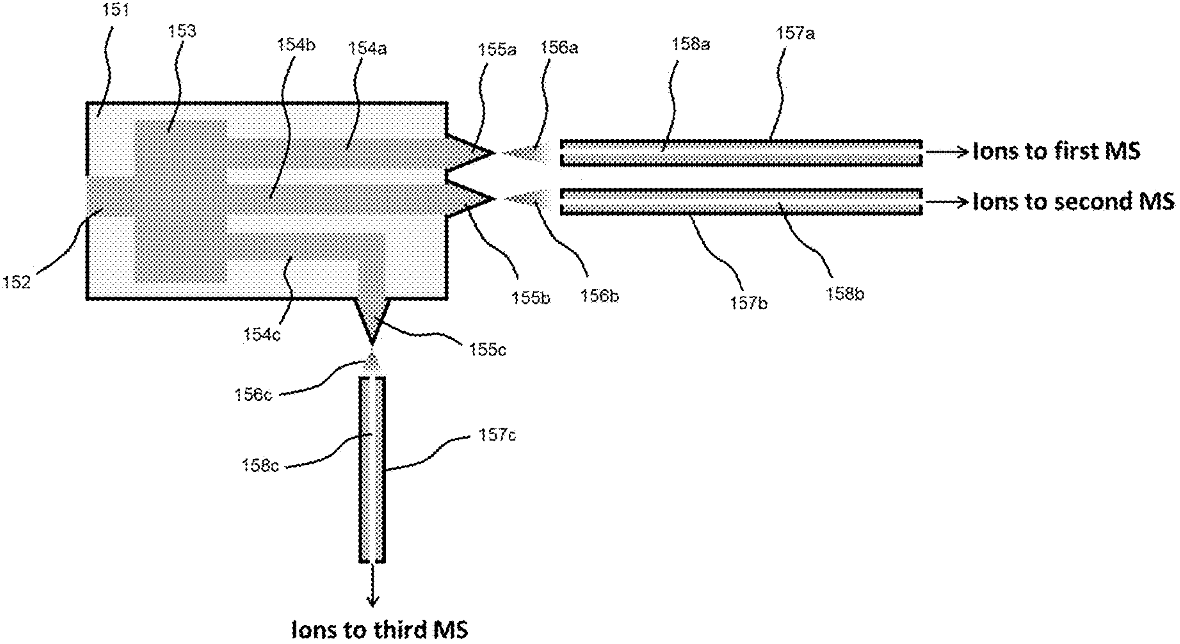
Figure 15C:
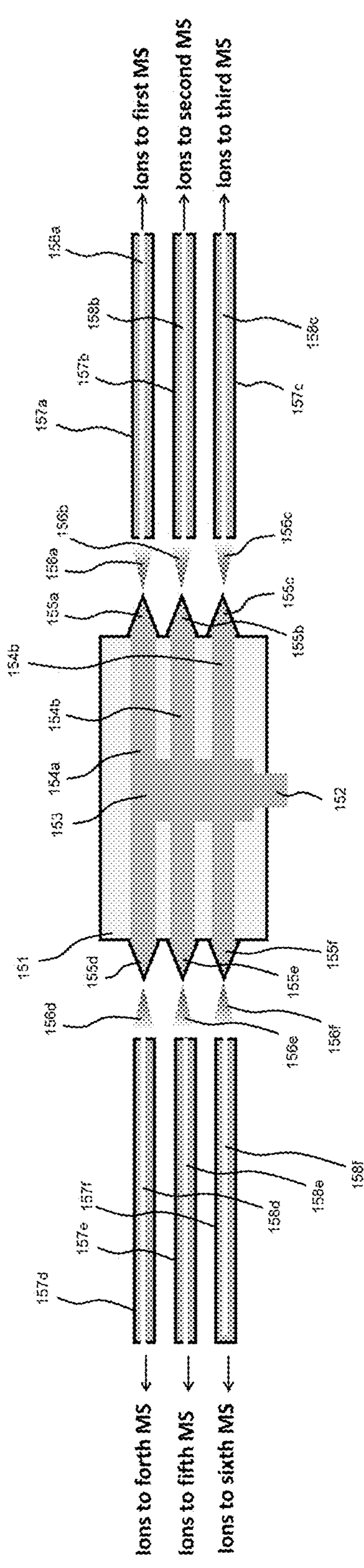
Figure 15D:
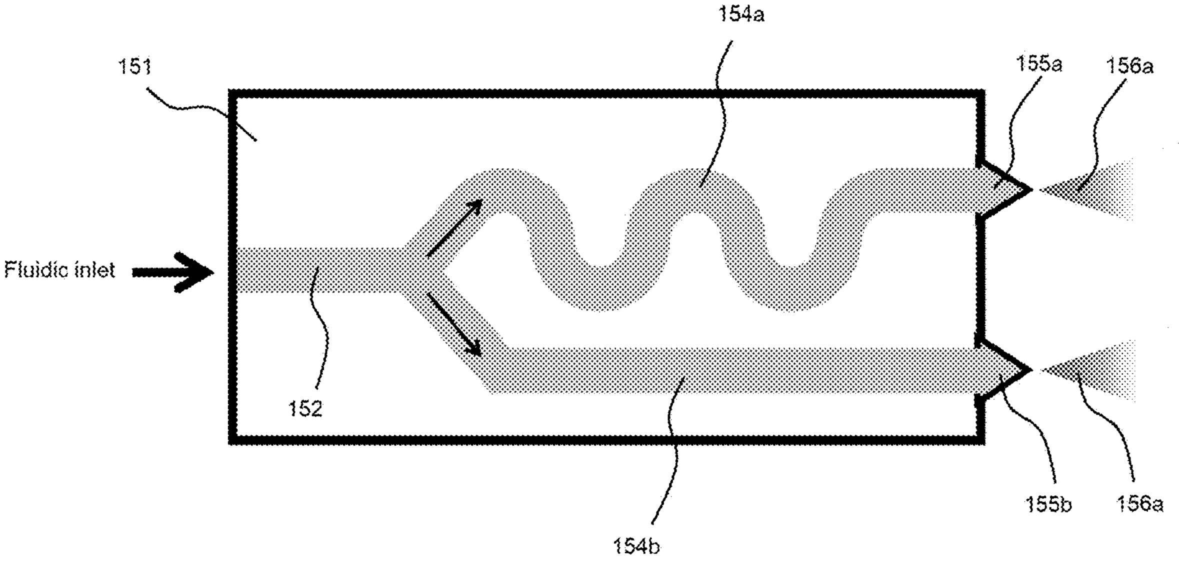

FIGS. 15A-D show different embodiments of an electrospray ion source in accordance with one or more aspects of the present disclosure. In one or more embodiments, an electrospray ion source 151 may include a fluid inlet channel 152 that receives sample in fluidic form, for example, from an analytical column (not shown). The electrospray ion source 151 may include a fluid reservoir 153 that is fluidically connected to the fluid inlet channel 152 and a plurality of fluid outlet channels 154*a-c*. A plurality of emitters, nozzles, or tips 155*a-c* (e.g., micro- or nano-spray emitters or a combination the nano- and micro-spray emitters) produce a plurality of sprays 156*a-c* upon application of high voltage. The plurality of tips 155*a-c* may be elongated and connected to a 3D micro-positioning stage for accurate positioning of each tip with respect to the corresponding inlet. The high voltage connected to each of the plurality of nozzles may be positive or negative, or some positive and some negative. The voltage may be in a range of −5000 to 5000V. In one or more embodiments, two or more high voltages with different polarities may be applied so that a first number of the plurality of tips 155*a-c* produce positive ions (or positive ion beams) and a second number of the plurality of tips 155*d-f* produce negative ions (or negative ion beams) as shown in FIG. 16C. In this case, the fluidic reservoir 153 may be connected to ground (GND) potential or zero voltage. The plurality of sprays 156*a-f* may be nano electrospray. Each of the plurality of sprays 156*a-c* may be positioned in front of each of a plurality of atmospheric pressure sampling inlets 157*a-c*, each having a channel 158*a-c* through which the ions are transferred or transported to one or more mass spectrometers. In one or more embodiments, each of the plurality of sprays 156*a-c* may be positioned in front of each of a plurality of atmospheric pressure sampling inlets 157*a-c*, each having a channel 158*a-c* through which the ions produce a plurality of ion beams that are transferred or transported to or routed with one or more ion funnels, ion traps, ion guides, flexible ion guides, SPion® devices (such as those disclosed in U.S. Pat. No. 11,219,393 the entire content of which is incorporated herein by reference), or ion mobility devices that are connected through other ion guides to a single mass spectrometer. The one or more ion traps, ion guides, or ion mobility devices may all be connected to a single high-capacity vacuum pump system (including roughing pumps and turbomolecular pumps) or each of them may be connected to a different vacuum pump or separate pumping systems. The ions passing through the plurality of sampling inlets 157*a-c* travel through a separate "ion path" toward one or more mass spectrometers. In one or more embodiments, the plurality of sampling inlets 157*a-c* are connected to one or more ion trapping devices such that each ion trapping device receives a separate ion beam from each sampling inlet from a single ESI source, and then all of the one or more ion trapping devices guide the ions towards a single mass spectrometer for analysis at different time intervals.

In one or more embodiments, length of the fluid outlet channels 154*a-c* are equal such that a fluid sample entering the inlet channel 152 is sprayed with the same amount of delay from all the nozzles 155*a-c*. This is advantageous because this allows for maintaining the elution time and shape of all chromatographic peak consistent. The fluid reservoir 153 may be designed such that the dead volume is eliminated to reduce cross-contamination or carry over in the electrospray source 151. In one or more embodiments, a longitudinal axis of each sampling inlet 157 may be parallel, identical, or at an angle (for example 0 to 90 degrees or more) with respect to a longitudinal axis (the same axis that the source sprays toward in a single spray mode) of the corresponding emitter 155. The distance between each emitter 155 and its corresponding inlet 157 may be in the order of 1 to 10 mm or more. The distance between two adjacent emitters 155 or inlets 157 may be 1 to 10 mm or more. While the exemplary embodiment of FIG. 15A shows that the longitudinal axes for all inlets are parallel, the longitudinal axis of each inlet may be at an angle with respect to the longitudinal axis of other inlets, for example to form a half-circular or quarter circular pattern. Also, while the exemplary embodiments show that all emitters 155 and all inlets 157 are on the same plan, one or more embodiments of the present application may include bundles (in any form) or square or rectangle arrays of emitters or inlets, for example an array of 2×10, 3×20, 2×2, 10×10 or 100×100, etc., each array element (1×1) being an emitter 155 and an inlet 157. In one or more embodiments, a plurality of inlets may sample from a single emitter, or an inlet may sample from a plurality of emitter.

Figure 15E:
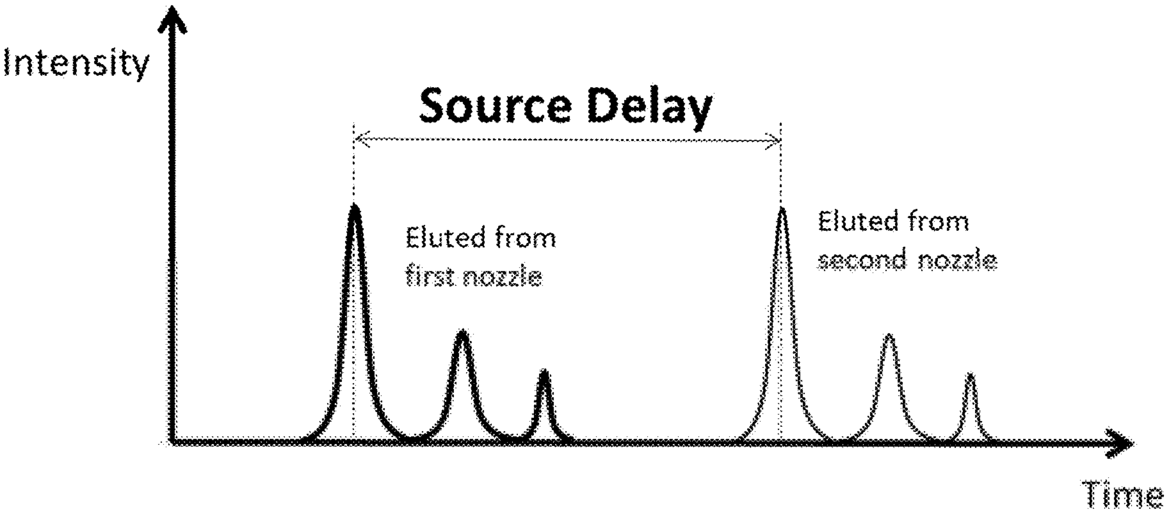
FIG. 15E shows elution profile measurements of an electrospray ionization source with two delayed spray nozzles and source delay.

In one or more embodiments, the electrospray source 151 is such that the fluid entering at time T1 is sprayed from all nozzles 155*a-c* after a predetermined amount of delay. In one or more embodiments, an example of which is shown in FIG. 15D, the electrospray source 151 is such that the fluid entering from the analytical column through the fluidic inlet is sprayed from each of the nozzles 155*a-b* with a predetermined amount of delay with respect to each other. For example, fluid entering the fluidic inlet at time TO (e.g., T0=0 second) is split in time T1 (e.g., T1=1 second), sprayed from nozzle 155*a* at T2 (e.g., T2=4 seconds), and sprayed from nozzle 155*b* at time T3 (e.g., T3=2 seconds) such that T2 is greater than T3 or spraying at 155*a* happens later (e.g., 2 seconds later) than spraying at 155*b*. The delay may be in the range of 1 microsecond or less to one second or more. In the exemplary embodiment shown in FIG. 15D, the fluidic channels 154*a* is longer than the fluidic channel 154*b*. The eluted sample or fluid from the analytical column entering the electrospray source is split into or divided to two fluidic streams (shown by the two arrows) entering the two fluidic channels 154*a-b*. The path or streams of fluid inside the fluidic channel 154*a* is longer and therefore the spray 156*a* provides a substantially similar or an identical ion beam (for example having the same ion composition) to that of spray 156*b* and does so with a predetermined delay. The electrospray ion source 151 according to the present disclosure may include a plurality of fluidic channels 154*a-b* such that each channel has a different predetermined length and therefore a different predetermined delay. This is advantageous because the delay allows for measurement of compounds eluted from an analytical column at different predetermined delays from the moment the fluid enters the fluidic inlet. Therefore, identical ion beams may be provided that are introduced to a mass spectrometer sooner or later than introducing a substantially similar or identical ion beam to another mass spectrometer, allowing for deterministic mass spectrometry measurements. That is, identical or substantially similar chromatograms may be produced from eluting compounds from the analytical column all with a predetermined amount of delay determined by the length of the fluidic path reaching each emitter. For example, this is shown in FIG. 15E in which two identical chromatograms are produced but with a predetermined delay that is indicated in this figure as the source delay. The source delay may be defined as the time it takes for a second emitter, after the first emitter, to spray the same composition eluting from an analytical column. This allows for measuring the same peak again at a later point in time, and therefore, being able to adjust a mass spectrometers acquisition parameters based on this preliminary measurement that is performed in advance of time or performing deterministic mass spectrometry measurements. For example, emitter 155*a* of FIG. 15D generates "Eluted from second nozzle" chromatogram of FIG. 15E, and emitter 155*b* of FIG. 15D generates or produces the "Eluted from first nozzle" of FIG. 15E. The above-disclosed source delay or delayed multi-emitter ESI configuration is advantageous because it allows for re-measuring of ions from a specific elution time or time period and re-producing chromatograms with, for example, a higher sensitivity, accuracy, or resolution, etc. This first measurement allows for a first preliminary measurement for interrogation of ions (e.g., a survey scan) and conducting or performing the second analysis in a deterministic manner or with the information provided by the first measurement. In other words, this configuration provides the advantage that the second measurement may be conducted deterministically with specific requirements for each time stamp. Putting this in simple terms, in the context of stock market trading, this may resemble having the stock price chart for a specific stock ahead of time and using the information from ahead of time to place a favorable and deterministic trade based on the information. One or more embodiments of the present application discloses deterministic mass spectrometry in which randomness of measurements are eliminated by having an earlier survey scan. Similarly, this configuration provides the advantage in mass spectrometry that a preliminary analysis or a survey scan is performed in each point of time to gather preliminary information about the chemical composition at that point in time. Based on the results of this preliminary analysis, the second measurement from the time-delayed nozzle (the nozzle connected to the channel with a longer fluidic length) may be performed to provide a more specific measurement based on the first preliminary measurement. For example, the first measurement may indicate that the number of ions of different m/z ratio is larger than a predetermined number, the intensities of ions are larger than a predetermined range requiring a high dynamic range measurement, or a dynamic range for the required measurement requires using two or more mass spectrometers for the measurements. Then, the second measurement, which is performed after a predetermined amount of delay determined by the source delay, is performed based on the measurements, results, and/or analysis of the first measurement. In some embodiments, a third measurement for example may be performed at a different or the same source delay based on the results of the second measurement, or the results of both the first and the second measurements and so on and so forth. For each time delayed measurement, a separate delayed nozzle 155 may be provided. The amount of time delay (or source delay) that each nozzle provides depends on the length of the fluidic channels 154 associated with each nozzle 155. The first and second measurement may be performed by the same mass spectrometer or different mass spectrometry technologies may be used for each measurement. For example, an MS1 scan may be performed in the first measurement, and MS2 (or MS/MS) measurement may be performed in the second measurement. In one embodiment, an MS1 scan with 1 amu resolution may be performed in the first measurement to determine the required dynamic range or m/z isolation windows or a charge state or total charge, and the second measurement may be performed for a high-resolution analysis of select m/z windows based on the first measurement. Each of the fluidic channels may have the same volume but different length or it may have the same length but twice or more the volume of other channels. A nozzle of the electrospray source may provide nano-spray while the other may provide micro-spray as understood by those skilled in the art. Alternatively, the fluidic channels may be formed by fused silica capillaries with tapered tips all bundled and connected, either directly, or indirectly via a fluidic tube and/or connector, and optionally to an analytical column.

One or more embodiments of the present disclosure is related to multi-emitter electrospray ionization (ESI) sources. Multi-emitter ESI sources are able to or capable of or configured to increasing or scaling the amount of ion current produced by the ESI source, for example, to orders of magnitude larger ion current intensities compared to single nozzle or single emitter ESI sources. There is no theoretical limit on how large an electrospray array may be made or constructed. For example, an ESI source having a nozzle array of 10×10 or 1000×1000 may be used, for example, having nano-spray nozzles. Because the amount of sprayed liquid may be maintained at a low value by reducing the nozzle inner diameter, scaling the array to much larger sizes may be accommodated by the amount of available sample and liquid flow rates of a typical analytical separation system such as liquid chromatography (LC), or capillary electrophoresis (CE). It is noted that typically flow-splitters are used between an LC system and an electrospray ion source (for example those with multi-emitter spray) to reduce the outgoing flow to the emitter, which part of fluidic sample typically is unused and goes to a waste bottle. One or more embodiments of the present disclosure is advantages because it reduces wasting sample and instead allocates the extra fluidic sample to mass spectrometry analysis via additional emitters/inlets instead of waste bottle. Therefore, a typical analytical setup for LC allows for scaling up the ESI source nozzles with increasing the number of emitters to accommodate for a larger number of ion transfer tubes as disclosed in this application. There is no theoretical upper limit as to, for example, how many emitters may be included in conjunction with the ion transfer tubes as long as the available fluidic sample eluting from analytical column is sufficient to feel all emitters or nozzles, or for example, there exists enough space in front of the emitters for the inlets and their corresponding ion guides to route the ion beam towards mass spectrometers. In one or more embodiments, for example, 2 or more, 10 or more, or 100 or more ion transfer tubes from one or more mass spectrometers may be connected to the multi-emitter electrospray source.

Figure 16A:
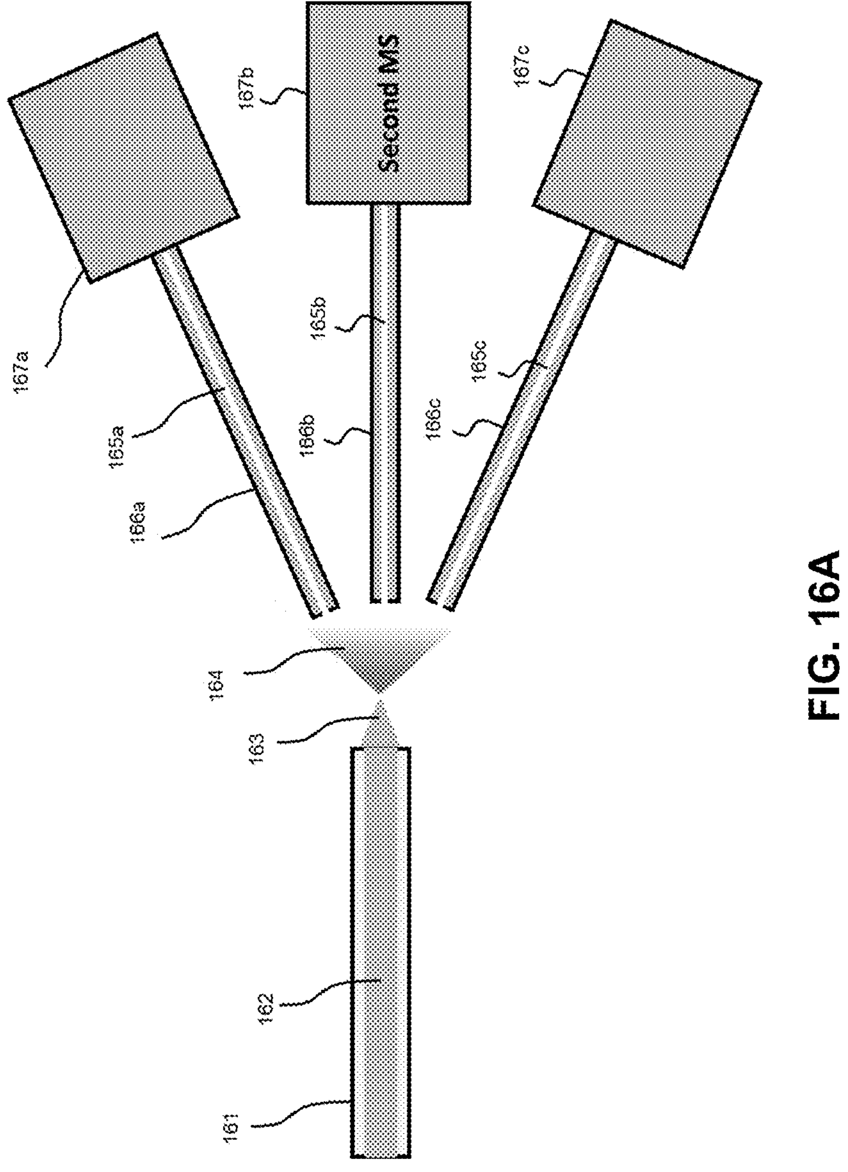
FIG. 16A-C show a mass spectrometry system in accordance with one or more embodiments of the present disclosure.

FIG. 16A shows an ion source 161 that produces a Taylor cone 163 and a spray 164 from a fluidic stream 162 optionally eluting from an analytical column. The spray 164 is then sampled by a plurality of sampling inlets 166*a-c* (e.g., ion transfer tubes or heated capillary inlets) and sampling inlets 166*a-c* transfer or transport the ions through a plurality of channels 165*a-c* to a plurality of mass spectrometers 167*a-c*. In this exemplary embodiment, the time delay of the ESI source (or source delay) may not exist, and all molecules are sprayed at the same time and without delay from a single nozzle as they elute from the analytical column. The plurality of sampling inlets 166*a-c* may be metal, for example, stainless steel and electrically connected to each other and floated at a voltage, or electrically insulated and each floated at a different voltage or connected to ground. The inner diameter of plurality of sampling inlets 166*a-c* may be 0.1, 0.2, 0.5 or up to 2 mm or more. The plurality of mass spectrometers 167*a-c* may be operated independently of one another or may be operated in a synchronized manner as disclosed in the present application. The plurality of mass spectrometers 167*a-c* may be the same type of mass spectrometer, for example, triple quadrupoles or Orbitrap®, each tuned to measure a predetermined mass range (e.g., 100-200, 200-300, 300-400 m/z and so on and so forth) or each tuned to acquire mass spectra at a predetermined delay with respect to other mass spectrometers. The plurality of mass spectrometers 167*a-c* may be different types of mass spectrometers, for example a quadrupole time of flight mass spectrometer, an ion trapping mass spectrometer such as an ion trap or an electrostatic trap such as Orbitrap®, and/or Fourier-transform ion cyclotron resonance mass spectrometer, or a triple quadrupole instrument in which the middle quadrupole acts as an ion trap and collision cell to simultaneously provide high resolution and high sensitivity measurements while providing sufficient number of data points (for example 8 to 20 or more data points for a LC peak) for accurate quantitation. In some embodiments, some of the mass spectrometers may be in positive ion mode and the other mass spectrometers may be in negative ion mode. In case of two or more overlapping chromatographic peaks, two or more mass spectrometers may be assigned to measure the overlapping chromatographic peaks, each being assigned to measure each of the overlapping chromatographic peak. In some embodiments, a mass spectrometer may provide high resolution measurement, and another mass spectrometer may provide high sensitivity measurements, and the results of the measurements are then combined to provide a superimposed mass spectrum, or a "super mass spectrum" in which the measurements from different mass spectrometers are combined, or all or some or part of measurements from each spectrum is selected and used for producing a super mass spectrum. The term super mass spectra may be defined as mass spectra that includes or is produced from the measurement results (or measurements or mass spectra) from more than one mass spectrometer (or in case of one mass spectrometer with multiple ion trap front ends, more than one ion traps of the mass spectrometer). In one or more embodiments, super mass spectra (or super mass spectrometry data) are produced or generated such that a first instrument provides high-resolution mass to charge ratio (m/z) measurements, a second instrument provides MS2 (or tandem) measurements, a third instrument provides quantitative measurements with high sensitivity, a fourth instrument provides mobility measurement, a fifth instrument provides charge detection (for molecular mass determination) measurements and so on and so forth. A mass spectrometer in the present disclosure may be referred to as an instrument. This allows creating super mass spectra that has N dimensions based on a number of mass spectrometers used in measuring the analytes, each mass spectrometer being allocated to provide measurements in one specific mass spectrometry dimension. Mass spectrometry dimension is defined in the present disclosure as m/z values, quantitative concentration values, ion mobility values, tandem mass spectrometry results, elution time values, and/or any other data that is obtainable with or provided by or acquired by mass spectrometry measurements from one or more analytes in a sample. While FIG. 16A shows an electrospray source 161 with a single spray 164, one or more embodiments may use a multi-nozzle electrospray source, such as those shown in FIGS. 15A-D. In all exemplary embodiments disclosed herein, a single nozzle electrospray source may be replaced with a multi-nozzle source or a multi-nozzle source with delayed fluidic channels (as discussed in the present disclosure) to achieve the advantages provided by the multi-nozzle and multi-nozzle sources with delayed fluidic channels. As disclosed above, using an electrospray source with delayed fluidic channels allows for introduction of a number of sprays with identical composition with predetermined time delays, and therefore, each mass spectrometer is capable of performing the same analysis performed earlier at a later time, such that the later time is determined by the delay associated with a specific nozzle that the mass spectrometer is sampling from. Then this information may be relayed to other mass spectrometers, a central computer, or a central computing unit for analysis such that a set of instructions is distributed (for example, including acquisition parameters obtained or determined based on measurement results) to the other mass spectrometers which are sampling from the other delayed electrospray lines. While FIG. 16A shows the plurality of mass spectrometers 167*a-c*, in one or more embodiments other ion optical instruments such as an electron microscope may also be connected to the ion source for soft-landing of ions for electron microscopy. In one or more embodiments, an independent sampling inlet is a sampling inlet that produces a separate ion beam from the ESI source. In one or more embodiments, each independent sampling inlet provides an ion beam and is connected to a mass spectrometer via an ion guide or an ion trapping device, such as one or more multipole ion guides, one or more stacked-ring ion guides, one or more flexible ion guides (such as SPion® flexible ion guides), or one or more ion processors (such as structures for lossless ion manipulation or SLIM) or any other apparatus that provides high efficiency transfer of ions from each sampling inlet to a mass spectrometer.

Figure 16B:
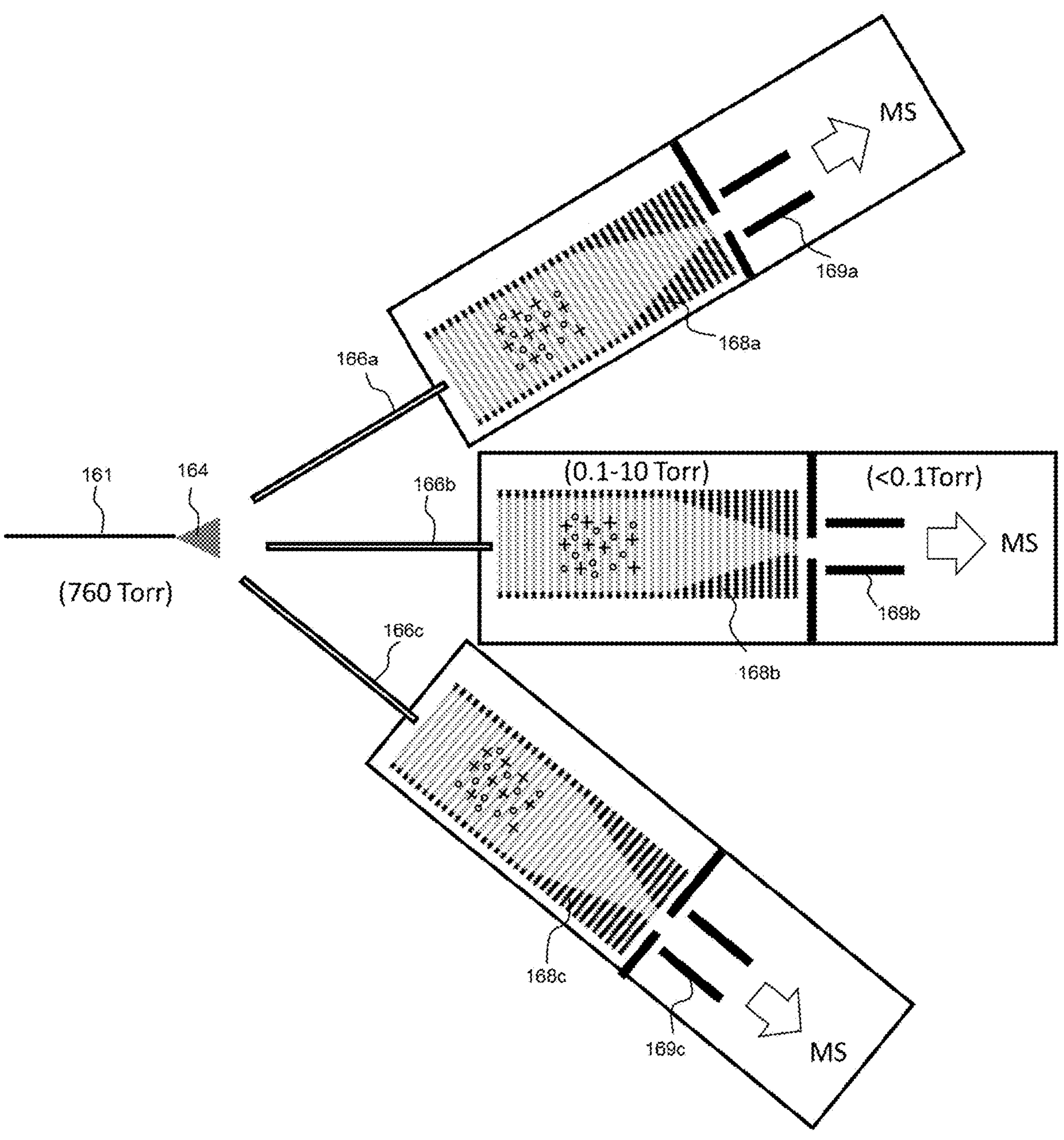
Figure 16C:
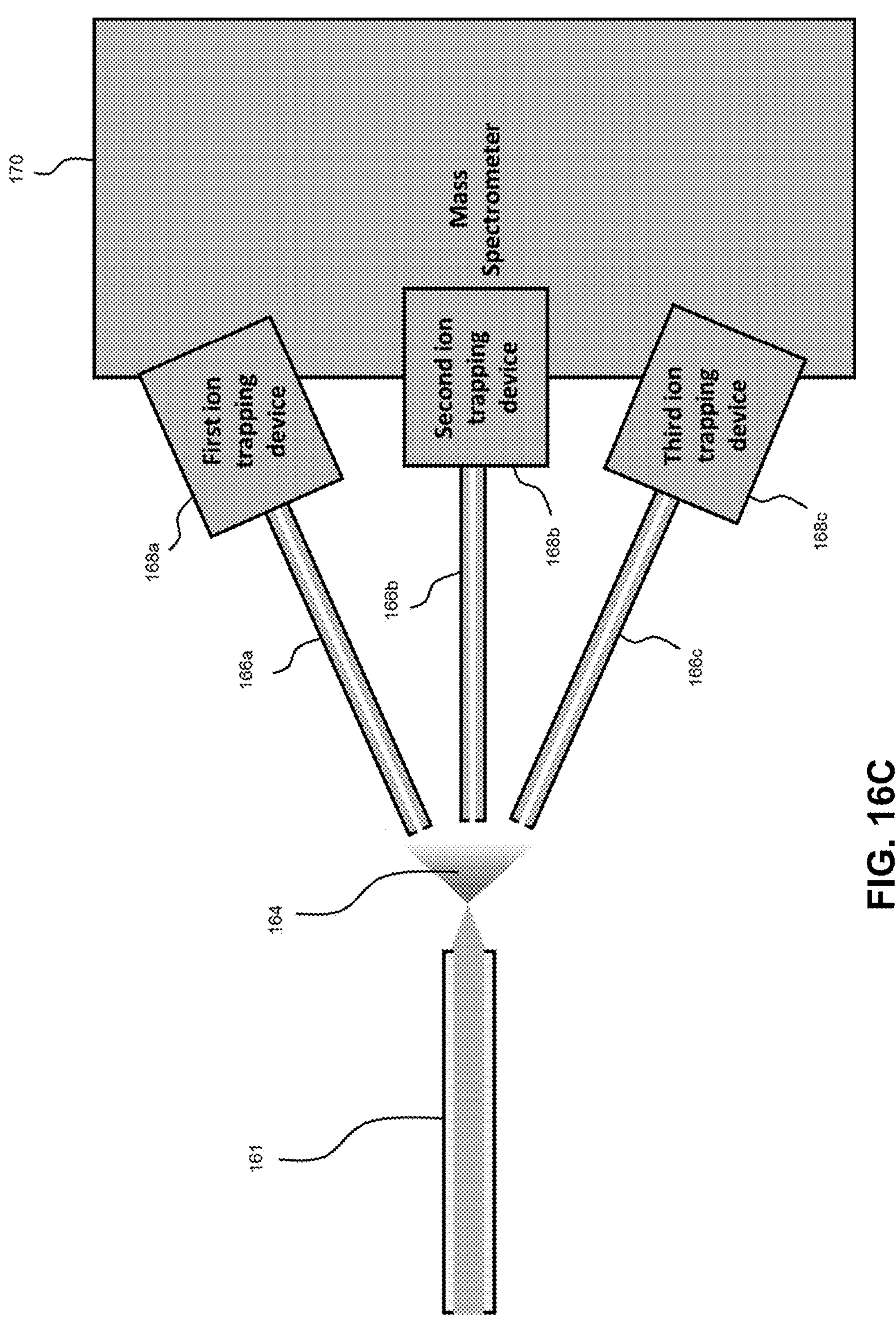

FIG. 16B shows an ion source that is connected to a plurality of mass spectrometers in accordance with one or more embodiments of the present disclosure. An electrospray ion source 161 produces a spray 164 and the produced spray 164 is sampled by a plurality of atmospheric pressure sampling inlets 166*a-c* (e.g., heated capillaries). The sampled ions are then transferred to a plurality of ion funnels 168*a-c* of a plurality of mass spectrometers. The ion funnels 168*a-c* may provide ion trapping capabilities such that a timing for release of the ions accumulated in each of the ion funnels 168*a-c* to the next stage ion guides 169*a-c* is controlled or timed or scheduled. One or more electrodes of the ion funnel may act as one or more ion gates for accumulating ions inside the funnel and then releasing the ions to the next stage. Although FIG. 16B shows a single stage of ion funnel, one or more embodiments may include two or more stages of ion funnels connected to each other in series such that ion accumulation may occur in one or more of these ion funnels that are connected to each other in series. Although the ion guides 169*a-c* are shown to be connected to different mass spectrometers, the ion guides 169*a-c* may merge into a single ion guide or may merge to form a single ion guide to introduce the accumulated ions in each of the ion funnel 168*a-c* to a single mass spectrometer. In this example, the accumulated ions may be released into the single ion guide with a predetermined time delay. This is shown in FIG. 16C in which a plurality of sampling inlets 166*a-c* introduce the sampled ions into a plurality of ion trapping devices 168*a-c*, and the ion trapping devices 168*a-c* are all connected to a single mass spectrometer. In this case, multiple ion beams are introduced to a single instrument from multiple ion paths and the ion beams merge inside the instrument. The ion funnels 168*a-c* shown in FIG. 16B are used to show examples of ion trapping devices that may be used. In one or more embodiments, instead of ion funnel, any other ion optical device that is configured to or is capable of trapping ions may be used. For example, instead of ion funnels, structures for lossless ion manipulation, ion processors, multipole trapping ion guides, or any other device that may trap ions may be used as ion trapping devices.

Figure 1:
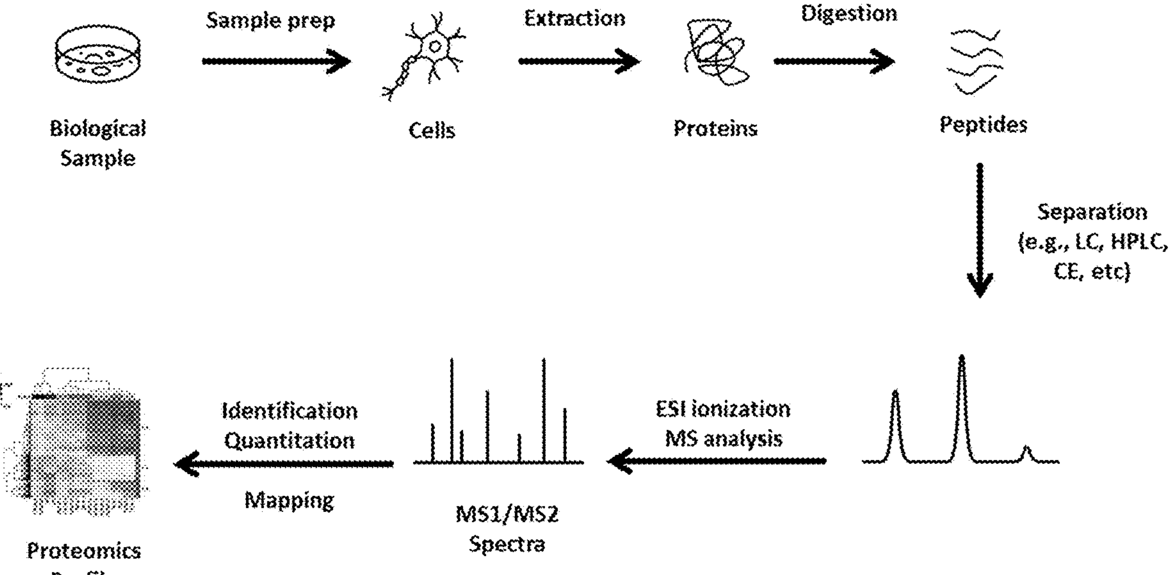
FIG. 1 shows a typical workflow for bottom-up proteomics analysis using liquid chromatography mass spectrometry.
Figure 2A:
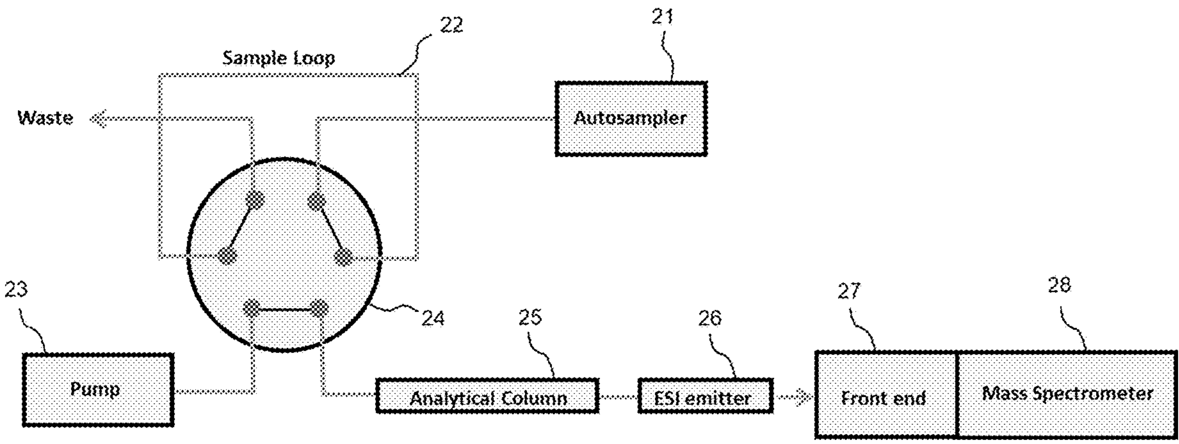
FIGS. 2A-B show a typical liquid chromatography mass spectrometry workflow.
Figure 2B:
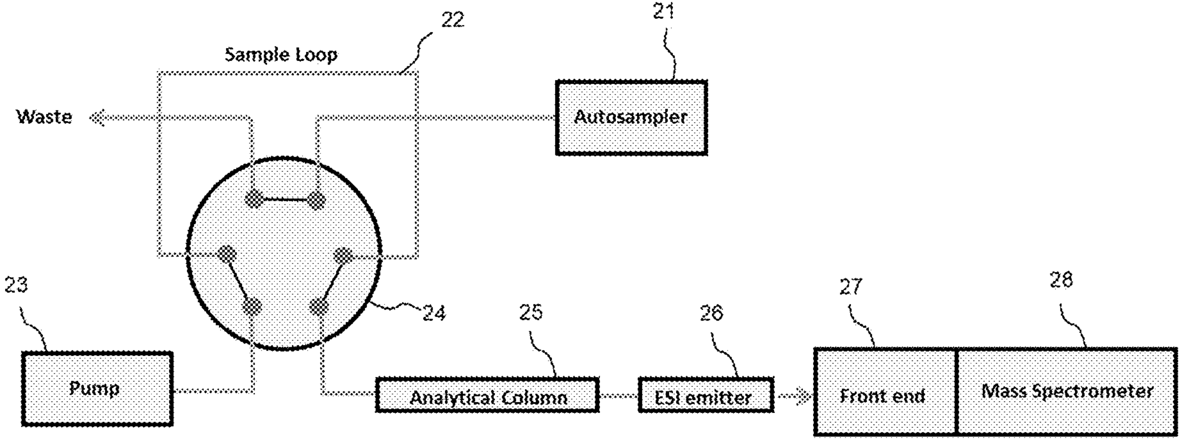
Figure 3:
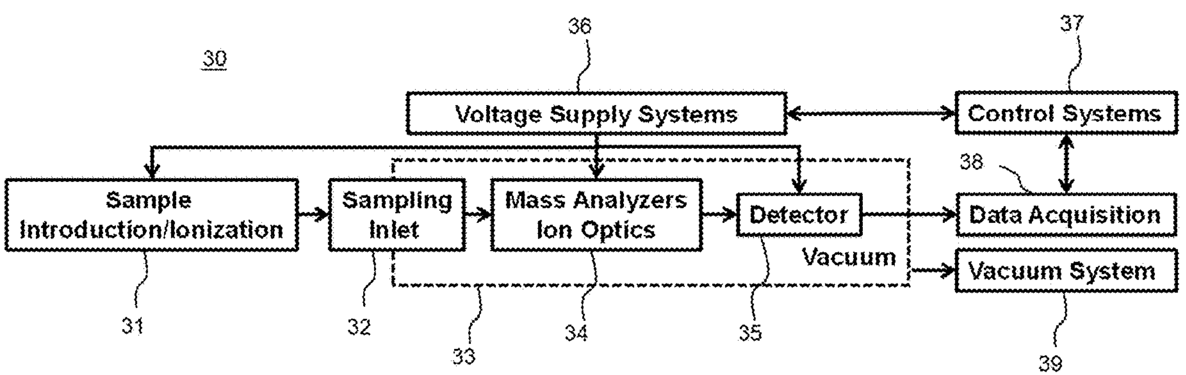
FIG. 3 shows a block diagram of a typical mass spectrometry system.
Figure 4:
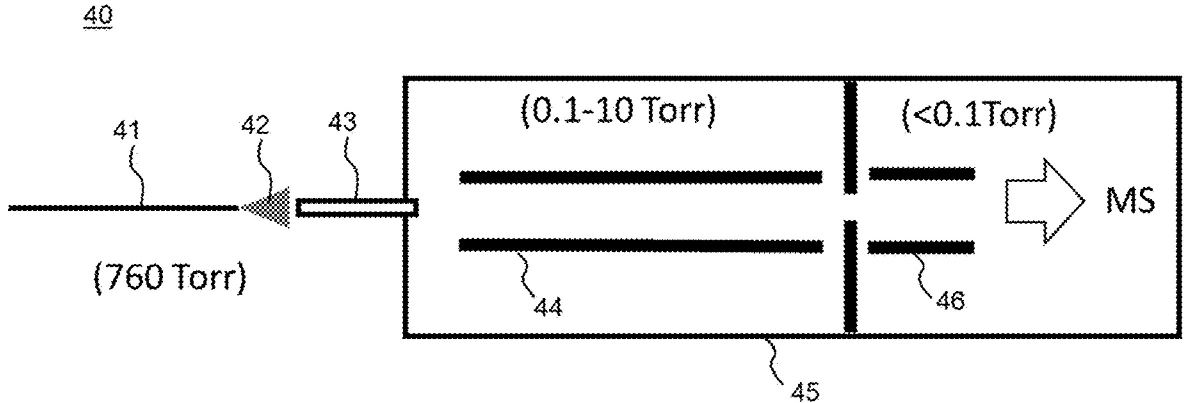
FIG. 4 shows a typical front-end module of a mass spectrometry system.
Figure 5:
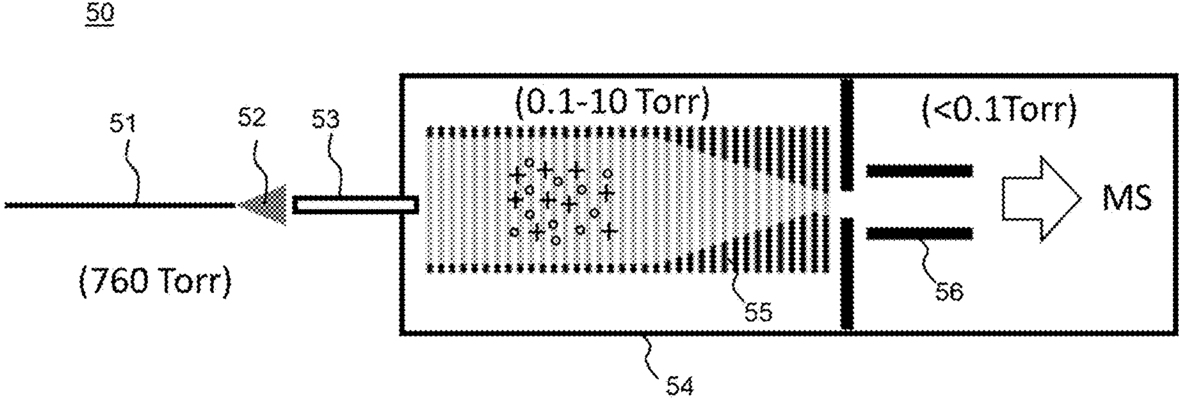
FIG. 5 shows a typical front-end module of a mass spectrometry system.
Figure 6:
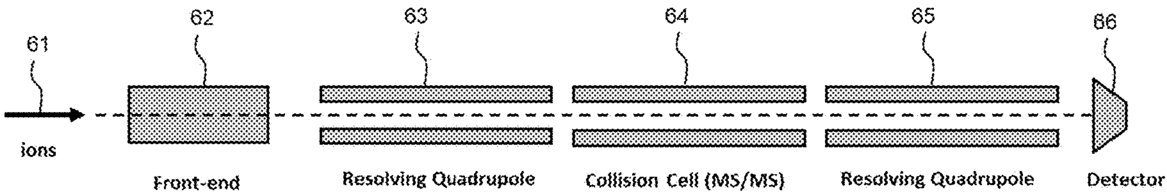
FIG. 6 shows a typical triple quadrupole mass spectrometry system.
Figure 7:
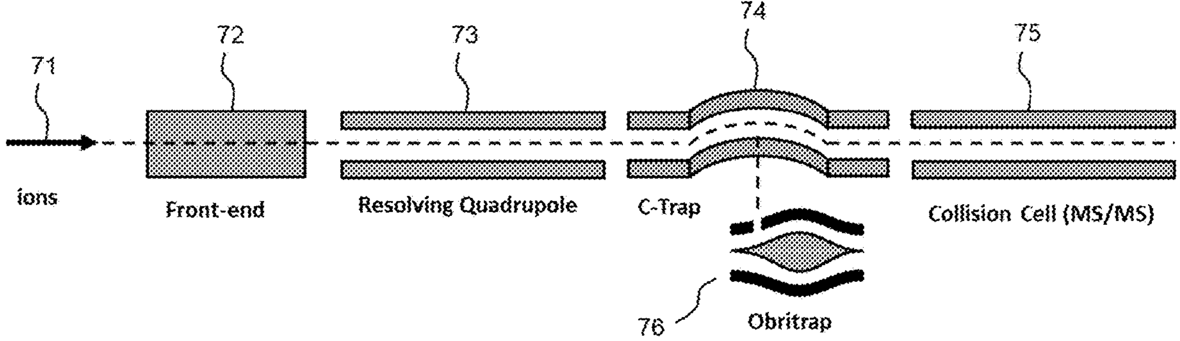
FIG. 7 shows a typical electrostatic trap mass spectrometry system.
Figure 8:
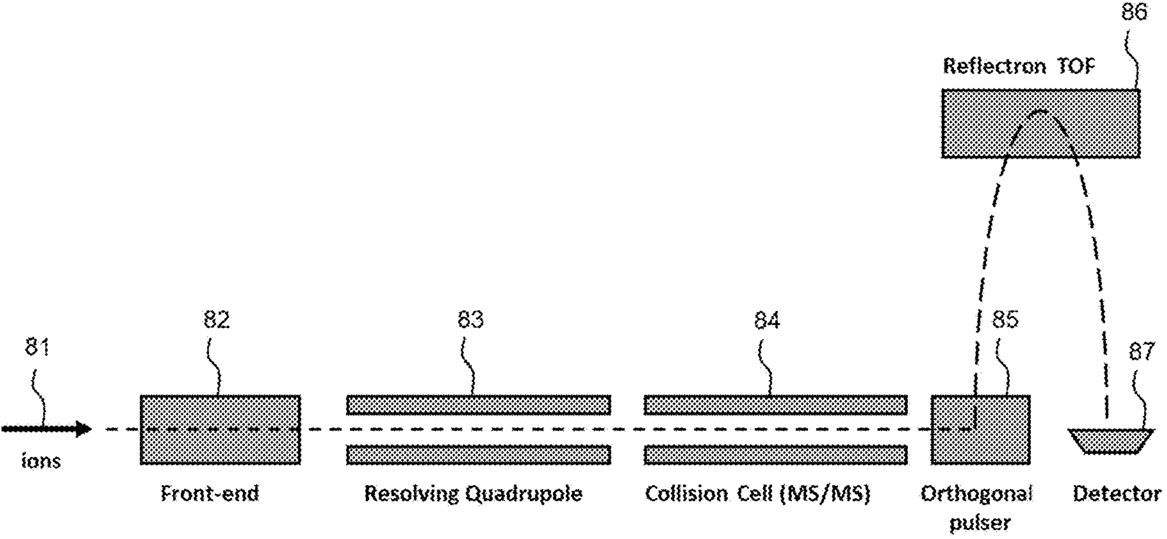
FIG. 8 shows a typical quadrupole time of flight mass spectrometry system.
Figure 17A:
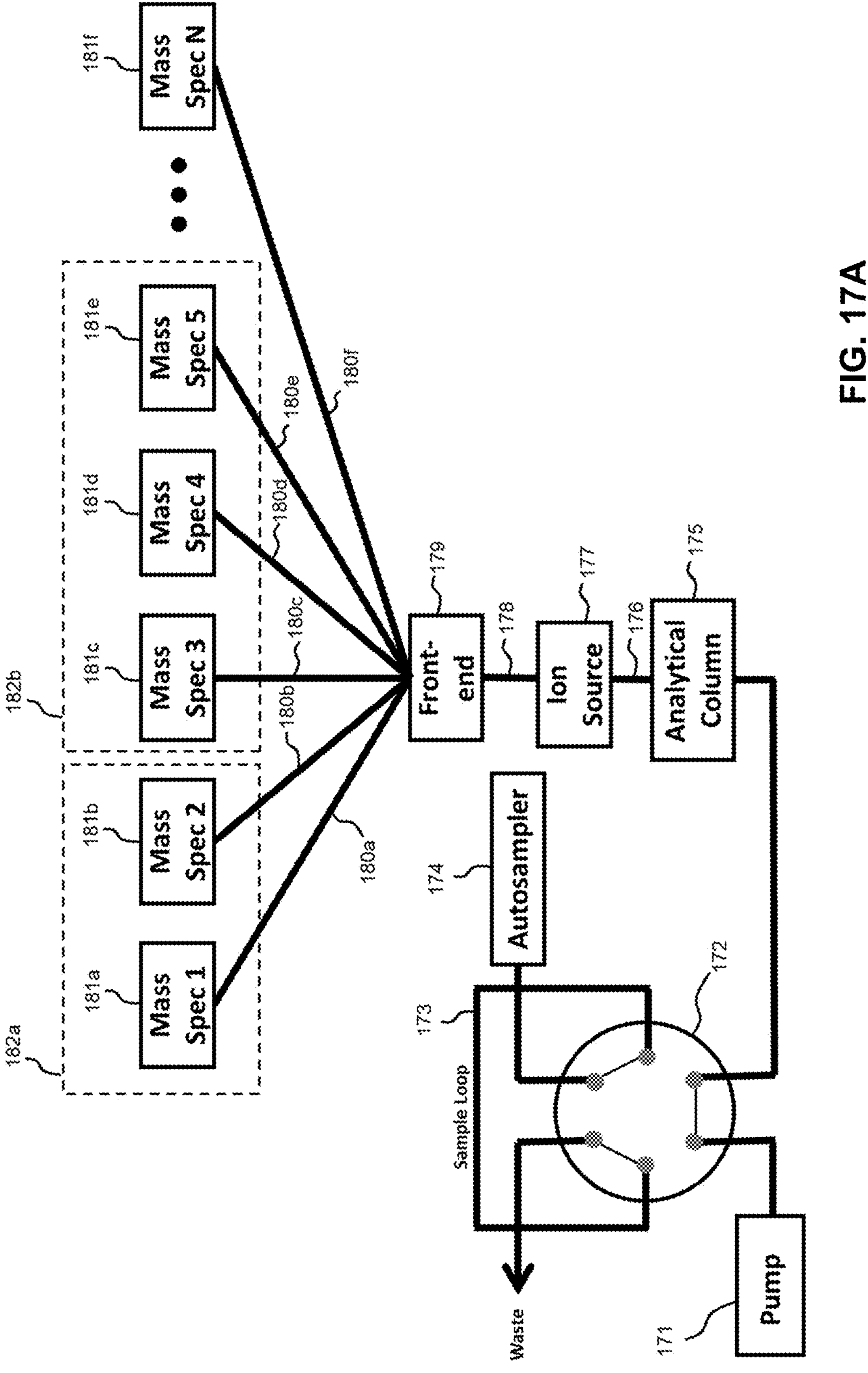
FIG. 17A-B show a mass spectrometry system in accordance with one or more embodiments of the present disclosure.
Figure 17B:
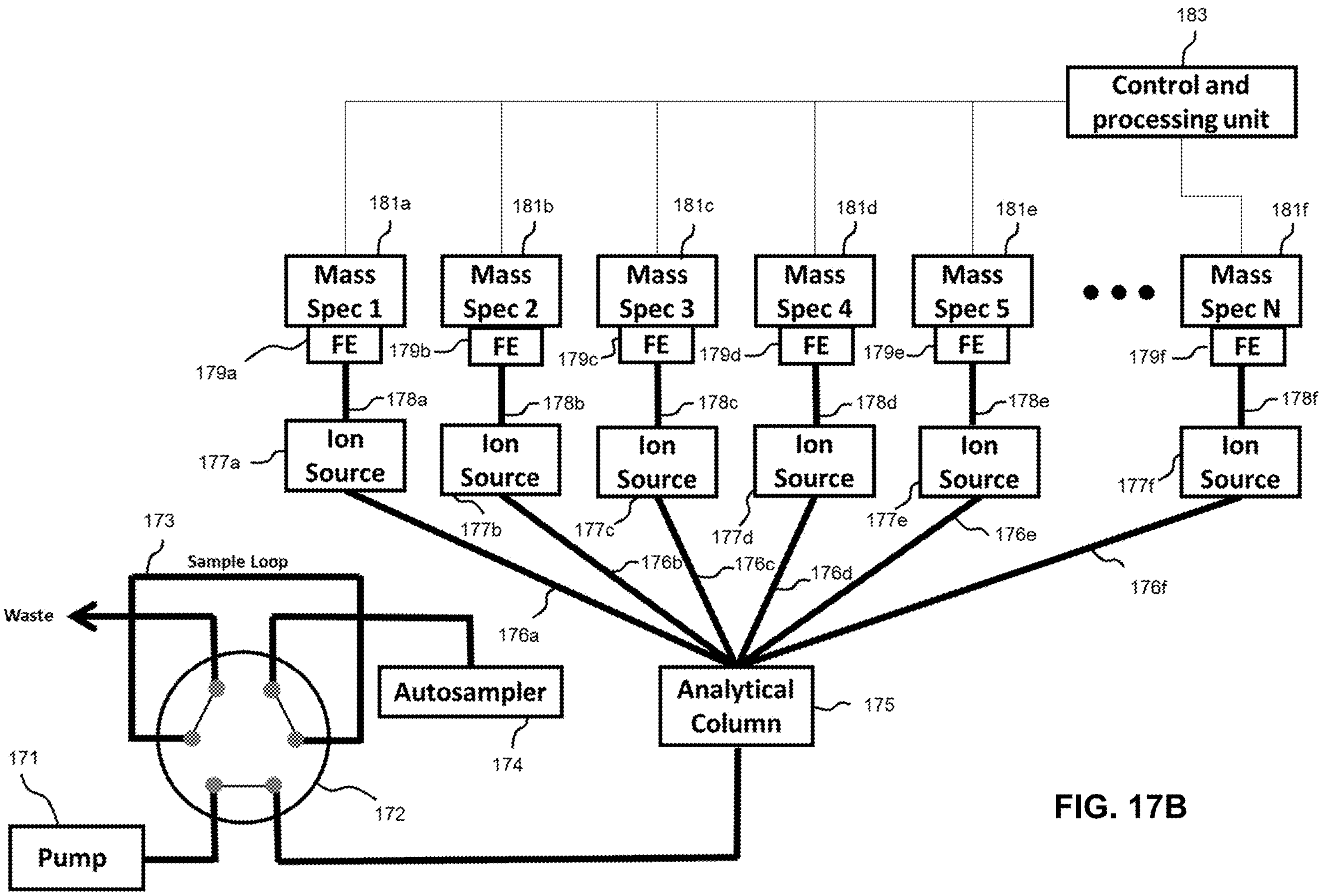

FIG. 17A shows a block diagram of a mass spectrometry system in accordance with one or more embodiments of the present disclosure. While the present example is described in the context of LC separation prior to mass spectrometry, in one or more embodiments, the sample may be injected with a syringe pump to the electrospray ions source, and the chromatography front-end separation may not be present. An autosampler 174 introduces a fluidic sample including a plurality of analytes at different concentrations from one or more sample holders of the autosampler 174 to a sample loop 173 via a six-way rotary valve 172 such that the sample loop 173 is filled with a predetermined volume of sample. Then, the six-way rotary valve 172 switches (similar to the rotary valve of FIGS. 2A-B) and allows a pump 171 to push and inject the sample inside the sample loop 173 through an analytical column 175. The analytical column 175 may be a chromatography column used in chromatography for the separation of chemical compounds, for example, LC, HPLC, Partition chromatography, Normal-phase chromatography, Displacement chromatography, Reversed-phase chromatography (RPC), Size-exclusion chromatography, Ion-exchange chromatography, or Bio-affinity chromatography, or any type of chromatography separation. A chromatography column contains the stationary phase, allowing the mobile phase to pass through it. A chromatography column may be packed with stationary phase particle sizes ranging between 3-5 micrometers. The analytes of the sample introduced into the analytical column 175 then elute from the analytical column 175 based on the characteristic of each analyte and the corresponding elution times of each compound or analyte. The eluted compounds, which may have elution profiles similar to those shown in FIGS. 11A-B, then travel in tubing 176 and enter an electrospray ion source 177 and sprayed 178 to the front-end 179. The electrospray ion source 177 may be any derivation of an ESI source such as desorption electrospray source (DESI), or any other type of ion source that may be operated in ambient environment or reduced pressure such as an atmospheric pressure chemical ionization (APCI) source. Examples for close up views and detailed disclosure of the ion source 177, the spray 178, and the front-end 179 are shown, for example, in FIGS. 15A-D and 16A-C. A plurality of ion guides 180*a-f* transfer the ions to a plurality of mass spectrometers 181*a-f*. The plurality of mass spectrometers may be grouped as clusters of mass spectrometer 182*a-b*. A cluster 182*a-b* may include one or more mass spectrometers of different or the same type. Each mass spectrometer cluster 182*a-b* may include one or more mass spectrometers 181*a-f*. In the exemplary embodiment shown in FIG. 17A, a first cluster 182*a* includes first and second mass spectrometers 181*a-b* and a second cluster 182*b* includes a third, a fourth, and a fifth mass spectrometer 181*c-e*. In other embodiments, a cluster may include one or more mass spectrometers such that the mass spectrometers in each cluster, in conjunction with one another, produce analytical measurements of a sample. For example, a first cluster (or a mass spectrometer or a mass spectrometry cluster) may include a plurality of triple quadrupole instruments each of which is programmed to perform targeted MS1 or targeted analysis of a small group of predetermined compounds, each with a narrow or even customized precursor isolation window. The combination of mass spectrometers, the front-end, and the ion source along with algorithms of operating the mass spectrometers in communication with each other may be referred in the present disclosure as a super mass spectrometer. FIG. 17B shows an alternative embodiment of the present disclosure in which multiple fluidic lines are routed to each ion source of a mass spectrometer. This is similar to FIG. 17A with the difference the fluidic lines are split and routed to each mass spectrometer and therefore the speed at which the analytes reach each mass spectrometer is much longer and the delays between the different fluidic lines 176*a-f* may be much longer than those shown in FIG. 17A.

In one or more embodiments of a super mass spectrometer, one of the mass spectrometers in a super mass spectrometer may be equipped with front-end ion mobility separation such as Trapped Ion Mobility Spectrometry time of flight mass spectrometer (timsTOF) or any other mass spectrometer with front-end ion mobility separation. The front-end ion mobility separation allows for separate detection or measurement of two or more isobaric compounds with the mass spectrometer. Isobaric compounds are compounds with the same nominal molecular mass but different molecular formulas. The mass spectrometer equipped with front-end ion mobility separation may produce information about, for example, the existence and/or the abundance of the isobaric compounds along with the molecular mass for the isobaric compounds. This information may then be used by a central processor, for example, in conjunction with the information received from the other mass spectrometers in the super mass spectrometer to interpret the mass spectrometry measurements acquired by the other mass spectrometers, wherein the other mass spectrometers may not be capable of resolving isobaric compounds with required resolution (for example 1 amu or less), and therefore, may only be capable of measuring isobaric compounds as aggregate or a single peak. For example, the mass spectrometer with front-end ion mobility separation may report to the processor that the isobaric compounds measured at a certain mass includes or is made of up 10% precent of molecule A, 20% precent of molecule B, and 70% percent of molecule C (total 100%) such that all molecules A, B, and C have the same molecular mass. This information then may be used by the central processor to interpret results and measurements by the other mass spectrometers that are only capable of producing a single aggregate measurement for the A, B, and C molecules and determine the composition.

Figure 20B:
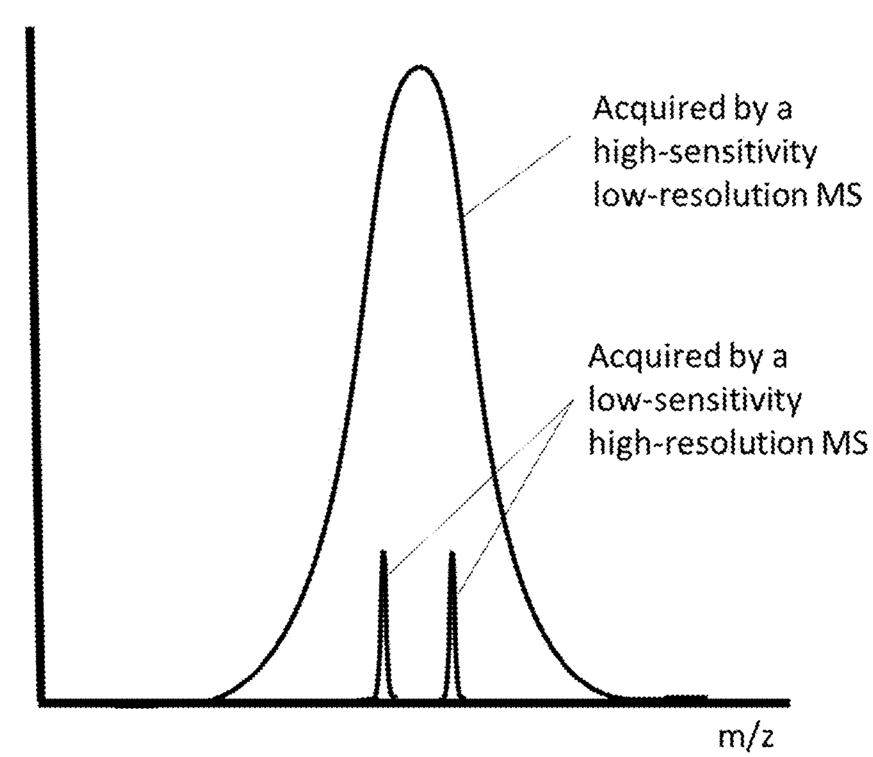

In one or more embodiments of the present disclosure, a first mass spectrometer of a super mass spectrometer or in a cluster may provide a higher resolution but lower sensitivity than a second mass spectrometer. The higher resolution of the first mass spectrometers allows for separation of two or more compounds that are close in molecular mass (for example such as those in FIG. 20B). The value for "close in molecular mass" may be for example, 1 atomic unit or less than 1 atomic unit difference in molecular mass, or may be for example, any value greater than zero. The value for "close in molecular mass" may be also mean that the delta in molecular mass below which the second mass spectrometer in the super mass spectrometer is not capable of resolving (producing two or more distinct peaks or measurements with respect to each different molecular mass of these two or more compounds). For example, FIG. 20B shows a high-sensitivity and low-resolution peak from one mass spectrometer that provides a much stronger signal but is not able to resolve all the species, and a high-resolution and low-sensitivity peak from another mass spectrometer that provides smaller signal but is able to resolve two peaks, indicating existence of two peaks in the larger signal (acquired with lower resolution but higher sensitivity) while providing information about relative abundance of each of the two peaks with respect to the other. The first mass spectrometer with higher resolution may produce information about, for example, the existence and/or the abundance of the two or more compounds that are close in molecular mass. The first mass spectrometer may only interrogate sample for existence of m/z values that are closer than a predetermined mass window or value (for example m/z values that are closer than 1 atomic mass unit (amu) or less to each other). This information may then be used by a central processor, for example, in conjunction with the information received from the second mass spectrometer in the super mass spectrometer to interpret the mass spectrometry measurements acquired by the second mass spectrometer, wherein the second mass spectrometer is a high sensitivity low resolution instrument (not capable of resolving the two or more compounds close in molecular mass), and therefore, is only capable of measuring the two or more molecules as aggregate but with a higher sensitivity than the other mass spectrometer (which is high resolution but not high sensitivity compared to the other mass spectrometer). For example, the mass spectrometer with higher resolution may report to the processor the relative abundance of the two or more compounds close in molecular mass, for example, that the two or more compounds close in molecular mass include 10% precent of molecule A, 20% precent of molecule B, and 70% percent of molecule C (total 100%). This information then may be used by the central processor to interpret the high-sensitivity measurement by the other mass spectrometers that are only capable of producing a single aggregate measurement for the A, B, and C molecules due to low resolution. It is important to note that, in certain types of mass spectrometers, parameters or settings may be adjusted by operator to tune a mass spectrometer for specific measurements. For example, in an Orbitrap® mass spectrometer, the resolution and cycle time (or detection time) of an instrument have an inverse relationship or are inversely proportional. That is, affording more time for ions to orbit inside the trap results in a higher resolution. As another example, in quadrupole mass spectrometers, sensitivity and resolution are inversely proportional or have an inverse relationship to each other, meaning a high-resolution setting on instrument produces a less sensitive measurement, and a low-resolution setting on instrument produces a more sensitive measurement. That is, the settings of an instrument may be adjusted to obtain higher resolution or sensitivity.

One or more embodiments of the present disclosure provide the following advantages. For example, a high-resolution instrument, such as an Orbitrap®, or a TOF may be used for acquiring resolution measurements because such instruments inherently provide high resolution measurements, meaning a delta or difference between to adjacent peaks may be very small and a fraction of mass of a proton (1 amu). These instruments are also known as High-Resolution, Accurate-Mass (HRAM) Mass Spectrometers which are a class of mass spectrometry instrumentation with capability to resolve complex sample matrix and to allow identification of compounds by measuring their accurate molecular masses. On the other hand, triple quadruple instruments may provide low resolution measurements with high sensitivity. In one or more embodiments, two or more quadrupole or triple quadrupole instruments in a cluster provide an extended dynamic range by tuning each of the instrument to only receive, measure, record and report a certain concentration range within the allocated dynamic range. Dynamic range may be a measure of the detection range of a detector or may be the ratio of the largest to smallest detectable signal. The central processor then may combine the molecular mass measurements with high resolution instruments with abundance measurements from high sensitivity instruments and multiple instruments to extend the dynamic range. For example, high resolution measurements may yield information about existence of molecules at m/z of 500.10, 500.20, and 502.00 with relative abundance of 10%, 20%, and 70%, respectively. Acquiring this information with the high-resolution instrument then allows for using a lower resolution (thus higher sensitivity) setting on one or more triple quadrupole instruments. For example, the triple quadrupole instrument may be adjusted to run at a 3 atomic mass unit (amu) setting (which is considered a low-resolution setting by those skilled in the art) thus providing more sensitive measurements but with the lower resolution of 3 amu (meaning any molecules that their corresponding m/z values are less than 3 amu show up in the spectrum as a single aggregate peak). Then, the central processor may combine the molecular mass information from the high-resolution instrument with the abundance measurement to construct mass spectrometry results. If there is a fourth compound in the above example at m/z of 505 with 0.000001% relative abundance (an abundance that below the dynamic range in the case or alternatively an abundance that is above the dynamic range), a mass spectrometer is required to measure or tasked with measuring the wide range of present abundance (0.000001% to 70%) would put a significant burden on dynamic range requirements. To solve this problem, two mass spectrometers may be used to measure the relative abundances, for example one in the range of 0.000001% to 0.01% and another in the range of 0.01% to 70%. As it would be understood and appreciated by a skilled artisan, combining measurement results of different mass spectrometers solves significant mass spectrometry measurement challenges. For example, as understood by those skilled in the art, this provides significant advantages in molecular identification and quantitation with mass spectrometry for-omics applications because measurements with conventional instrument requires a compromise between sensitivity, scan speed, dynamic range, and other analytical figures of merits in each measurement. Further, as discussed above, each different mass spectrometry technology offers advantages and disadvantages, and therefore, the embodiments disclosed herein allows one to combine the strength and advantages of each technique for analytical measurements. The above method for constructing mass spectrometry results and the combination of mass spectrometers in the super mass spectrometer, each with different measurement capabilities and advantages, may be used in various analytical, clinical, and/or biological research studies.

In one or more embodiments of the present disclosure, one or more mass spectrometers of a super mass spectrometer may only measure MS1 scans, and one or more other mass spectrometers may measure MS2 (or MS/MS) scans. The one or more mass spectrometers may measure MS1 scan with high sensitivity to provide quantitative measurements, for example, by providing the required number of data points for accurately measuring the area under an LC curve, for example 10 or more data points. Then, the MS2 scans by the other mass spectrometer are only obtained for a single of the data points for the LC curve. In this exemplary embodiment, the central processor may combine the quantitative MS1 measurements from the one or more mass spectrometers, with the MS/MS (or MS2 or tandem mass) measurements by the other two or more mass spectrometers to construct mass spectrometry results. The MS/MS fragmentation used by each of the other two or more mass spectrometers may be the same or different, for example, collision-induced dissociation (CID) through collision with neutral molecule (e.g., nitrogen), surface-induced dissociation (SID) using fast moving ions collision with a solid surface, laser induced dissociation which uses laser to induce the ion formation, electron-capture dissociation (ECD) due to capturing of low energy electrons, electron-transfer dissociation (ETD) through electron transfer between ions, negative electron-transfer dissociation (NETD), electron-detachment dissociation (EDD), photo-dissociation, particularly infrared multiphoton dissociation (IRMPD) using IR radiation for the bombardment and blackbody infrared radiative dissociation (BIRD) which use IR radiation instead of laser, higher-energy C-trap dissociation (HCD), EISA, and charge remote fragmentation.

In one or more embodiments of the present disclosure, the central processor constructs the mass spectrometry results by combining quantitative results from MS1 scans (or the first group of mass spectrometers), and the corresponding structural information from the MS/MS scans (or obtained by the second group of mass spectrometers). A group of mass spectrometers may be defined as one or more mass spectrometers or a cluster of mass spectrometers, or simply a cluster. In another exemplary embodiment, the central processor may combine the high quantitative measurements from the first group of mass spectrometers, MS/MS measurements from the second group of mass spectrometers, and molecular mass measurements from the third group of mass spectrometers wherein the third group of mass provide high resolution molecular mass. The mass spectra obtained by combining different measurement results from different mass spectrometers from a plurality of substantially similar or identical ion beams may be referred to as super mass spectra in the present disclosure.

Figure 18A:
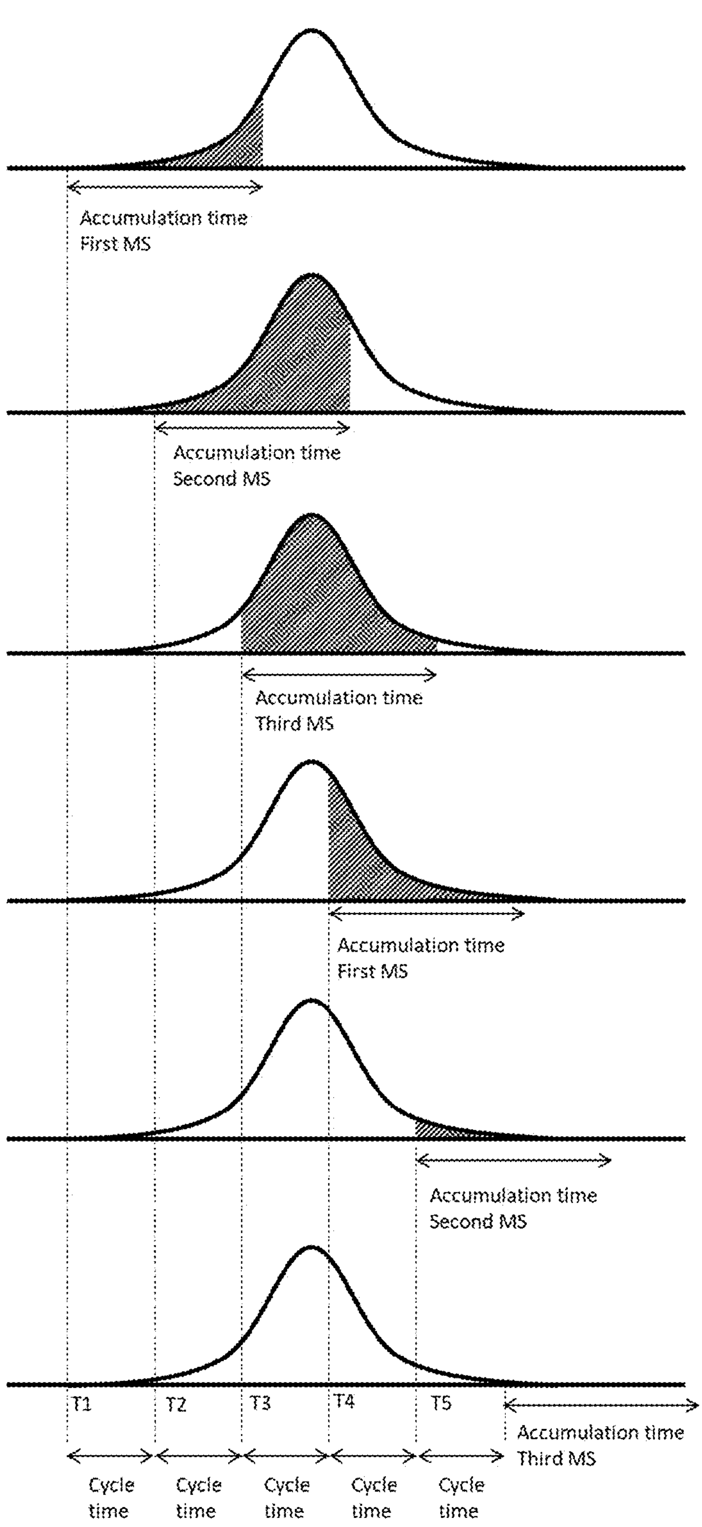
FIG. 18A-C show cycle time and accumulation time of a plurality of mass spectrometer in a mass spectrometry system and measurements of elution profile of a chromatographic peak in a super sensitive mode of a mass spectrometry system in accordance with one or more embodiments of the present disclosure.
Figure 18B:
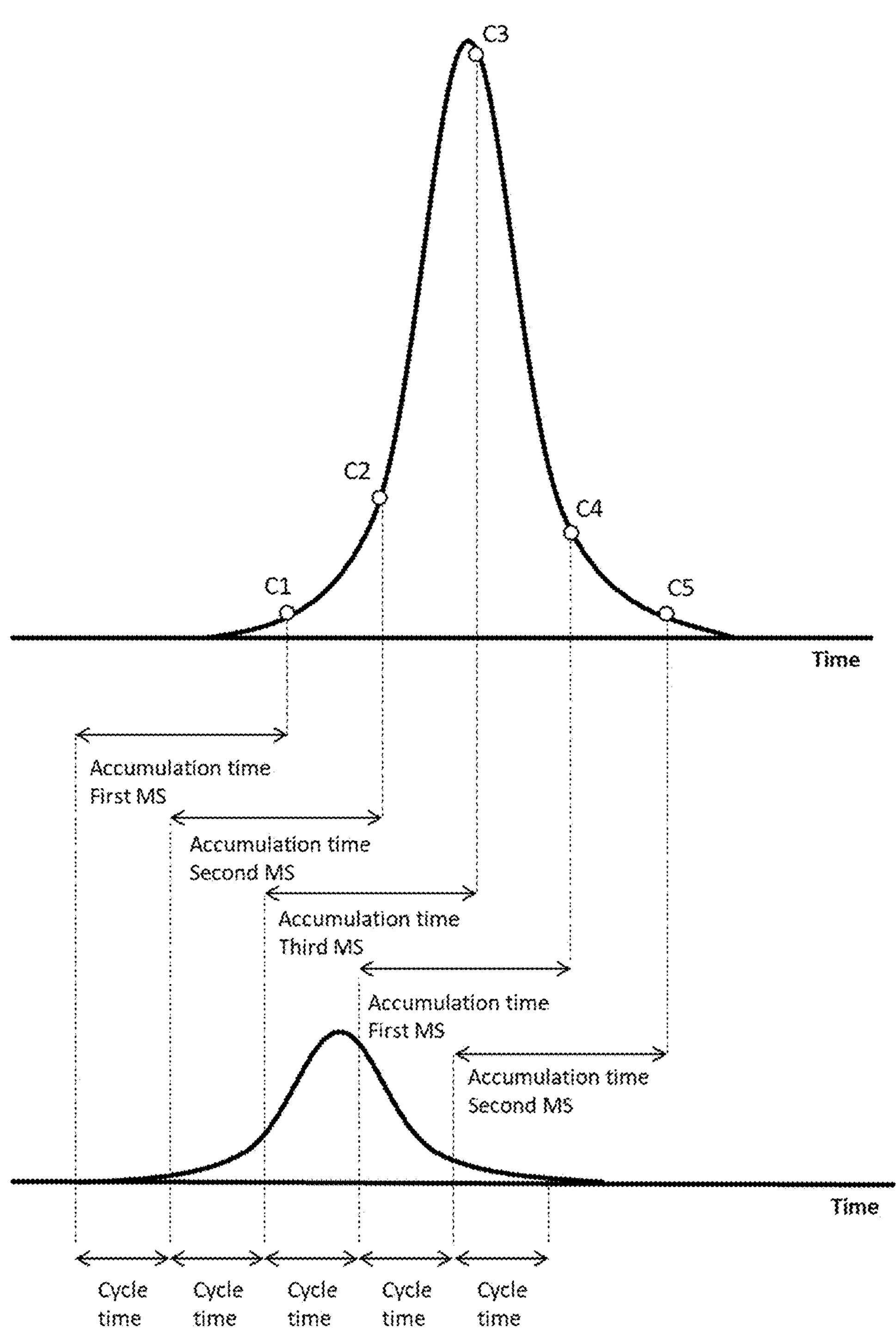
Figure 18C:
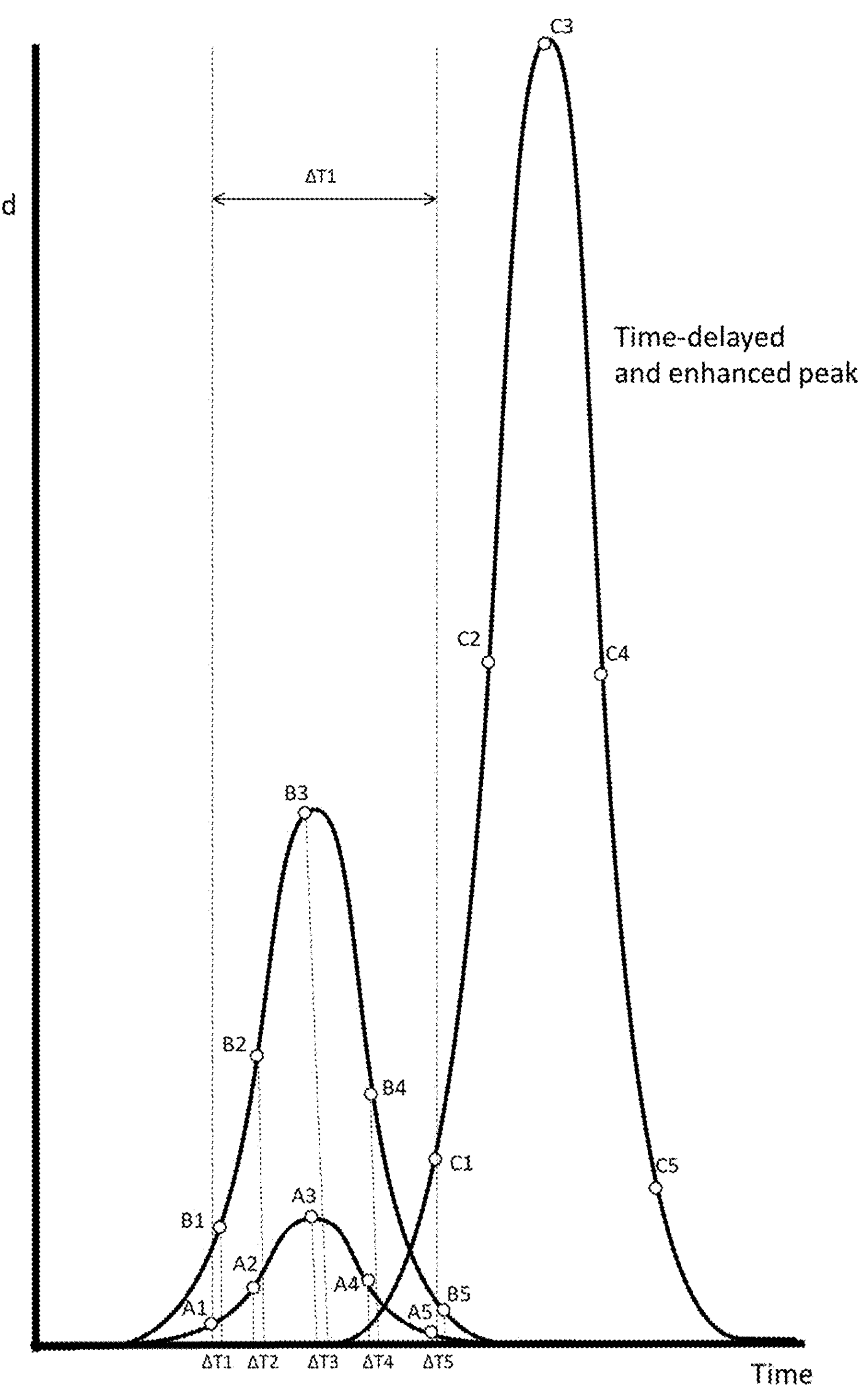

FIGS. 18A-C show cycle time and accumulation time of a plurality of mass spectrometer during measurements of a hypothetical elution profile of a chromatographic peak in accordance with one or more embodiments of the present disclosure such that the sensitivity of measurement is increased by increasing ion accumulation time for each instrument while maintaining a cycle time that may be smaller than the ion accumulation times. This configuration allows for increasing accumulation time of each instrument and at the same time maintaining the required cycle time for the cluster, which may be shorter than the cycle time for each MS. In this configuration the significant advantage is that ion accumulation times or dwell time and cycle times in system level may be independently adjusted such that ion accumulation times or dwell times exceed the duty cycle of the mass spectrometry system as a whole (or a super mass spectrometer). In this configuration, a first mass spectrometer starts accumulating ions at T1 for a predetermined amount of time indicated by accumulation time of the first MS. Then the first mass spectrometer measures the accumulated ions at the end of the accumulation time of first mass spectrometer and produces a data point indicated by C1 in FIG. 18B. With a predetermined delay, indicated by cycle time, a second mass spectrometer starts accumulating ions at T2 for a predetermined amount of time indicated by accumulation time of second MS. Then the second mass spectrometer measures the accumulated ions at the end of the accumulation time of second mass spectrometer and produces a data point indicated by C2 in FIG. 18B, and so on and so forth. This configuration is particularly useful for measuring analytes with low abundance because increasing the accumulation time allows for more analyte ions to be gathered prior to measurements with the mass analyzer to increase the signal to noise ratio. As shown in FIG. 18C, compared to the conventional method of mass spectrometry measurement shown in FIGS. 13A-C, the above-disclosed configuration, in which the cycle time for measurements is adjusted independent of ion accumulation times, allows to produce a higher signal intensity for analytes and therefore is useful for measuring analytes of low abundance in which accumulation times shorter than cycle times are not able to produce accurate quantitative results because the data point A1-5 may be very close to the noise level of an instrument and/or below a detection limit of the instrument. A survey scan in a super mass spectrometry having Source Delay may be performed to identify chromatographic peaks of low abundance. Based on the survey scan and the determined species of low abundance, a cluster of mass spectrometers with the above-disclosed configuration may be instructed to perform measurements with super sensitivity, wherein super sensitivity measurement is defined to be a measurement performed by a mass spectrometry cluster in which ion accumulation times exceed the cycle times of the cluster an example of which is disclosed above.

A mass spectrometry system in this configuration includes a plurality of mass spectrometers that are synchronized to accumulate ions such that each mass spectrometer starts accumulating ions after a predetermined delay with respect to another mass spectrometer. The predetermined delay defines the cycle time of the mass spectrometry system. The cycle time in this configuration may be defined to be a single value or might be defined to be different values. It other words, the delay between T1-T2, T2-T3, etc. of FIG. 18A might be the same or different. Similarly, the accumulation time of each mass spectrometer might be different or the same. The accumulation time may be for example, in the range of 1 microsecond to several seconds or tens of seconds or more. The cycle time may be in the range of 1 microsecond to several seconds or tens of seconds, and is typically defined or adjusted to provide the required number of data points to accurately reconstruct a chromatographic profile, for example 5 to 20 or more data points. This configuration provides the advantage that the cycle time may be reduced to increase the number of data points independently of or without reducing the ion accumulation times. This is impossible in conventional prior art mass spectrometers. As shown in FIG. 18C, the resulting peak measured with this configuration has a time delay (shown as deltaT1 between A1 and C1) with respect to conventional methods because of the increase in the ion accumulation time of each MS. In other words, if each mass spectrometry instrument is required to spend more time accumulating ions prior to analysis, then the results of the analysis or the corresponding data point would start with a delay that is defined by the ion accumulation time. This is shown with deltaT1 between A1 and C1 or A1 and B1 in FIG. 18C.

In the super sensitive measurement mode disclosed above, the improvement in sensitivity comes from performing measurements with larger ion accumulation times on each instrument. For example, if there are five synchronized instruments, at time T0, the first mass spectrometer starts accumulating ions for 1 second, and then the second mass spectrometer starts accumulating ions at T0+200 ms for 1 second, and so on and so forth. This may provide 5 data points in a second, and each data point is obtained with 1 second accumulation time. In the conventional way of performing such a measurement with a prior art instrument (serial ion processing or single ion beam instruments), only a single data point may be acquired with a one second accumulation time, or five data points with 200 ms accumulation time may be obtained. This is particularly advantageous for DIA workflows with front-end LC separation. While ion sources are running close to 100% duty cycle in DIA mode but only a very small portion (<1%) of ions produced at the ion source pass through the interface and find their way to the instrument for measurements. One or more embodiments of the present application provides system and methods to disclose using a single ion source to produce multiple ion beams to simultaneously feed all mass spectrometers in a mass spectrometry system. For example, a multi-emitter ESI source is placed in front of a bundle of closely packed transfer tubes each going to a different mass spectrometer. This configuration may provide the same number or intensity of ions or ion beam to each instrument for measurement. For example, if an ion source operates at 100% duty cycle in conventional system, an embodiment of the present disclosure with two ion beams provides a 200% duty cycle for the ion source.

Figure 19:
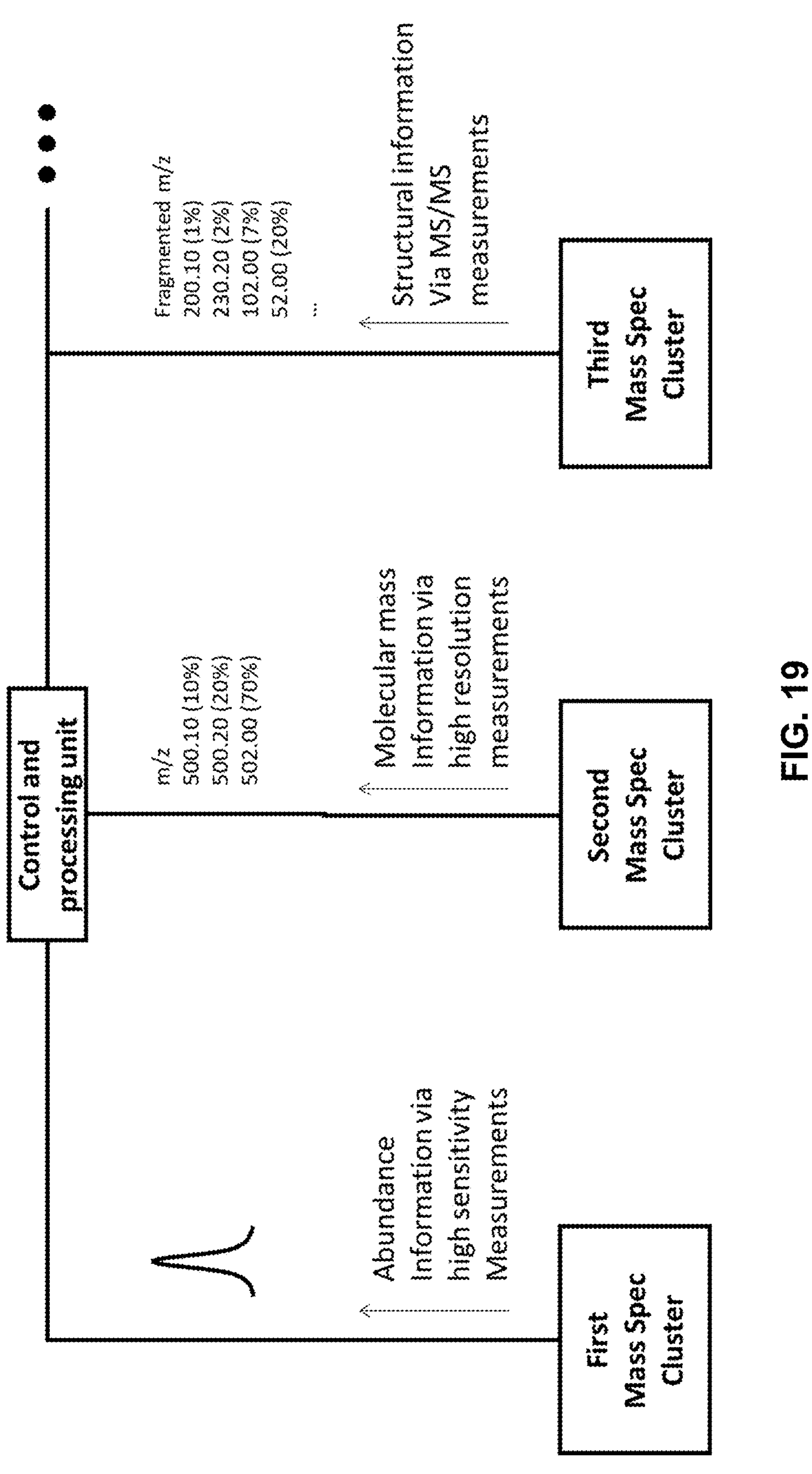
FIG. 19 shows a mass spectrometry system that is connected to and communicate with a central processing unit in accordance with one or more embodiments of the present disclosure.

FIG. 19 shows a mass spectrometry system in accordance with one or more embodiments of the present disclosure such that a plurality of mass spectrometry clusters, each cluster including one or more mass spectrometers, perform mass spectrometry measurements, each cluster performing measurements in a specific dimension (e.g., abundance, molecular mass, tandem or MS/MS, or ion mobility, etc.) and report the mass spectrometry measurement results to a control and processing unit that receives the information form each cluster and constructs or generates a mass spectrometry data by combining the information. For example, a first mass spectrometry cluster measures abundance information for the analytes. This may include high sensitivity measurements with extended dynamic range. This may include using mass spectrometers that provides the highest signal to noise ratio for the measurements. One of the mass spectrometers may be assigned to analytes (or m/z values) of low concentration and another mass spectrometer may be assigned to analytes (or m/z values) of high concentration to extend the dynamic range. The concentration information of analytes may be provided by a mass spectrometer that is able or configured to provide preliminary measurement result in advance if used with an electrospray source with delayed sprays as discussed above. A second cluster measures molecular mass information with high resolution and reports the accurate mass measurements to the control and processing unit. Since the first cluster is responsible for or assigned with a task of measuring the abundance information, therefore, the second cluster may only perform high resolution measurements in a single data point. FIG. 20B show an example of such measurement by two mass spectrometers where a high intensity peak is obtained by the first mass spectrometer, and two low intensity peaks are acquired with high resolution from the two parallel ion beam of the same composition. This is advantageous because the cycle time burden for quantitative measurements is removed from the second cluster. In other words, the second cluster is not responsible for profiling a chromatographic peak (in this case, it is the first cluster's responsibility) and is only required to measure and provide information regarding accurate mass of compound in that peak. Therefore, the total cycle time may be increased to provide high resolution, which is particularly useful for an Orbitrap® instrument as understood and appreciate by those skilled in the art. In other words, for a chromatographic peak, the instrument is required to only provide a single data point that includes accurate mass measurements, and the entire width of the chromatographic peak may be used for this single measurement. In case of Orbitrap®, that results in extremely high-resolution measurement. In case of low abundant ions, having the information in advance, an Orbitrap® instrument may accumulate ions for half of the peak length and then allocate the other half to mass analysis. Similarly, the third cluster may provide structural information by MS/MS measurements or collisional cross-section measurements by ion mobility. Again, since the third cluster is not responsible for peak profiling, the third cluster may only provide a single data point that includes the fragmentation or collisional cross-section information for the specific analyte of the chromatographic peak. The central processor then may combine the data and produce a super mass spectrum an example of which is shown in FIGS. 20C and 20D.

With reference to FIG. 20A, in one or more embodiments of the present disclosure, the electrospray source of a super mass spectrometer may include a delayed electrospray ion source. A first mass spectrometer of the super mass spectrometer may receive ions prior to other mass spectrometers via the delayed electrospray source and may perform a preliminary or survey MS1 scan of the eluted compounds to produce MS1 measurement results. The duty cycle (duty cycle and the cycle time in FIG. 20A and the following disclosures are used interchangeably indicating cycle time) of the first mass spectrometer may be preferably much shorter in time than the chromatographic peak width to produce quantitative results. In other words, the duty cycle of the first mass spectrometer may be shorter than the chromatographic peak width to make sure, for example, 10 or more data points are produced with MS1 scan for each chromatographic peak by the first mass spectrometer. Then the first mass spectrometer records the timestamp for the maximum point or apex of the peak (i.e., T1, T2, and T3 as shown in FIG. 20A), and reports the recorded timestamps along with the m/z value to the central processing unit. The central processing unit may then instruct a second mass spectrometer to conduct MS/MS analysis at the corresponding delayed timestamps (i.e., T1+Td, T2+Td, and T3+Td, where Td is the relevant line delay of the electrospray source, or the Source Delay as shown in FIG. 15E such that for example Td is a multiple of duty cycle or cycle time) to produce MS/MS structural information for each of the peaks A, B, and C. The central processing unit may also produce a list based on the survey scan that instructs a third mass spectrometer to exclude the m/z values based on, for example, a predetermined value for peak height or intensity or abundance of the corresponding analyte. This allows for or instructs the third mass spectrometer to exclude peak having a higher intensity value than the predetermined value to be excluded in the analysis, and therefore, allocate the cycle time to measure less abundant compounds. For example, in a trapping analyzer with front end quadrupole, the quadrupole may exclude, during the scanning of the m/z range, the m/z value associated with one or more of the most abundant peaks and avoid letting the trapping analyzer from receiving ions associated with peaks of high intensity and therefore avoiding saturating the ion trap with undesired ions. For example, in FIG. 20A, if the predetermined value for intensity is Hpvi between Ha and Hb, then the central processing unit may instruct the third mass spectrometer to exclude the m/z values for peaks B and C (which both have a higher intensity than the predetermined intensity value or Hpvi) but include the m/z value for peak A in the duty cycle.

The above-noted embodiment allows for extending a dynamic range of the system as a whole. For example, the first mass spectrometer may be used to only measure higher intensity peaks having intensities greater than the predetermined intensity value and the third mass spectrometer to only measure the lower intensity peaks having intensities lower than the predetermined intensity value. In order to maintain calibration between the first mass spectrometer and the third mass spectrometer each measuring a different dynamic range, two calibration standards may be used. The first calibration standard is tuned to high intensity peaks, and the second calibration standard is tuned to low intensity peaks such that the ratio between the two calibration standards is predefined and proportional to one another. Then, the central processing unit is able to calculate the absolute value of the measurements with different mass spectrometers using the ratio between the two calibration standards. Alternatively, a first calibration peak may be used when the two dynamic ranges are overlapping where the first calibration peak resides. And the ratio of the signal from two different instrument for the same identical first calibration peak may be used for normalizing the measurements in between the instruments.

In one or more embodiments of the present disclosure, a first instrument (for example, a triple quadrupole mass spectrometer) first measures signal intensities via a MS1 survey scan and reports back the m/z values along with corresponding signal intensities to the central processing unit. Then, the central processing unit produces one or more inclusion lists based on the m/z values and/or corresponding signal intensities and distributes the lists to one or more of second mass spectrometers (for example Orbitrap®) in preparation for the measurements eluted from the delayed electrospray line. Then, each of the second mass spectrometers allow for accumulation of ions in their trap only from the allocated m/z values in the inclusion list received from the central processing unit and/or determined based on their corresponding signal intensities. The central processing unit may produce the inclusion list based on signal intensities associated with m/z values. For example, the central processing unit may group the m/z values based on their signal intensities. This is advantageous to increase the dynamic range of the measurements. For example, the m/z values for top 20 values are assigned to a first mass spectrometer from the second mass spectrometers, the m/z values with the next top 20 values are assigned to the second mass spectrometer from the second mass spectrometers, the m/z values with the next top 20 values are assigned to the third mass spectrometer from the second mass spectrometers, and so on and so forth. In another embodiment, the m/z values for top 20 values are assigned to a first mass spectrometer from the second mass spectrometers, and an exclusion list is distributed to the other of the second mass spectrometers instructing them to exclude the top 20 intense peaks. These allocation, inclusion, and/or exclusion lists reduce the burden on the second mass spectrometers with respect to a required dynamic range on each instrument because the central processing unit instruct each of the second mass spectrometers to only measure m/z values having similar signal intensities, or signal intensities within a certain predefined range, and therefore the requirement for simultaneously measuring high intensity and low intensity peaks, which requires high dynamic range, is eliminated. The central processing unit may also calculate the required duty cycle or dwell times for each of the second mass spectrometers based on the total ion intensities of the m/z values in each group assigned to each of the second mass spectrometers. The central processing unit may distribute the calculated duty cycles or dwell times to all mass spectrometers.

In one or more embodiments, the central processing unit groups m/z values for each mass spectrometer of the second group of mass spectrometers based on total ion intensities of m/z values and similarity of their signal intensities. The central processing unit may have a total ion intensity target and may group different m/z values of similar intensity to reach this target. For example, if the target value for total ion intensities is around 100 arbitrary unit (which may be based on an ion trap's or Orbitrap®'s ion capacity), the central processing unit may select and group 10 different m/z values each having signal intensities in the range of 9 to 11 arbitrary units as the first group allocated (or assigned) to the first mass spectrometer, and may select and group 5 different m/z values each having signal intensities in the range of 19 to 21 arbitrary units as the second group allocated to the second mass spectrometer and so on and so forth. The same is applicable based on charge state and charge detection mass spectrometry. This grouping based on total ion intensity target is advantageous because it allows for extending the dynamic range of the measurements as a whole by reducing the dynamic range requirement for each individual mass spectrometer and also allows for a better utilization of the trapping mass spectrometer by a controlled introduction of ions to the analyzer based on ion capacity of each trapping analyzer.

FIG. 20A-C show an exemplary mass spectrometry measurement elution profiles and constructing data set based on multi dimension (MS dimension) measurements to provide a superimposed or a super mass spectrum. In this example, the peaks A, B, and C are eluting from a chromatographic column. A first mass spectrometer may perform a survey scan with low sensitivity in advance using a delayed electrospray ion source. The survey scan identifies analytes corresponding to peak A, B, and C at m/z of 400.0, 500.0, and 600.0, elution time apex or maximum heights of T1, T2, and T3, and abundance (or intensity) information of Ha, Hb, and Hc, respectively. The first mass spectrometer sends the information to the processing unit. The processing unit records and analyzes the information. The processing unit compares the abundance values with a predetermined value and produces an exclusion list based on the abundance. Then, the processor transmits an exclusion list to other mass spectrometer, the exclusion list including m/z values of 400.0 and 500.0 because the abundance values are above the predetermined value. The second mass spectrometer then performs a delayed MS1 scan with high sensitivity. Because molecules with high abundance are excluded, the second mass spectrometer identifies peaks C, D, E, and F at m/z values of 600.0, 700.0, 800.0, and 900.0 having intensities of HDc, HDd, HDe, and HDf, respectively. Because m/z of 600.0 is not excluded, the second mass spectrometer also measures the intensity of m/z 600.0 (HDc). This duplicate intensity measurement may be used for normalizing signal intensities between the first mass spectrometer and the second MS. For this high sensitivity measurement, the configuration discussed with respect to FIGS. 18A-B (or the super sensitive measurement mode where ion accumulation times exceed cycle time) may be used. The second mass spectrometer reports the results of the measurements to the central processor. The central processor compared the results of m/z values and their abundances measured by the first mass spectrometer and second mass spectrometer, and groups the high and low abundance m/z values and distributes the list to the third MS. The third mass spectrometer first measures each group of m/z values separately for dynamic range considerations or measurement requirements. The first group and second group of m/z values are measured separately to provide high resolution mass spectrometry measurements for peaks A-F. The third mass spectrometer identifies that peak B is associated with two different m/z values of 499.9997 and 500.0288 with relative abundance of 10% and 90%, respectively. The time stamp for max peak heights may also be measured which may be correlated with the first mass spectrometer and the second mass spectrometer based on a source delay of the delayed electrospray source. A fourth mass spectrometer may measure MS/MS information for each of the peaks or m/z values. The third mass spectrometer and the fourth mass spectrometer report the results back to the central processing unit. Then, the central processing unit may process and combine the data received from the fourth mass spectrometers and produce a comprehensive mass spectrometry data as shown in FIG. 20C such that the m/z values are provided from the high resolution measurements, the intensity values are provided based on the measurements of the first and second mass spectrometer that are normalized using a shared peak intensity (i.e., m/z of 600.0001), the MS/MS information provided by the fourth MS, and so on and so forth. Optionally, a fifth mass spectrometer may measure collisional cross section of the m/z values and provide an additional dimension to be included in the super mass spectrometry aggregate data.

In one or more embodiments, the mass spectrometry system allows for performing DDA analysis with some ion beams and performing DIA with other ion beams of the mass spectrometry system. In one or more embodiments, the ionization source may be any of Air flow-assisted ionization, Air flow-assisted desorption electrospray ionization, Atmospheric pressure glow discharge desorption ionization, Ambient pressure pyroelectric ionization source, Atmospheric pressure thermal desorption chemical ionization, Atmospheric pressure thermal desorption/ionization, Atmospheric pressure solids analysis probe, Beta electron-assisted direct chemical ionization, Charge assisted laser desorption/ionization, Desorption atmospheric pressure chemical ionization, Desorption atmospheric pressure photoionization, Direct analysis in real time, Dielectric barrier discharge ionization, Desorption corona beam ionization, Desorption chemical ionization, Desorption electro-flow focusing ionization, Desorption electrospray/metastable-induced ionization, Desorption electrospray ionization, Desorption sonic spray ionization, Desorption ionization by charge exchange, Direct inlet probe-atmospheric-pressure chemical ionization, Direct probe electrospray ionization, Electrode-assisted desorption electrospray ionization, Easy ambient sonic-spray ionization, Extractive electrospray ionization, Electrospray laser desorption ionization, Electrospray-assisted pyrolysis ionization, Electrostatic spray ionization, Flowing atmospheric pressure afterglow, Field-induced droplet ionization, High-voltage-assisted laser desorption ionization, Helium atmospheric pressure glow discharge ionization, Infrared laser ablation metastable-induced chemical ionization, Jet desorption electrospray ionization, Laser assisted desorption electrospray ionization, Laser ablation electrospray ionization, Laser ablation flowing atmospheric pressure afterglow, Laser ablation inductively coupled plasma, Laser desorption atmospheric pressure chemical ionization, Laser diode thermal desorption, Laser desorption electrospray ionization, Laser desorption spray post-ionization, Laser electrospray mass spectrometry, Liquid extraction surface analysis, Laser-induced acoustic desorption-electrospray ionization, Liquid micro-junction-surface sampling probe, Leidenfrost phenomenon-assisted thermal desorption, Liquid sampling-atmospheric pressure glow discharge, Laser spray ionization, Low temperature plasma, Matrix-assisted inlet ionization, Matrix-assisted laser desorption electrospray ionization, Microfabricated glow discharge plasma, microwave induced plasma desorption ionization, Nanospray desorption electrospray ionization, Neutral desorption extractive electrospray ionization, Plasma-assisted desorption ionization, Paint spray, Plasma-assisted laser desorption ionization, Plasma-assisted multiwavelength laser desorption ionization, Plasma-based ambient sampling/ionization/transmission, Paper assisted ultrasonic spray ionization, Probe electrospray ionization, Paper spray, Pipette tip column electrospray ionization, Radiofrequency acoustic desorption and ionization, Remote analyte sampling transport and ionization relay, Rapid evaporative ionization mass spectrometry, Robotic plasma probe ionization, Surface activated chemical ionization, Solvent-assisted inlet ionization, Surface acoustic wave nebulization, Secondary electrospray ionization, Solid probe assisted Nano-electrospray ionization, Single-particle aerosol mass spectrometry, Sponge-Spray Ionization, Surface sampling probe, Switched ferroelectric plasma ionizer, Thermal desorption-based ambient mass spectrometry, Transmission mode desorption electrospray ionization, Touch spray, Ultrasonication-assisted spray ionization, Venturi easy ambient sonic-spray ionization, Brush-Spray Ionization, or Fiber-Spray Ionization. The ionization source may be any other ionization source that creates gas-phase ions from a sample and any gas-phase ion irrespective of methods or techniques used for production of the ions may be used.

Figure 21:
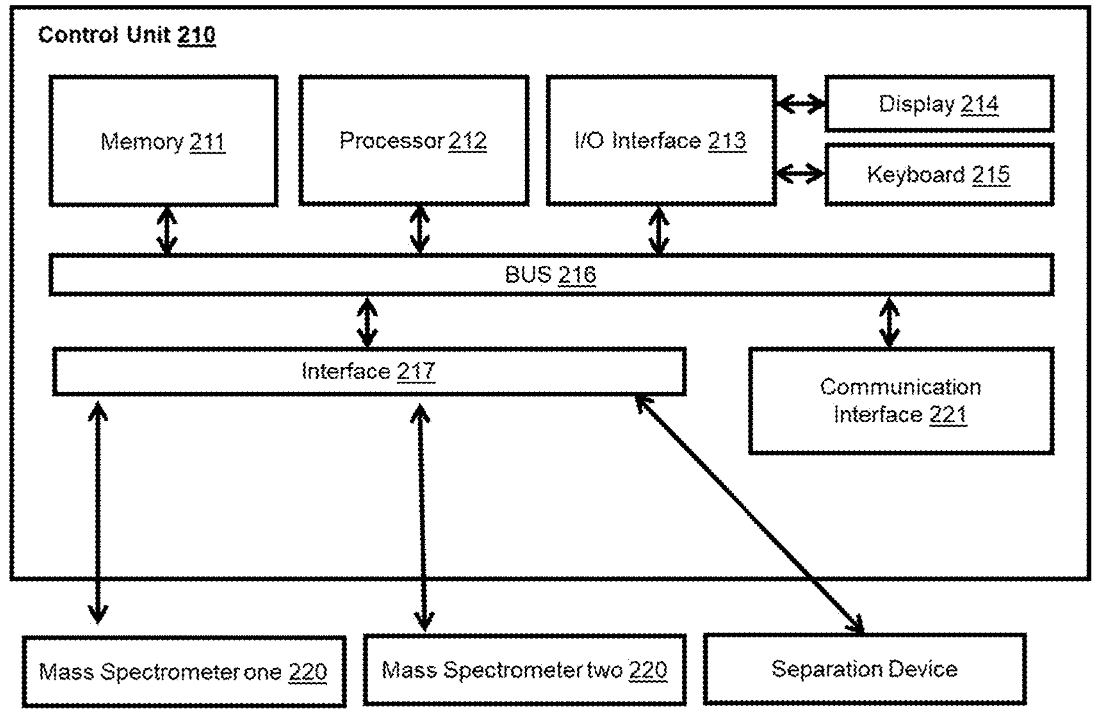
FIG. 21 shows a block diagram of control unit for a mass spectrometry system upon which an embodiment of the present disclosure may be implemented.

FIG. 21 shows a block diagram of control unit 210 for a mass spectrometry system in more detail upon which an embodiment of the present disclosure may be implemented. The ion transfer device 20 may include or may be connected to one or more control units 210 (may also be referred to as processing unit, central controller, central processor, central processing unit in the present application). The control unit 210 includes a memory 211, a processor 212, an input/output (I/O) interface 213 that is connected to a display 214 and a keyboard 215, an interface 217 that is connected a plurality of mass spectrometers 220 and separation devices such as an LC or HPLC. The control unit 210 includes one or more memory 211, such as a random-access memory (RAM) or other dynamic storage device (e.g., dynamic RAM (DRAM), static RAM (SRAM), and synchronous DRAM (SDRAM)), coupled to the bus 216 for storing information and instructions to be executed by processor 212. In addition, the one or more memory 211 may be used for storing temporary variables or other intermediate information during the execution of instructions by the processor 212. The control unit 210 may further include a read only memory (ROM) or other static storage device (e.g., programmable ROM (PROM), erasable PROM (EPROM), and electrically erasable PROM (EEPROM)) coupled to the bus 216 for storing static information and instructions for the processor 212. The control unit 210 may further include a communication interface 221 coupled to the bus 216. The communication interface 221 provides a two-way data communication. For example, the communication interface 221 may be a network interface card to attach to any packet switched LAN. As another example, the communication interface 221 may be an asymmetrical digital subscriber line (ADSL) card, an integrated service digital network (ISDN) card, a Universal Serial Bus (USB), or a modem to provide a data communication connection to a corresponding type of communications line. A wired or wireless network may further be connected to the communication interface 221 connected to one or more computers that provide one or more operators and/or users a platform to communicate with the control unit 210. The control unit also includes an interface 217 that translates digital data received from the bus 216 and transmits instructions to the plurality of mass spectrometers 220 and one or more LC or HPLC system. In one embodiment, the interface 217 may also be connected to a one or more ion trapping devices, for example, synchronize to adjust the timing and multiplexing of the ion transfer according to those disclosed in this application.

Figure 22:
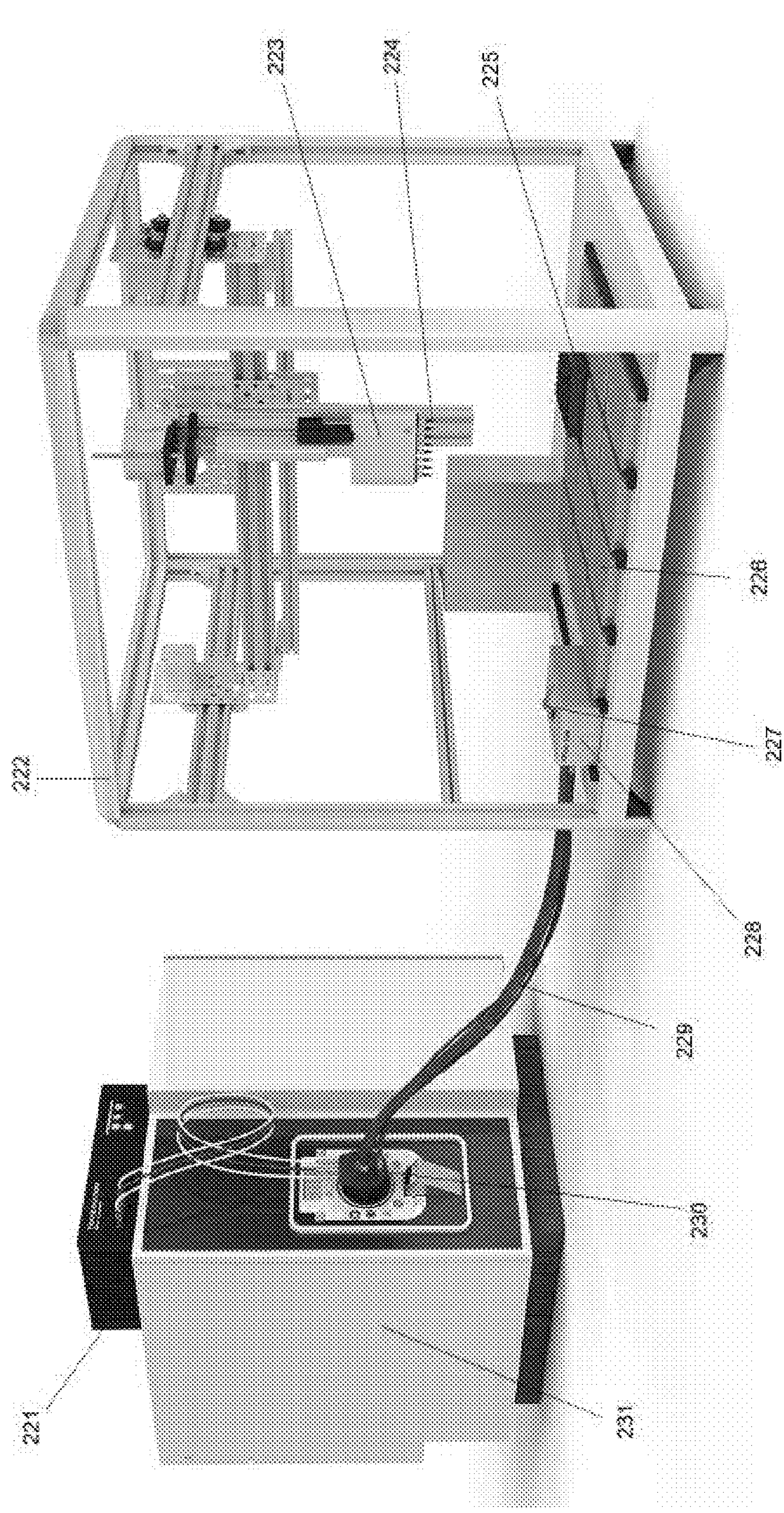
FIGS. 22 and 23 show a mass spectrometry system such that a mass spectrometer is connected to a liquid handling station via a flexible ion guide in accordance with one or more embodiments of the present disclosure.
Figure 23:
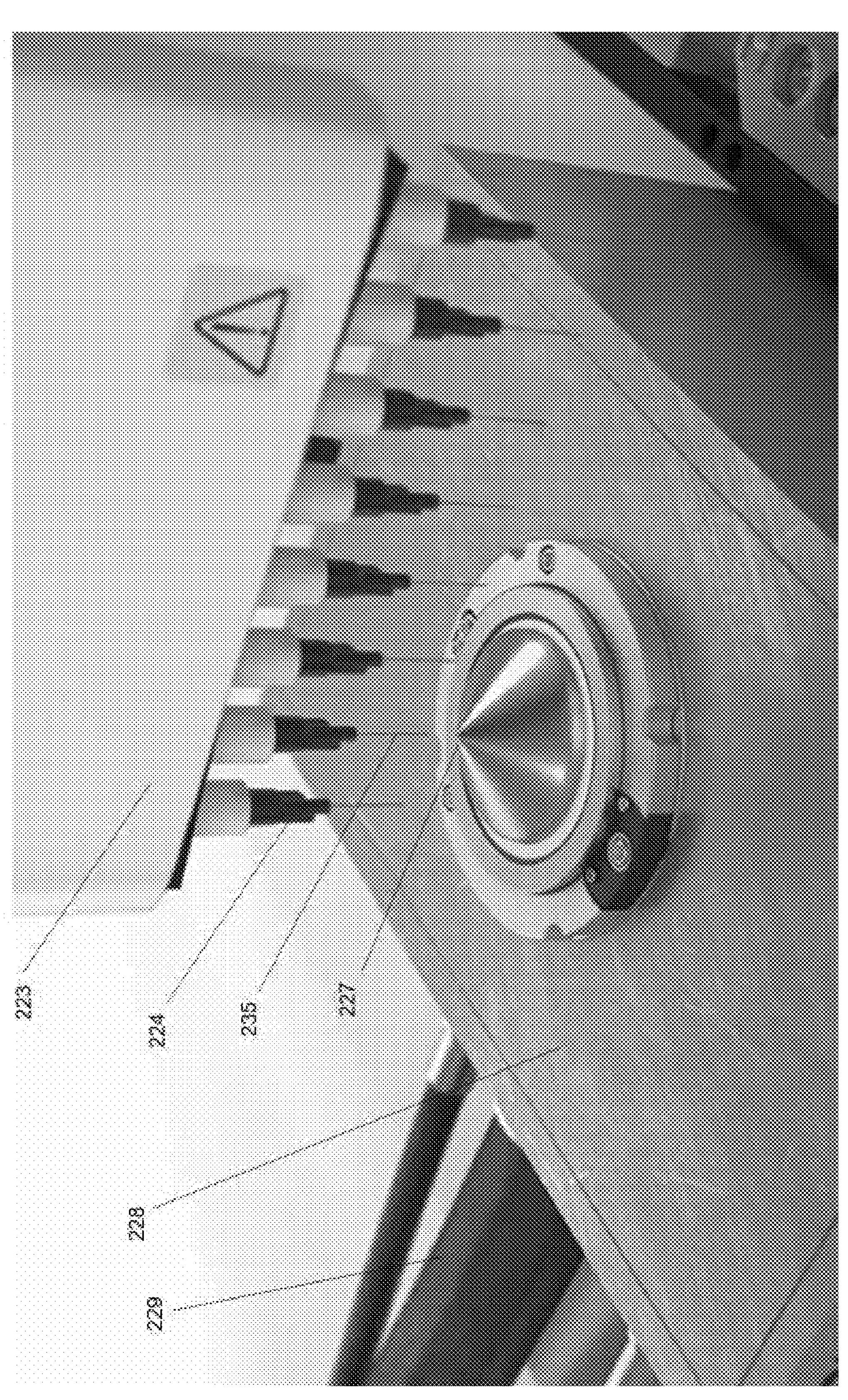

FIGS. 22 and 23 show a mass spectrometry system such that a mass spectrometer is connected to a liquid handling station via a flexible ion guide in accordance with one or more embodiments of the present disclosure. A mass spectrometry system includes an ion transfer device 229 (which may be rigid or flexible) that is connected to one or more mass spectrometers 231 via a first interface 230 on one end and a liquid handling station 222 via a second interface 228 having a sampling inlet 227 on the other end. A controller 221 is connected to, provides voltages, and/or controls the flexible ion guide 229 and the first and second interfaces 230,228. The liquid handling station 222 includes a pipette 223. The pipette 223 may have one or more channels, each channel having a disposable pipette tip 224. The pipette 223 takes disposable pipette tips 224 from a pipette tip holder 225 and may dispose the disposable pipette tips 224 after use in a disposal unit 232. The pipette 223 moves via an XYZ stage and samples fluid from one or more of a plurality of well-plates 226 (e.g., 96 well plates or titer plates) and then introduces the sampled fluid to the sampling inlet 227. As shown in FIG. 23, which is a closeup view of the second interface 228, each pipette tip 224 may include an emitter 235 such that each emitter 235 first intakes fluid from a well of titer plates 226 when the XYZ stage is in a first location and then the XYZ stage moves to a second location, the second location being in a proximity of the sampling inlet 227. When the emitter 235 is aligned with the sampling inlet 227, high volage is applied to each pipette tip 224 (e.g., via application of high voltage to the disposable tip 224 or the emitter 235) the fluid of the disposable tip 224 is electrosprayed into sampling inlet 227 and the produced ions are transported via the ion guide 229 to mass spectrometer 231 for analysis. The one or more exemplary embodiments disclosed in FIGS. 22 and 23 provide the advantage that small amounts of sample, such as single droplets may be analyzed without cross-contamination and dead volume. This is important, for example, in clinical applications, where the amount of available sample is typically insignificant, for example, in single cell mass spectrometry. The above-noted embodiments minimize reagent use and related costs, eliminate issues with cross-contamination and dead volumes, and allows for an unprecedented level of automation in mass spectrometry workflows essential in reproducibility of mass spectrometry data, as well as reducing cost of analysis and minimizing exposure of lab personnel to biological samples that may be hazardous.

While the present disclosure has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A mass spectrometry system comprising:

an electrospray ion source configured to produce ions; and one or more mass analyzers configured to analyze the ions, wherein:

the electrospray ion source includes at least a first electrospray emitter and a second electrospray emitter, the first electrospray emitter is configured to produce a first ion beam, and the second electrospray emitter is configured to produce a second ion beam, the mass spectrometry system is configured to analyze the first ion beam produced by the first electrospray emitter and the second ion beam produced by the second electrospray emitter, the mass spectrometry system is configured to perform MS1 measurements of the first ion beam and the second ion beam simultaneously, and is configured to generate a combined chromatogram, the mass spectrometry system is configured to generate the combined chromatogram based on intensities of the ions, the combined chromatogram includes peaks corresponding to the first ion beam and peaks corresponding to the second ion beam, a first chromatographic peak corresponds to an earliest or latest peak in time of the peaks corresponding to the first ion beam, and a second chromatographic peak corresponds to an earliest or latest peak in time of the peaks corresponding to the second ion beam, the first chromatographic peak and the second chromatographic peak are two peaks of the combined chromatogram that are separated by a predetermined time delay or time offset (deltaT), a first point in time (T1) corresponds to an apex of the first chromatographic peak, and a second point in time (T2) corresponds to an apex of the second chromatographic peak, and the first point in time (T1) and the second point in time (T2) are separated by the predetermined time delay or time offset (deltaT).

2. The mass spectrometry system according to claim 1, wherein:

the first chromatographic peak and the second chromatographic peak correspond to an analyte or a feature of the analyte, the mass spectrometry system is configured to measure the analyte or the feature of the analyte from the first ion beam, and is configured to generate the first chromatographic peak, and the mass spectrometry system is configured to measure the analyte or the feature of the analyte from the second ion beam after the predetermined time delay or time offset (deltaT), and is configured to generate the second chromatographic peak.

3. The mass spectrometry system according to claim 1, wherein:

the mass spectrometry system is configured to perform a first mass spectrometry analysis of the analyte from the first ion beam and, after the predetermined time delay or time offset (deltaT), is configured to perform a second mass spectrometry analysis of an analyte from the second ion beam, the first mass spectrometry analysis and the second mass spectrometry analysis further include MS2 measurement measurements.

4. The mass spectrometry system according to claim 1, wherein:

the mass spectrometry system is configured to perform a first mass spectrometry analysis and is configured to measure ion intensities or ion abundances, and corresponding m/z values, and after the predetermined time delay or time offset (deltaT), the mass spectrometry system is configured to perform a second mass spectrometry analysis based on the ion intensities or ion abundances, and the corresponding m/z values measured in the first mass spectrometry analysis.

5. The mass spectrometry system according to claim 1, wherein:

the mass spectrometry system is configured to perform a first mass spectrometry analysis to produce preliminary information or data, the mass spectrometry system is configured to generate or adjust acquisition parameters based on the preliminary information or data, and after the predetermined time delay or time offset (deltaT), the mass spectrometry system is configured to perform a second mass spectrometry analysis using the acquisition parameters generated or adjusted based on the preliminary information or data.

6. The mass spectrometry system according to claim 1, wherein the predetermined time delay or time offset (deltaT) is between 0.01 second and 3600 seconds.

7. The mass spectrometry system according to claim 1, wherein:

the mass spectrometry system is configured to analyze the ions from the first ion beam and the second ion beam using (i) one common mass analyzer of the one or more mass analyzers, or (ii) two different mass analyzers of the one or more mass analyzers.

8. The mass spectrometry system according to claim 1, wherein the mass spectrometry system is configured to generate the second chromatographic peak as a re-measurement of the first chromatographic peak after the predetermined time delay or time offset (deltaT).

9. The mass spectrometry system according to claim 1, wherein:

the mass spectrometry system is configured to perform a first mass spectrometry analysis of the ions, and is configured to generate a set of instructions based on the first mass spectrometry analysis, the set of instructions includes at least one or more m/z ranges and accumulation times, and after the predetermined time delay or time offset (deltaT), the mass spectrometry system is configured to perform a second mass spectrometry analysis of the ions based on the set of instructions.

10. The mass spectrometry system according to claim 1, wherein:

the mass spectrometry system is configured to perform a first mass spectrometry analysis, and the mass spectrometry system is configured to determine, based on the first mass spectrometry analysis, one or more m/z windows and one or more corresponding accumulation times to perform a second mass spectrometry analysis.

11. A mass spectrometry system comprising:

an electrospray ion source configured to produce ions; and one or more mass analyzers configured to analyze the ions, wherein:

the electrospray ion source includes at least a first electrospray emitter and a second electrospray emitter, the first electrospray emitter is configured to produce a first ion beam, and the second electrospray emitter is configured to produce a second ion beam, the mass spectrometry system is configured to analyze the first ion beam produced by the first electrospray emitter and the second ion beam produced by the second electrospray emitter, the mass spectrometry system is configured to perform MS1 measurements of the first ion beam and the second ion beam simultaneously and to generate a combined chromatogram based on ion intensities, the mass spectrometry system is configured to generate the combined chromatogram based on intensities of the ions, a first analyte mixture and a second analyte mixture are ionized by the first electrospray emitter and the second electrospray emitter of the electrospray ion source, respectively, the combined chromatogram includes peaks corresponding to the first analyte mixture and peaks corresponding to the second analyte mixture, the mass spectrometry system is configured to analyze the first analyte mixture to produce a first chromatogram, and the mass spectrometry system is configured to analyze the second analyte mixture to produce a second chromatogram, the mass spectrometry system is configured such that ions corresponding to at least one analyte of the first analyte mixture produce a first chromatographic peak having an apex at a first point in time (T1), and ions corresponding to at least one analyte of the second analyte mixture produce a second chromatographic peak having an apex at a second point in time (T2), the first point in time (T1) and the second point in time (T2) are separated by a predetermined time delay or time offset (deltaT), and and the first chromatographic peak and the second chromatographic peak are two peaks of the combined chromatogram that are separated by the predetermined time delay or time offset (deltaT).

12. A method for mass spectrometry analysis comprising:

producing ions with an electrospray ion source; and performing the mass spectrometry analysis of the ions by a mass spectrometry system, wherein:

the electrospray ion source includes at least a first electrospray emitter and a second electrospray emitter, producing the ions with the electrospray ion source includes producing a first ion beam from the first electrospray emitter, and producing a second ion beam from the second electrospray emitter, performing the mass spectrometry analysis includes analyzing the first ion beam produced by the first electrospray emitter and the second ion beam produced by the second electrospray emitter, performing the mass spectrometry analysis includes performing MS1 measurements of the first ion beam and the second ion beam simultaneously, and generating a combined chromatogram, performing the mass spectrometry analysis includes generating the combined chromatogram based on intensities of the ions, the combined chromatogram includes peaks corresponding to the first ion beam and peaks corresponding to the second ion beam, a first chromatographic peak corresponds to an earliest or latest peak in time of the peaks corresponding to the first ion beam, and a second chromatographic peak corresponds to an earliest or latest peak in time of the peaks corresponding to the second ion beam, the first chromatographic peak and the second chromatographic peak are two peaks of the combined chromatogram that are separated by a predetermined time delay or time offset (deltaT), a first point in time (T1) corresponds to an apex of the first chromatographic peak, and a second point in time (T2) corresponds to an apex of the second chromatographic peak, and the first point in time (T1) and the second point in time (T2) are separated by the predetermined time delay or time offset (deltaT).

13. The method according to claim 12, wherein:

the first chromatographic peak and the second chromatographic peak correspond to an analyte or a feature of the analyte, performing the mass spectrometry analysis includes measuring the analyte or the feature of the analyte from the first ion beam, and generating the first chromatographic peak, and performing the mass spectrometry analysis includes measuring the analyte or the feature of the analyte from the second ion beam after the predetermined time delay or time offset (deltaT), and generating the second chromatographic peak.

14. The method according to claim 12, wherein:

performing the mass spectrometry analysis includes performing a first mass spectrometry analysis of an analyte from the first ion beam and, after the predetermined time delay or time offset (deltaT), performing a second mass spectrometry analysis of the analyte from the second ion beam, the first mass spectrometry analysis and the second mass spectrometry analysis further include MS2 measurements.

15. The method according to claim 12, wherein:

performing the mass spectrometry analysis includes performing a first mass spectrometry analysis to produce preliminary information or data for generating or adjusting acquisition parameters based on the preliminary information or data, and performing the mass spectrometry analysis further includes performing, after the predetermined time delay or time offset (deltaT), a second mass spectrometry analysis using the acquisition parameters generated or adjusted based on the preliminary information or data.

16. The method according to claim 12, wherein:

performing the mass spectrometry analysis includes performing a first mass spectrometry analysis of the ions to generate a set of instructions based on the first mass spectrometry analysis, the set of instructions includes at least one or more m/z ranges and accumulation times, and performing the mass spectrometry analysis further includes performing, after the predetermined time delay or time offset (deltaT), a second mass spectrometry analysis of the ions based on the set of instructions.

17. The method according to claim 12, wherein:

performing the mass spectrometry analysis includes performing a first mass spectrometry analysis, and determining, based on the first mass spectrometry analysis, one or more m/z windows and one or more corresponding accumulation times for performing a second mass spectrometry analysis.

18. A mass spectrometry system comprising:

an electrospray ion source configured to produce ions; and one or more mass analyzers configured to analyze the ions, wherein;

the electrospray ion source includes at least a first electrospray emitter and a second electrospray emitter, the first electrospray emitter is configured to produce a first ion beam, and the second electrospray emitter is configured to produce a second ion beam, the mass spectrometry system is configured to analyze the first ion beam produced by the first electrospray emitter and the second ion beam produced by the second electrospray emitter, the mass spectrometry system is configured to perform MS1 measurements of the first ion beam and the second ion beam simultaneously, and is configured to generate a combined chromatogram, the mass spectrometry system is configured to generate the combined chromatogram based on intensities of the ions, the combined chromatogram includes peaks corresponding to the first ion beam and peaks corresponding to the second ion beam, a first chromatographic peak corresponding to the first ion beam and a second chromatographic peak corresponding to the second ion beam are two peaks of the combined chromatogram, the first chromatographic peak corresponds to a first group of molecules of an analyte introduced via the first electrospray emitter during a first time interval, and the second chromatographic peak corresponds to of a second group of molecules of the analyte introduced via the second electrospray emitter during a second time interval the first chromatographic peak has a first apex at a first point in time (T1), and the second chromatographic peak has a second apex at a second point in time (T2), and the first point in time (T1) and the second point in time (T2) are separated by a predetermined time delay or time offset (deltaT).

19. The mass spectrometry system according to claim 18, wherein:

a first fluidic channel fluidically couples to the first electrospray emitter, a second fluidic channel fluidically couples to the second electrospray emitter.

20. The mass spectrometry system according to claim 19, wherein:

the first fluidic channel and the second fluidic channel comprise fused silica capillaries having tapered tips, and the tapered tips of the fused silica capillaries define the first electrospray emitter and the second electrospray emitter.

21. The mass spectrometry system according to claim 19, wherein the first fluidic channel and the second fluidic channel have different lengths, and the difference in the lengths determines the predetermined time delay or time offset (deltaT).

22. The system according to claim 18, wherein:

the mass spectrometry system is configured such that simultaneous production of the first ion beam and the second ion beam provides increased ion current for mass spectrometry analysis.

23. The mass spectrometry system according to claim 18, wherein:

the mass spectrometry system is configured such that:

(i) ions produced by the first electrospray emitter and ions produced by the second electrospray emitter are sampled by a single ion inlet, or (ii) ions produced by the first electrospray emitter are sampled by a first ion inlet and ions produced by the second electrospray emitter are sampled by a second ion inlet, the second ion inlet being different from the first ion inlet.

24. The mass spectrometry system according to claim 19, wherein:

the mass spectrometry system is configured to receive a mixture of analytes separated in at least one analytical column, the mixture of analytes being split into the first fluidic channel and the second fluidic channel downstream of the at least one analytical column, the first fluidic channel and the second fluidic channel being fluidically connected to the first electrospray emitter and the second electrospray emitter, respectively.

* * * * *